United States Patent
Hara et al.

(10) Patent No.: US 7,333,641 B2
(45) Date of Patent: Feb. 19, 2008

(54) METHOD AND APPARATUS FOR ANALYZING STREAKED PATTERN IMAGE

(75) Inventors: Masanori Hara, Tokyo (JP); Hiroaki Toyama, Tokyo (JP)

(73) Assignee: NEC Corporation, Tokyo (JP)

( * ) Notice: Subject to any disclaimer, the term of this patent is extended or adjusted under 35 U.S.C. 154(b) by 720 days.

(21) Appl. No.: 10/639,527

(22) Filed: Aug. 13, 2003

(65) Prior Publication Data

US 2004/0101173 A1   May 27, 2004

(30) Foreign Application Priority Data

Aug. 13, 2002  (JP)  ............... 2002-236087

(51) Int. Cl.
*G06K 9/00* (2006.01)
(52) U.S. Cl. ...................... 382/125; 382/124
(58) Field of Classification Search ........ 382/115–116, 382/119, 124–127
See application file for complete search history.

(56) References Cited

U.S. PATENT DOCUMENTS

| | | | |
|---|---|---|---|
| 4,253,086 A | 2/1981 | Szwarcbier | |
| 4,310,827 A | 1/1982 | Asai | |
| 4,646,352 A | 2/1987 | Asai et al. | |
| 5,519,785 A | 5/1996 | Hara | |
| 5,909,501 A | 6/1999 | Thebaud | |
| 5,926,555 A | 7/1999 | Ort et al. | |
| 5,991,430 A | 11/1999 | Hsu et al. | |
| 6,072,895 A | 6/2000 | Bolle et al. | |

| | | | |
|---|---|---|---|
| 2002/0027554 A1* | 3/2002 | Hara et al. | 345/442 |

FOREIGN PATENT DOCUMENTS

| | | |
|---|---|---|
| JP | 59-778 | 1/1984 |
| JP | 60-12674 | 4/1985 |
| JP | 2-270076 | 11/1990 |
| JP | 7-114649 | 5/1995 |
| JP | 2885787 | 2/1999 |
| JP | 11-316835 | 11/1999 |
| JP | 2002-74381 | 3/2002 |

OTHER PUBLICATIONS

Isenor, D K et al.: "Fingerprint Identification Using Graph Matching" Pattern Recognition, Pergamon Press Inc. Elmsford, N.T., US, vol. 19, No. 2, 1986, pp. 113-122.

(Continued)

*Primary Examiner*—Vikkram Bali
(74) *Attorney, Agent, or Firm*—Young & Thompson

(57) ABSTRACT

A streaked pattern image analyzing apparatus for use in an analysis of a fingerprint and the like for aiding in the identification as to whether or not an applied first streaked pattern image matches a second streaked pattern image. The apparatus comprises an image distortion modification unit for modifying data on one of the first streaked pattern image and the second streaked pattern image such that a point on a first streaked pattern image which resides on a skeleton thinned from a streak of the streaked pattern image and having a corresponding point on the second streaked pattern image is brought closer to a point on a skeleton of the second streaked pattern image corresponding to the point, and an image display unit for displaying the streaked pattern image modified by the image distortion modifying unit and the other streaked pattern image.

22 Claims, 51 Drawing Sheets

OTHER PUBLICATIONS

Riskin, S I: "Fingerprint Comparator" IBM Technical Disclosure Bulletin, IBM Corp. New York, US, vol. 18, No. 6, Nov. 1, 1975, pp. 2018-2020.

Senior, A W et al.: "Improved Fingerprint Matching by Distortion Removal" IEICE Transactions on Information and Systems, Jul. 2001, Inst.Electron. Inf. & Commun. Eng, Japan, vol. E84-D, No. 7, pp. 825-832.

* cited by examiner

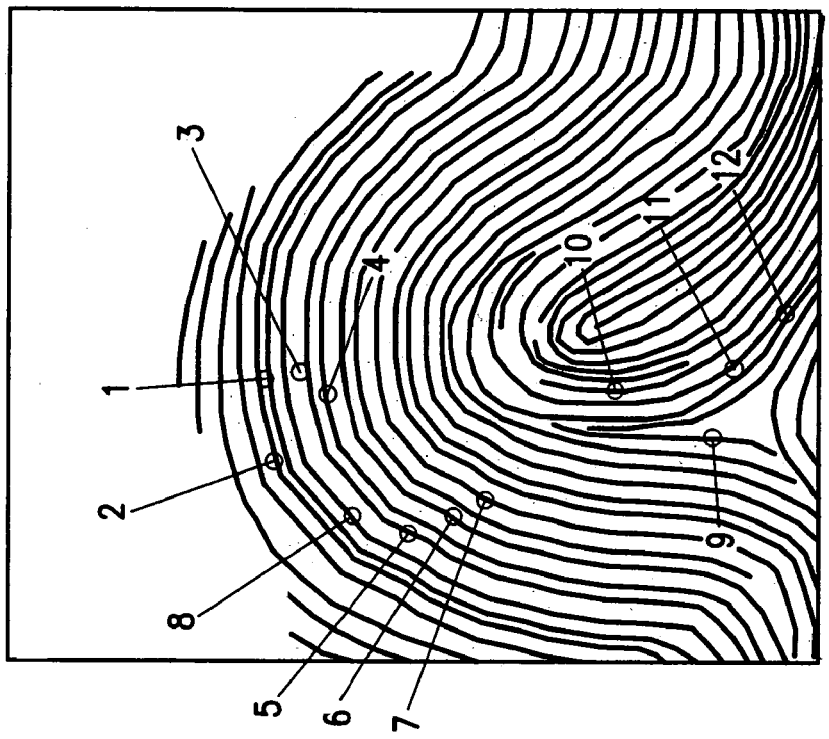
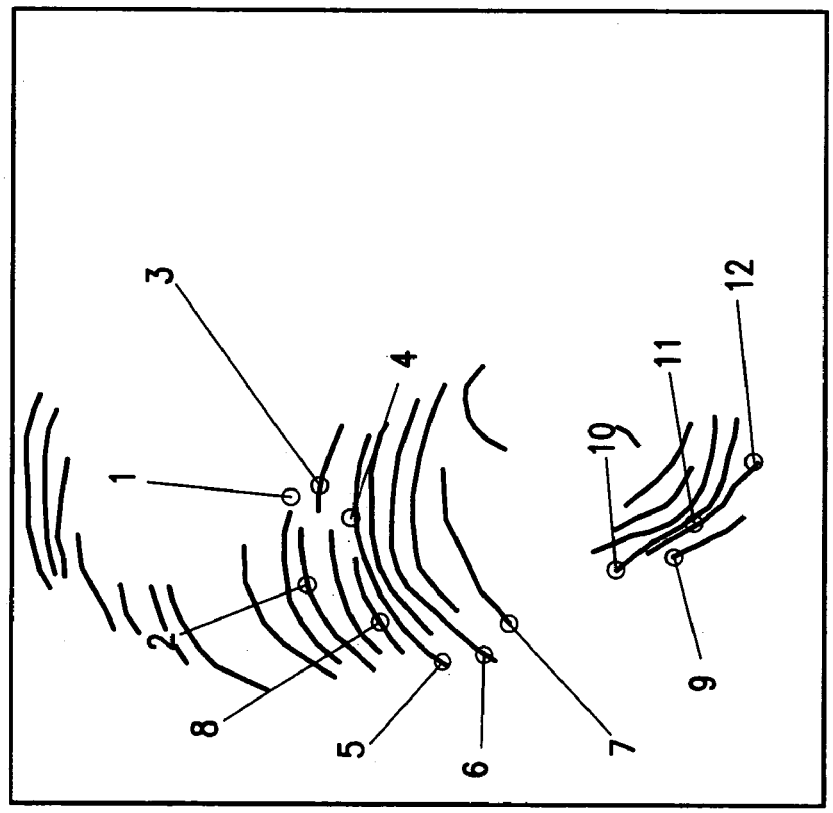
FIG. 2
PRIOR ART

Exemplary fingerprint which is similar but is not from mating fingerprint

Exemplary minutiae on search-side fingerprint

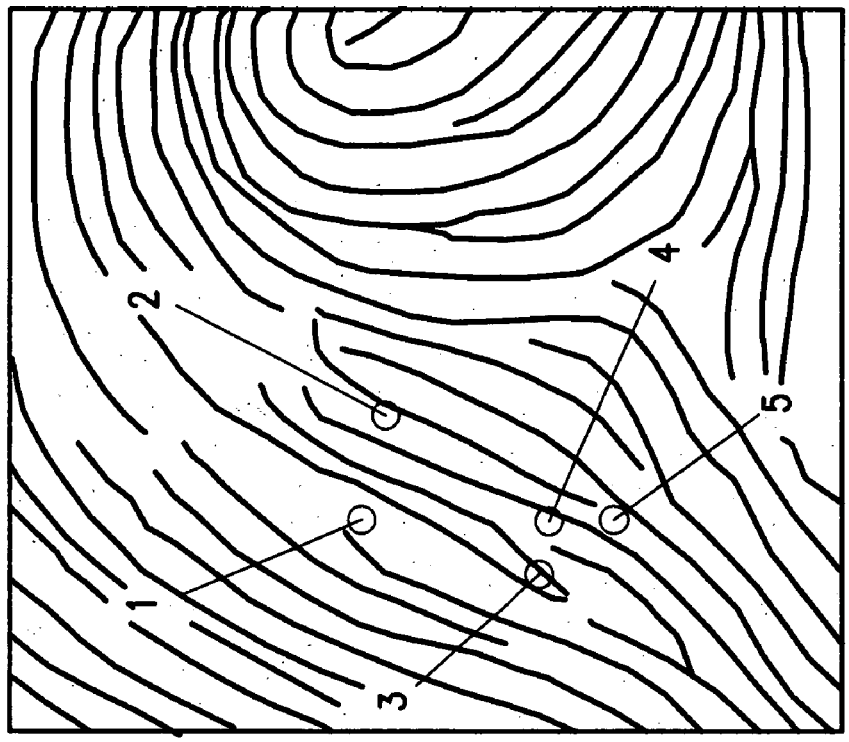
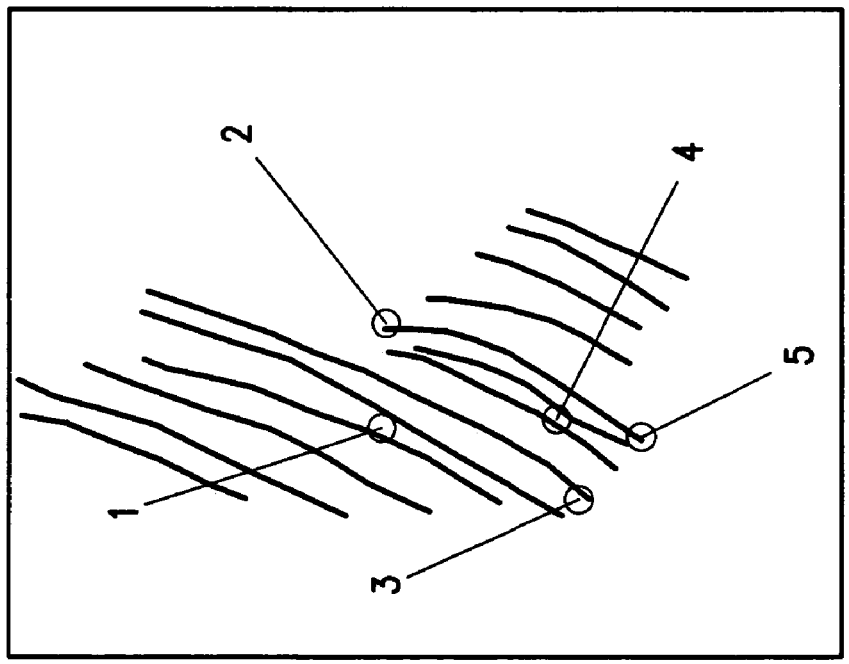
FIG. 4
PRIOR ART

Search-side fingerprint (latent fingerprint)

File-side fingerprint (corresponding portion of mating fingerprint)

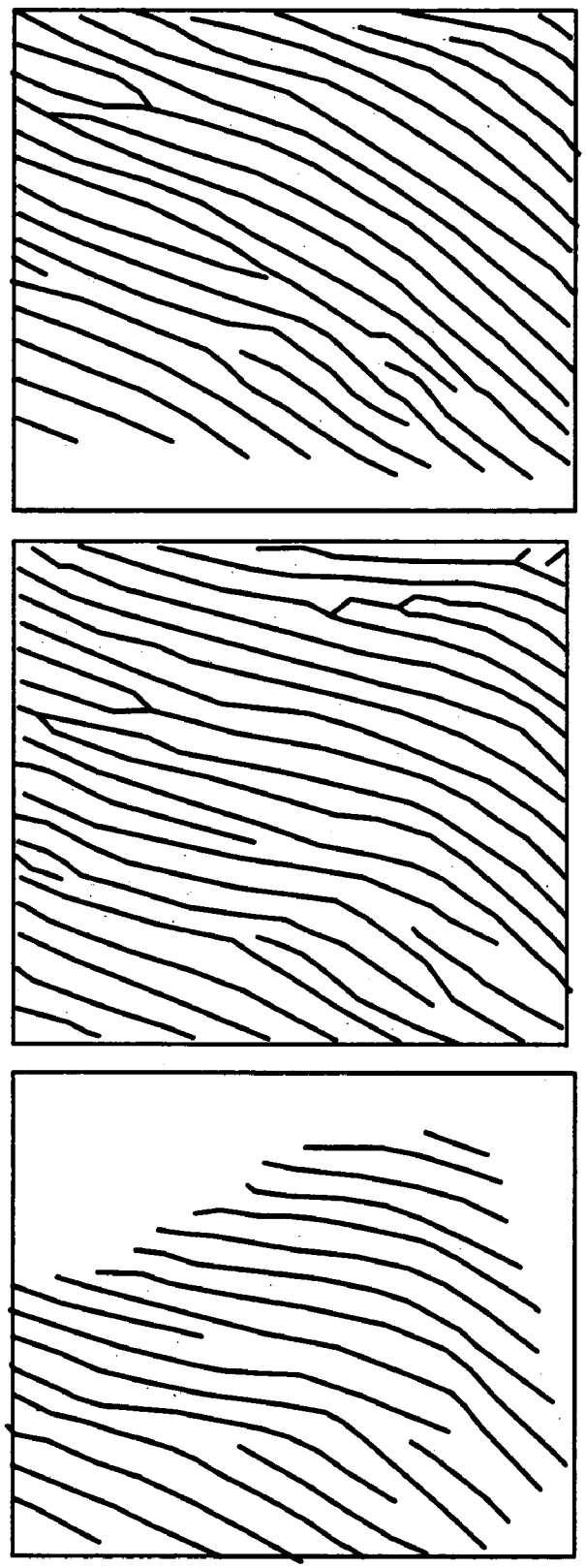
FIG. 10A Search-side fingerprint (latent fingerprint)
FIG. 10B File-side fingerprint after image distortion modification
FIG. 10C File-side fingerprint before image distortion modification File-side fingerprint before image distortion modification File-side fingerprint after image distortion modification Search-side fingerprint (latent fingerprint)

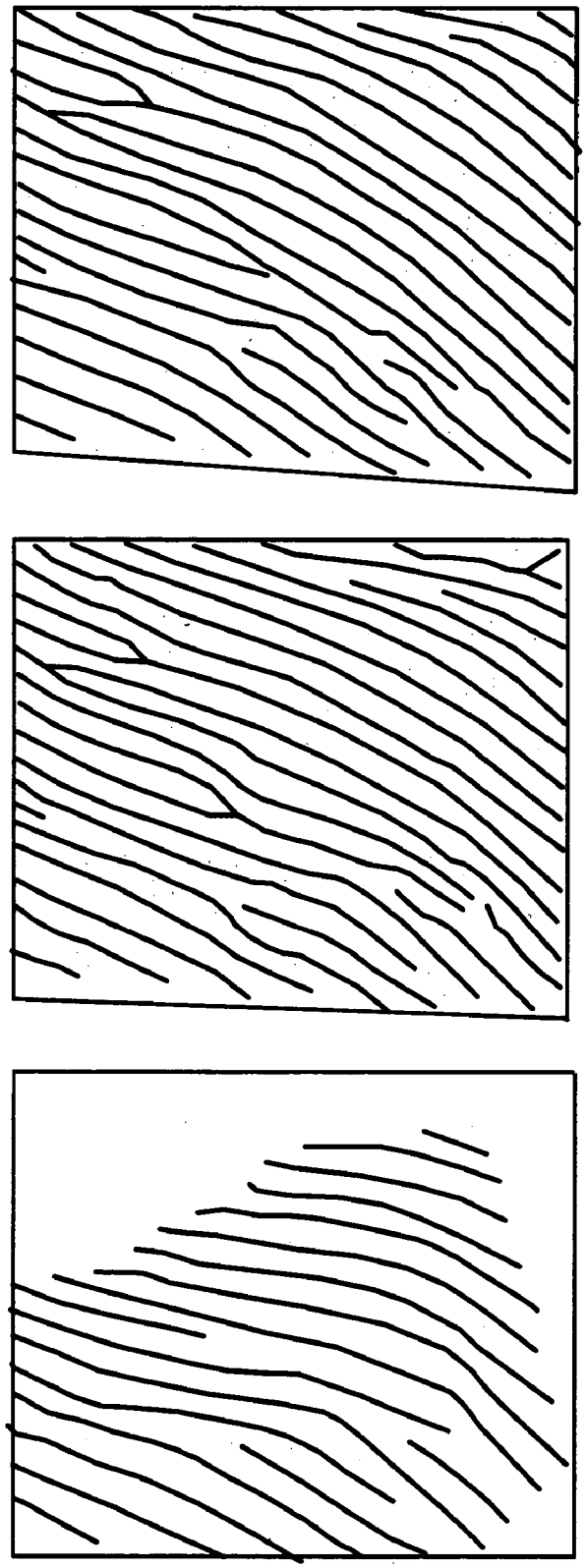
FIG. 12A Search-side fingerprint (latent fingerprint)
FIG. 12B File-side fingerprint after image distortion modification
FIG. 12C File-side fingerprint before image distortion modification File-side fingerprint before image distortion modification File-side fingerprint after image distortion modification Search-side fingerprint (latent fingerprint)

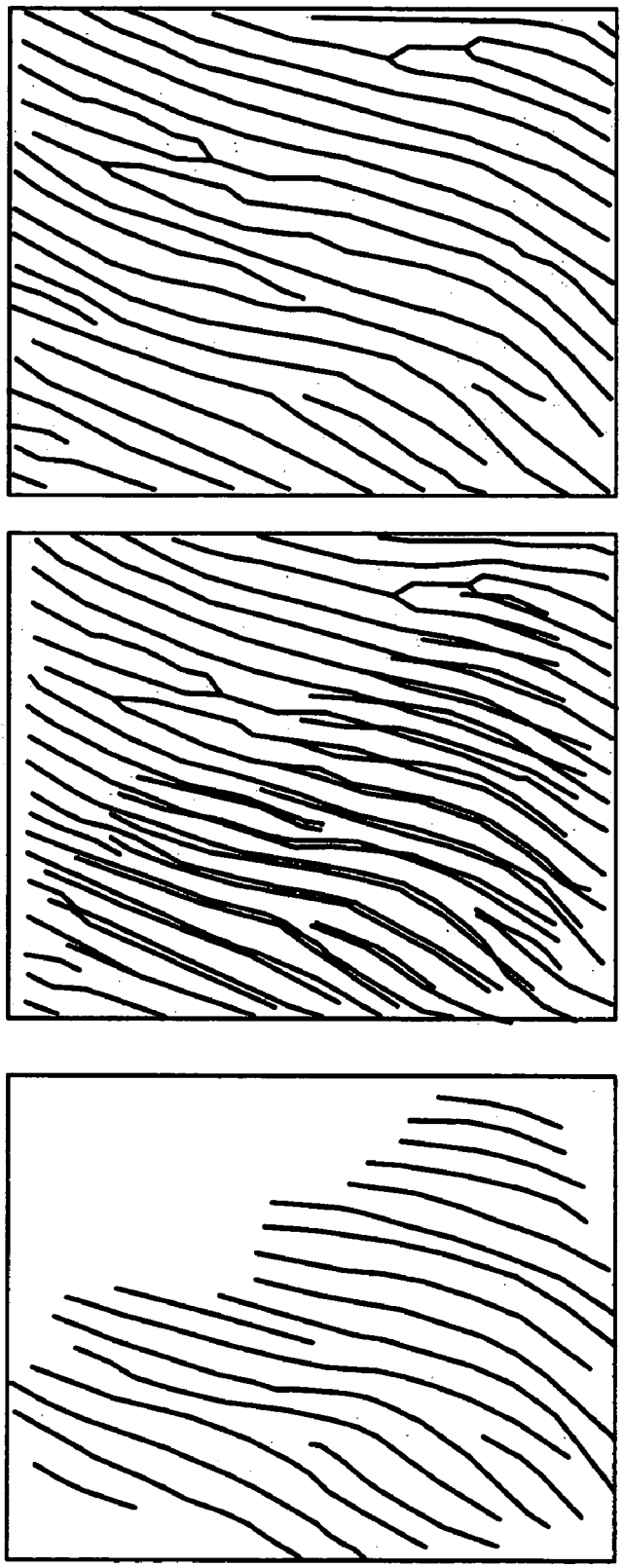
FIG. 14C File-side fingerprint after image distortion modification
FIG. 14B Example of superimposed image (average of density)
FIG. 14A Search-side fingerprint (latent fingerprint)

File-side fingerprint before image distortion modification

Example of superimposed image

Search-side fingerprint (latent fingerprint)

File-side fingerprint before image distortion modification

Example of superimposed image (average of density)

Search-side fingerprint (latent fingerprint)

File-side fingerprint after image distortion modification

Example of superimposed image

Search-side fingerprint (latent fingerprint)

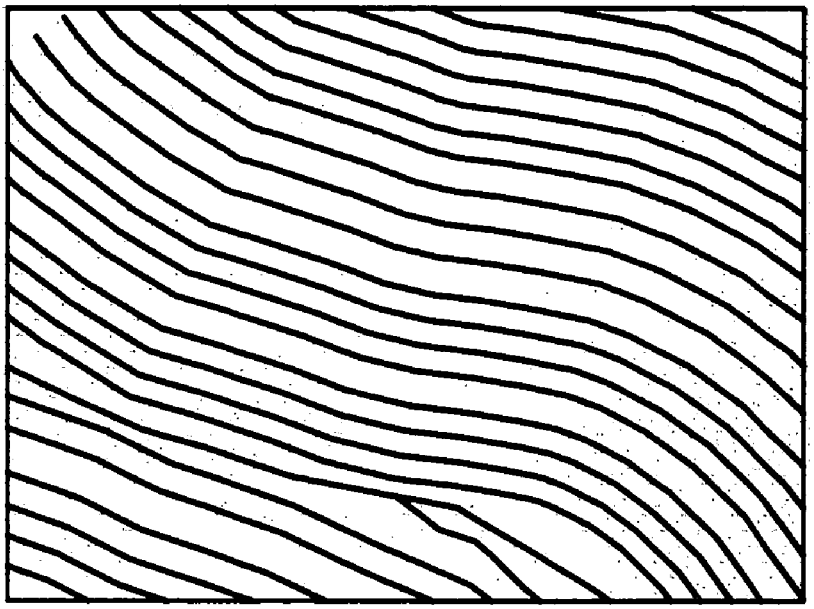
Search-side fingerprint images are displayed on partial region
Switch images at intervals of 0.05 seconds
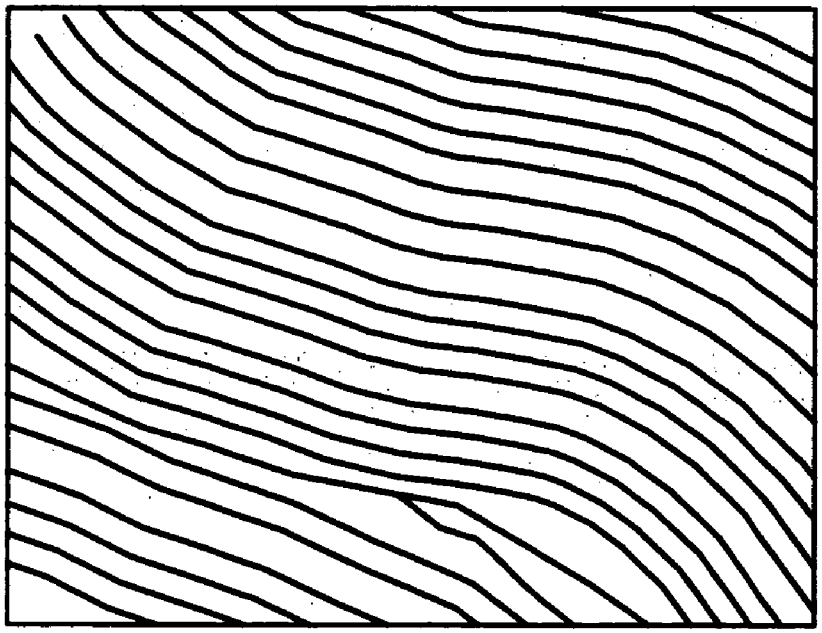
File-side fingerprint after image distortion modification
FIG. 18

Example of Search-side gray-scale image after image distortion modification with superimposition of file-side skeleton Search-side fingerprint image after image distortion modification

FIG. 21A Mask pattern

| X4 | X3 | X2 |
|---|---|---|
| X5 | X0 | X1 |
| X6 | X7 | X8 |

1) $X_n=1$ indicated skeleton point exists, $X_n=0$ indicates pixel other skeleton point
2) When $X_0=1$, $\Sigma X_n \leq 3$ ($X_n = X_1$ to $X_8$)
3) When $X_0=1$, none skeleton point of $X_1$ to $X_8$ neighbors

FIG. 21B Example of ending point (E)

| 0 | 0 | 1 |
|---|---|---|
| 0 | 1 | 0 |
| 0 | 0 | 0 |

| 0 | 0 | 1 |
|---|---|---|
| 0 | 1 | 0 |
| 0 | 0 | 0 |

FIG. 21C Example of bifurcation (B)

| 1 | 0 | 1 |
|---|---|---|
| 0 | 1 | 0 |
| 0 | 1 | 0 |

| 1 | 0 | 1 |
|---|---|---|
| 0 | 1 | 0 |
| 1 | 0 | 0 |

| 0 | 1 | 0 |
|---|---|---|
| 1 | 1 | 0 |
| 0 | 1 | 0 |

FIG. 21D Example of continuous point (C)

| 0 | 1 | 0 |
|---|---|---|
| 0 | 1 | 0 |
| 0 | 1 | 0 |

| 0 | 1 | 0 |
|---|---|---|
| 0 | 1 | 0 |
| 0 | 0 | 1 |

| 1 | 0 | 0 |
|---|---|---|
| 0 | 1 | 0 |
| 0 | 0 | 1 |

FIG. 23A

Mask pattern

| X4 | X3 | X2 |
|----|----|----|
| X5 | X0 | X1 |
| X6 | X7 | X8 |

Bit 7      Bit 0

| X8 | X7 | X6 | X5 | X4 | X3 | X2 | X1 |

Eight neighbor pixels are represented by 1-byte data

FIG. 23B

| 0 | 0 | 0 |
|---|---|---|
| 0 | 1 | 0 |
| 0 | 0 | 0 |

C8=0

(Note: actual grids shown)

| 0 | 1 | 0 |
|---|---|---|
| 0 | 1 | 0 |
| 0 | 0 | 0 |

C8=1

| 0 | 0 | 0 |
|---|---|---|
| 0 | 1 | 0 |
| 0 | 0 | 1 |

C8=128

| 0 | 1 | 0 |
|---|---|---|
| 0 | 1 | 0 |
| 0 | 1 | 0 |

C8=17

| 0 | 0 | 0 |
|---|---|---|
| 1 | 1 | 0 |
| 0 | 0 | 0 |

C8=4

| 1 | 0 | 0 |
|---|---|---|
| 0 | 1 | 0 |
| 0 | 0 | 0 |

C8=2

| 1 | 0 | 0 |
|---|---|---|
| 0 | 1 | 0 |
| 0 | 0 | 1 |

C8=34

| 0 | 1 | 0 |
|---|---|---|
| 0 | 1 | 0 |
| 1 | 0 | 0 |

C8=18

| 1 | 1 | 1 |
|---|---|---|
| 0 | 1 | 0 |
| 0 | 1 | 0 |

C8=146

| 0 | 0 | 1 |
|---|---|---|
| 1 | 1 | 0 |
| 0 | 1 | 0 |

C8=148

| 1 | 0 | 1 |
|---|---|---|
| 1 | 1 | 0 |
| 1 | 0 | 0 |

C8=138

| Search Skeleton Data | | | | | |
|---|---|---|---|---|---|
| | Unit No. | Type | X | Y | Code 8 |
| | 1 | X | 105 | 30 | 128 |
| | | C | 106 | 31 | 72 |
| | | C | 106 | 32 | 132 |
| | | C | 107 | 33 | 136 |
| | | C | 108 | 34 | 72 |
| | | C | 109 | 34 | 146 |
| | | B | 110 | 35 | 73 |
| | | | | | |
| | 2 | B | 110 | 35 | 73 |
| | | C | 110 | 36 | 68 |
| | | C | 110 | 37 | 68 |
| | | C | 110 | 38 | 68 |
| | | C | 110 | 39 | 68 |
| | | E | 110 | 40 | 4 |
| | | | | | |
| | 3 | X | 122 | 32 | 72 |
| | ⋮ | ⋮ | ⋮ | ⋮ | ⋮ |
| | | | | | |

FIG. 24

| Shape of Skeleton | Modification | |
|---|---|---|
| Short ridge | Deletion | Length of deleted skeleton |
| Whisker | Deletion | (Length of deleted skeleton) × (predetermined factor) |
| Island | a) Delete two skeleton constituting island<br>b) Smoothly connect two ending point | Length of added skeleton |
| Disconnection | Smoothly connect two ending point | Length of added skeleton |
| Twisted Disconnection | Shorten two ending points by fixed lenght and then Smoothly connect them | Sum of deleted length and added length of skeleton |
| Short Interval contact | a) Delete fixed length of Each of five skeletons constituting two bifurcations<br>b) Delete all skeletons between two bifurcations<br>c) Smoothly connect four end points in parallel | Sum of length of added skeleton |
| Twisted contact | a) Delete fixed length of Each of five skeletons constituting two bifurcations<br>b) Smoothly connect two end points | Sum of length of added skeleton |

FIG. 28B

| Type of minutia | | Difference in ridge | Processing on F-side skeleton data and paired minutia list | Penalty |
|---|---|---|---|---|
| Search tmS | File tmF | rF-rS | | |
| E | E | 0 | No processing because of matching | 0 |
| E | B | 0 | Separate skeleton near BPM | 1 |
| E | B | -1 | Separate skeleton far from BPM | 1 |
| E | B | 1 | Delete from paired minutia list | 5 |
| E | E | -1 | Connect to skeleton near BPM and then separate skeleton near BPM | 2 |
| E | E | 1 | Connect to skeleton far from BPM and then separate skeleton far from BPM | 2 |
| B | B | 0 | No processing because of matching | 0 |
| B | E | 0 | Connect skeleton far from BPM | 1 |
| B | E | -1 | Connect to skeleton near BPM | 1 |
| B | E | 1 | Delete from paired minutia list | 5 |
| B | B | -1 | Separate skeleton near BPM and then connect to skeleton near BPM | 2 |
| B | B | 1 | Separate skeleton far from BPM and then connect to skeleton far from BPM | 2 |
| E or B | B E or B B | ≥2 | Delete from paired minutia list | 5 |

Skeleton Pair List

| Search Skeleton Data | | | | File Skeleton Candidate | | | | Score |
|---|---|---|---|---|---|---|---|---|
| Unit No. | Type | X | Y | Unit No. | Type | X | Y | |
| 1 | X | 105 | 30 | 25 | C | 205 | 120 | 8 |
| | C | 106 | 31 | | C | 206 | 121 | |
| | C | 106 | 32 | | C | 206 | 122 | |
| | C | 107 | 33 | | C | 207 | 123 | |
| | C | 108 | 34 | | C | 208 | 123 | |
| | C | 109 | 34 | | X | 208 | 124 | |
| | B | 110 | 35 | | – | | | |
| 2 | B | 110 | 35 | 37 | B | 220 | 126 | 9 |
| | C | 110 | 36 | | C | 220 | 127 | |
| | C | 110 | 37 | | C | 220 | 127 | |
| | C | 110 | 38 | | C | 220 | 128 | |
| | C | 110 | 39 | | C | 220 | 129 | |
| | E | 110 | 40 | | E | 220 | 130 | |
| 3 | X | 122 | 32 | 52 | X | 222 | 115 | 12 |
| | .. | .. | .. | .. | .. | .. | .. | |

Example 1 of Search-side skeleton

Example 2 of Search-side skeleton

| Search-side skeleton | | File-side Skeleton | | Comment |
|---|---|---|---|---|
| Skeleton-of-interest side | Adjacent skeleton side | Corresponding skeleton side | Corresponding adjacent skeleton side | |
| Skeleton of interest | | Corresponding skeleton | | Used in all steps |
| Point of interest | | Corresponding point | | Used in all steps |
| Determinate paired minutiae | Determinate paired minutiae | Determinate minutiae | Determinate mated minutiae | Used in all steps |
| Determinate skeleton point | Determinate skeleton point | Determinate skeleton point | Determinate skeleton point | Used in all steps |
| Neighbor point | | Corresponding point candidate | | Used in all steps |
| | Reference point | | Reference point | Used in all steps |
| | Neighbor skeleton | | Corresponding neighbor skeleton | Used in sub-step 3-3 |
| Midpoint | | — | | |
| | Reference point | Corresponding point | Corresponding reference point | Used in sub-step 3-3 |
| Point of interest | | — | | |
| Outside check point/SX | | Corresponding point | | |
| | Reference point | | Corresponding reference point | |
| Point of interest | | Corresponding point | | |

FIG. 41

METHOD AND APPARATUS FOR ANALYZING STREAKED PATTERN IMAGE

BACKGROUND OF THE INVENTION

1. Field of the Invention

The present invention relates to an analyzing method and apparatus for aiding in the identification of a plurality of streaked pattern images, and more particularly to an analyzing method and apparatus for aiding in the identification of humans' fingerprints and the like.

2. Description of the Related Art

Fingerprints which are comprised of a multiplicity of ridges in streaked pattern are generally characterized by two significant features: they remain unchanged till the end of lives and they are unique, so that fingerprints have been traditionally utilized as a means for identifying or confirming humans. In a conventional fingerprint analysis, an examiner or expert witness visually compares two fingerprint data and determines whether minutiae on ridges on the fingerprints match in the two data. The examiner determines that the two fingerprints are identical when a certain number of pairs of minutia match between the two fingerprint data.

The minutia refers to an ending point or a bifurcation point of a line which forms part of a streaked pattern. Also, those minutiae which make pairs in two data (in this case, fingerprint data) are called the "paired minutia" or "mated minutia."

In trials, a document indicative of relevancies between confirmed paired minutiae is submitted together with two fingerprint pictures placed side by side, and fingerprint gray-scale images. In judicial practices in many countries, two fingerprints are recognized to be identical if there are approximately 12 sets of paieed minutiae found in two fingerprint data. Details on this concept are described in "The Science of Fingerprints-Classification and Uses," John Edgar Hoover, US DOJ, FBI; pp. 190-193, 1963.

In recent years, since computer-based fingerprint matching systems become increasingly pervasive, it is often the case that documents for trials are also created using such computers. In the United States of America, the fingerprint matching system has a function called a "Charting Function" which modifies a displayed image to readily identify paired minutiae on the screen. A semi-automated charting function has been previously implemented in fingerprint matching systems for practical use. With this fingerprint matching system, an examiner need not manually enter information on all paired minutiae, but the fingerprint identification system compares minutiae with one another, evaluates those minutiae which are conjugate, and automatically displays a group of the paired minutiae thus evaluated. The examiner confirms and/or modifies the displayed paired minutiae.

FIGS. 1 and 2 each illustrate exemplary fingerprint data which is displayed with the aid of the charting function. In these figures, the left-hand fingerprint is a latent, and the right-hand fingerprint is a mated fingerprint. Assume herein that the latent is subjected to a search, and fingerprints pertinent to the latent are retrieved from a multiplicity of mating fingerprints (file-side fingerprints). In the example illustrated in FIG. 1, corresponding minutiae are designated by the same numbers to clarify the correspondence therebetween. The fingerprint data illustrated in FIG. 2 are generated by modifying one of the fingerprint data in FIG. 1 such that respective paired minutiae shown in FIG. 1 are substantially horizontal.

However, when a latent of a low quality is identified using the conventional fingerprint matching system, the examiner must compare minutiae and is therefore burdened with such works. Also, it is difficult to determine whether or not ridges are identical in shape in regions in which no minutiae exist on fingerprints.

There are about 100 minutiae on a single finger. Thus, ten sets or more of paired minutiae determined to form pairs can be found even on different fingerprint data. Paying attention only to minutiae in the identification of fingerprints could result in an erroneous analysis result. FIGS. 3A and 3B show exemplary information on minutiae extracted from different fingerprints. FIG. 3A shows exemplary minutiae on a search-side fingerprint, while FIG. 3B shows an exemplary fingerprint which is similar but does not form a pair with the fingerprint of FIG. 3A. Points marked with a circle represent ending points, and points marked with a square represent bifurcation points. A short line segment extending from a minutia indicates a minutia direction. The minutia direction is defined in NIST data exchange standard definitions (Subsection 16.1.4). In FIGS. 3A and 3B, minutiae designated by the same numbers are those which are determined to be paired minutiae. However, it is difficult to determine whether or not the two fingerprints match with each other only from data on minutiae as shown in FIGS. 3A and 3B.

As illustrated in FIG. 4, when data on ridges are displayed together with data on minutiae, fingerprints can be determined to be different because they differ in the ridge structure even though the minutiae match with each other. However, since a low quality of a search-side fingerprint makes it difficult to confirm ridges, the analysis is difficult to perform through a comparison of a search-side fingerprint and file-side fingerprints.

Further, in the United States of America and the like which employ the jury in criminal procedures, it is desired to permit not only the expert in the identification of fingerprints (i.e., the examiner) but also general jurors to readily confirm fingerprint analysis results.

To solve problems as mentioned above, a visual confirmation can be facilitated by modifying distortions in fingerprint images to match one finger print image with the other fingerprint image, and displaying the modified fingerprint images side by side. For example, Japanese Patent No. 2885787 (JP-B-2885787) discloses a method of modifying distortions in an image based on the distance from a paired minutia to a core of a fingerprint.

However, the method of modifying distortions in an image described in JP-B-2885787 is difficult to apply if a fingerprint does not have a core. A fingerprint having no core is, for example, an arch pattern. Latents which require an analysis include a partial latent which does not have the center of fingerprint. It is also difficult to apply this method of modifying distortions in an image to modifications of images which represent these fingerprints. In addition, this method of modifying distortions in an image can modify distortions only in a limited region near a paired minutia. This can reduce the effect of modifying distortions across the overall image. Particularly, the modification of distortions will produce extremely little effect if there are a small number of paired minutiae.

SUMMARY OF THE INVENTION

It is an object of the present invention to provide a method of analyzing a streaked pattern image which is capable of reducing a burden on an examiner and the like associated with the identification of a streaked pattern image such as a fingerprint, and improving an analysis accuracy.

It is another object of the present invention to provide an apparatus for analyzing a streaked pattern image which is capable of reducing a burden on an examiner and the like associated with the identification of a streaked pattern image such as a fingerprint, and improving an analysis accuracy.

The first object of the present invention is achieved by a streaked pattern image analyzing method for aiding in an analysis as to whether or not a first streaked pattern image matches a second streaked pattern image. The method includes the steps of modifying data on one of the first streaked pattern image and the second streaked pattern image such that a point on a first streaked pattern image which resides on a skeleton thinned from a streak of the streaked pattern image and having a corresponding point on the second streaked pattern image is brought closer to a point on a skeleton of the second streaked pattern image corresponding to the point, and delivering the modified streaked pattern image and the other streaked pattern image.

Preferably, in the present invention, the method may extract points, which have corresponding points on the second streaked pattern image, on a skeleton of the first streaked pattern image at predetermined intervals, and modify data on one of the first streaked pattern image and the second streaked pattern image such that each of the extracted points is brought closer to corresponding one of points on a skeleton of the second streaked pattern image. Since this method does not use all points on skeletons for modifying distortions, no excessive processing time is required for modifying distortions.

For example, the modified streaked pattern image may be superimposed on the other streaked pattern image before they are displayed. The superimposed image facilitates an observation on the matching degree of streaked pattern images.

Alternatively, for example, the modified streaked pattern image and the other streaked pattern image may be alternately displayed at the same position at constant switching intervals. This method, which takes advantage of afterimage, facilitates an observation on the matching degree of streaked pattern images.

The second object of the present invention is achieved by a streaked pattern image analyzing apparatus for aiding in an analysis as to whether or not a first streaked pattern image matches a second streaked pattern image. The apparatus includes image distortion modifying means for modifying data on one of the first streaked pattern image and the second streaked pattern image such that a point on a first streaked pattern image which resides on a skeleton thinned from a streak of the streaked pattern image and having a corresponding point on the second streaked pattern image is brought closer to a point on a skeleton of the second streaked pattern image corresponding to the point, and image display means for displaying the streaked pattern image modified by the image distortion modifying means and the other streaked pattern image.

In the apparatus according to the present invention, the image distortion modifying means preferably extracts points, which have corresponding points on the second streaked pattern image, on a skeleton of the first streaked pattern image at predetermined intervals, and modifies data on one of the first streaked pattern image and the second streaked pattern image such that each of the extracted points is brought closer to corresponding one of points on a skeleton of the second streaked pattern image. According to this configuration, since the apparatus does not use all points on skeletons for modifying distortions, no excessive processing time is required for modifying distortions.

For example, the image display means may superimpose the streaked pattern image modified by the image distortion modifying means on the other streaked pattern image, and display the resulting image. The superimposed image facilitates an observation on the matching degree of streaked pattern images. Alternatively, the image display means may display, for example, each of the streaked pattern images which comprises a gray-scale image that represents a streaked pattern by changing the density of color.

The apparatus according to the present invention preferably includes density changing means for changing the density of color in the gray-scale image. This configuration further facilitates the observation on the matching degree of streaked pattern images.

The image display means may deliver a skeleton image, for example, as each streaked pattern image.

The apparatus according to the present invention is preferably provided with skeleton color changing means for changing a color of skeletons in the skeleton images. This configuration, which changes the color of skeletons. facilitates the observation on the matching degree of streaked pattern images.

For example, the image display means may alternately display the streaked pattern image modified by the image distortion modifying means and the other streaked pattern image at the same position at constant switching intervals. This configuration, which takes advantage of afterimage, facilitates the observation on the matching degree of streaked pattern images.

The apparatus according to the present invention may further includes minutia matching means for identifying paired minutiae, which have been brought into correspondence between the first streaked pattern image and the second streaked pattern image, from minutiae on skeletons, and correspondence establishing means for identifying one of points on skeletons of the second streaked pattern image, corresponding to a point on a skeleton of the first streaked pattern image, using the paired minutiae identified by the minutia matching means, to bring the points on the skeletons into correspondence with each other, wherein the image distortion modifying means modifies data on one of the first streaked pattern image and the second streaked pattern image such that the points on the skeletons brought into correspondence with each other by the correspondence establishing means are brought closer to each other.

In addition, the apparatus according to the present invention may further include correspondence relationship modifying means for aiding in a modification of information on the paired minutiae identified by the minutia matching means and information on the points on the skeletons brought into correspondence with each other by the correspondence establishing means, wherein the minutia matching means again identifies paired minutiae based on the information on the paired minutia and the information on the points on the skeletons modified by the correspondence relationship modifying means, and the correspondence establishing means again brings points on skeleton into correspondence with each other based on the information on the paired minutia and the information on the points on the skeletons modified by the correspondence relationship modifying means. According to this configuration, an examiner or the like can modify information on paired minutiae and the like, and as a result of the modification, can more appropriately modify distortions.

The apparatus may further include skeleton data modifying means for aiding in a modification of data on skeletons, wherein the minutia matching means again identifies paired minutiae based on the data on skeletons modified by the skeleton data modifying means, and the correspondence establishing means again brings points on skeletons into correspondence with each other based on the data on skeletons modified by the skeleton data modifying means. According to this configuration, an examiner or the like can modify information on skeleton data, and as a result of the modification, can more appropriately modify distortions.

The apparatus according to the present invention includes image distortion modifying means for modifying data on one of the first streaked pattern image and the second streaked pattern image such that a point on a first streaked pattern image which resides on a skeleton thinned from a streak of the streaked pattern image and having a corresponding point on the second streaked pattern image is brought closer to a point on a skeleton of the second streaked pattern image corresponding to the point, and image display means for displaying the streaked pattern image modified by the image distortion modifying means and the other streaked pattern image. Points on skeletons extend across the overall image, not in a partial region thereof. Therefore, the streaked pattern image analyzing apparatus can not only modify a partial region of an image but also evenly modify distortions across the overall image, and can also improve the accuracy for the modification of distortions. With the ability to appropriately modify distortions as mentioned above, the streaked pattern image analyzing apparatus, when used, can facilitate analyses of fingerprints and the like.

BRIEF DESCRIPTION OF THE DRAWINGS

FIGS. 1 and 2 are diagrams illustrating exemplary fingerprint data which are displayed with the aid of a charting function;

FIG. 4 is a diagram illustrating an exemplary matching of a fingerprint with minutiae and ridges;

FIGS. 10A to 10C are diagrams for describing a modification of distortions in a gray-scale image;

FIGS. 12A to 12C are diagrams for describing a modification of distortions in a gray-scale image;

FIGS. 14A to 14C are diagrams for describing how a file-side fingerprint gray-scale image is superimposed on a search-side fingerprint gray-scale image to display the resulting superimposed image;

FIG. 18 is a diagram showing an example of switching displayed images;

FIGS. 21A to 21D are diagrams each for describing mask patterns which show adjacent pixels around a skeleton point;

FIGS. 23A and 23B are diagrams each for describing Code 8;

FIG. 24 is a table showing an exemplary representation of skeleton data;

FIGS. 28A and 28B are diagrams showing exemplary paired minutiae which are in an opposing relationship;

FIG. 30 is a table showing rules which define the specifics of modifications that can be made to the F-side skeleton data;

FIG. 36 is a table showing an exemplary skeleton point correspondence list;

FIG. 41 is a table showing a correspondence of terms used for S-side (search-side) data to terms used for F-side (file-side) data;

DETAILED DESCRIPTION OF THE INVENTION

Figure 5:
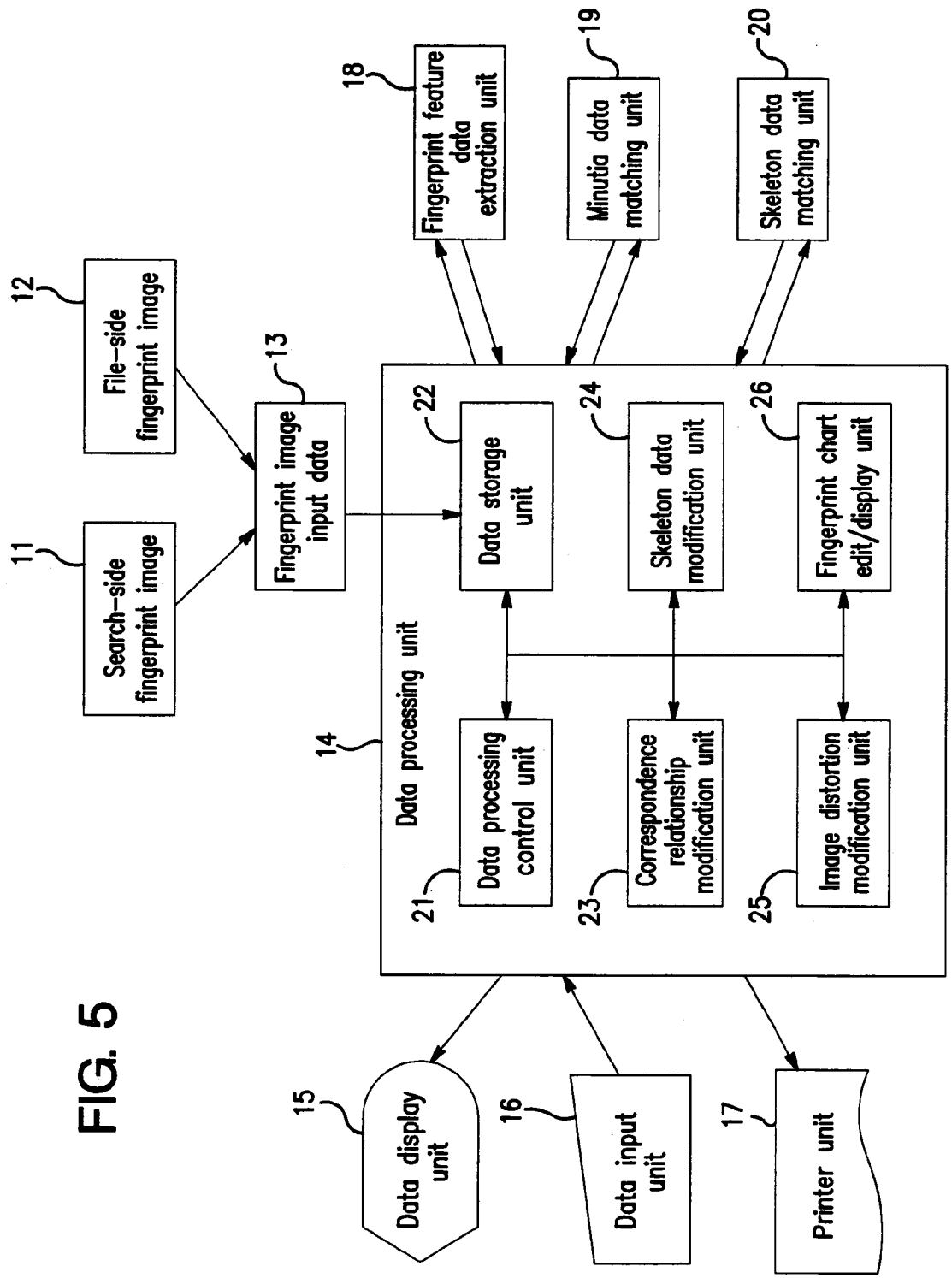
FIG. 5 is a flock diagram illustrating the configuration of a friction ridge analyzing apparatus which implements a streaked pattern image analyzing apparatus according to a first embodiment of the present invention.

FIG. 5 illustrates the configuration of a streaked pattern image analyzing apparatus according to one embodiment of the present invention. In the following, since identification of a fingerprint is given as an example for describing the streaked pattern image analyzing apparatus, this streaked pattern image analyzing apparatus is referred to as a friction ridge analyzing apparatus (i.e., fingerprint analyzing apparatus).

Thus, a possible user of the friction ridge analyzing apparatus which implements the streaked pattern image analyzing apparatus is generally an examiner or a fingerprint expert witness.

The friction ridge analyzing apparatus comprises fingerprint image input unit 13; data processing unit 14; data display unit 15; data input unit 16; a printer unit 17; fingerprint feature data extraction unit 18; minutia data matching unit 19; and skeleton data matching unit 20.

Fingerprint image input unit 13 receives a fingerprint image which may be read by a fingerprint sensor or a scanner. This apparatus is intended to analyze a digitized fingerprint image. Fingerprint image input unit 13 may digitize an analog fingerprint image applied thereto. Alternatively, fingerprint image input unit 13 may receive previously digitized fingerprint image data. In the following description, data associated with one of two fingerprint images subjected to an analysis is labeled "search-side" or "S-side," and data associated with the other one is labeled "file-side" or "F-side." Generally, a latent is often referred to as the "search-side," and previously provided fingerprints as the "file-side." Fingerprint image input unit 13 is applied with both search-side fingerprint image 11 and file-side fingerprint image 12.

Data display unit 15, which comprises, for example, an image display device and the like, displays fingerprint images, minutiae, paired minutiae, skeletons, and the like. The skeleton refers to a thinned streak such as a ridge of a fingerprint and the like. Also, each point on a skeleton is referred to as a "skeleton point." Data input unit 16, which comprises an input device, for example, a mouse, a tablet or the like, is applied with instructions and the like from an examiner. Data input unit 16 is also applied with information on a point, a region or the like specified by the examiner. Printer unit 17, which comprises a printer, prints and delivers the result of an analysis (i.e., fingerprint chart) and the like.

Fingerprint feature data extraction unit 18 is generally involved in transformation of ridges on a fingerprint image applied thereto into skeletons, extraction of minutiae, and the like. Minutia data matching unit 19 matches data on minutiae on two fingerprints (i.e., a search-side fingerprint and a file-side fingerprint) applied thereto to calculate the similarity (i.e., matching score of the minutiae) of the minutia data. Minutia data matching unit 19 also creates a paired minutia list. The paired minutia list provides a set of information on paired minutiae which are brought into correspondence between the search-side and file-side fingerprint images. Skeleton data matching unit 20 matches data on skeletons on two fingerprints applied thereto to calculate the matching degree of the skeletons, i.e., a skeleton matching score. Skeleton data matching unit 20 also creates a skeleton point correspondence list. The skeleton point correspondence list provides a set of information on skeleton points which are brought into correspondence between the search-side and file-side fingerprint images to form pairs.

Data processing unit 14 generally supports a fingerprint image modification work made by the examiner, and edits information on two fingerprints in such a manner that the examiner can readily understand the information. Data processing unit 14 proceeds with the processing while it communicates data with components disposed external thereto, i.e., data display unit 15, data input unit 16, printer unit 17, fingerprint feature data extracting unit 18, minutia data matching unit 19, skeleton data matching unit 20, and the like. Data processing unit 14 comprises data processing control unit 21, data storage unit 22, correspondence relationship modification unit 23, skeleton data modification unit 24, image distortion modification unit 25, and fingerprint chart edit/display unit 26.

Data processing control unit 21 controls overall data processing unit 14 in accordance with a predetermined program, and communicates information with associated components external to data processing unit 14. Data storage unit 22 temporarily stores applied search-side fingerprint image 11 and file-side fingerprint image 12, and the like, and temporarily stores a variety of data such as minutia data, skeleton data, paired minutia list, skeleton point correspondence list, and the like.

Correspondence relationship modification unit 23 supports the examiner in modifications associated with points which correspond between the search-side and file-side fingerprint images. Skeleton data modification unit 22 supports the examiner in modifications associated with skeleton data on the search side and file side fingerprint images.

Image distortion modification unit 25 modifies distortions on images and skeleton data on the search-side and file-side fingerprint images using a paired minutia list and a skeleton point correspondence list applied thereto. Fingerprint chart edit/display unit 26 edits the correspondence relationship between the search-side fingerprint and file-side fingerprint in such a manner that the examiner can readily understand the resulting correspondence relationship. Fingerprint chart edit/display unit 26 also display edited data on data display unit 15.

In this embodiment, data processing control unit 21, correspondence relationship modification unit 23, skeleton data modification unit 24, image distortion modification unit 25, and fingerprint chart edit/display unit 26 are implemented by the execution of a software application which may run, for example, on the same data processing apparatus or computer.

Next, the operation performed by the foregoing friction ridge analyzing apparatus for analyzing a fingerprint will be described with reference to a flow chart of FIG. 6.

Figure 7B:
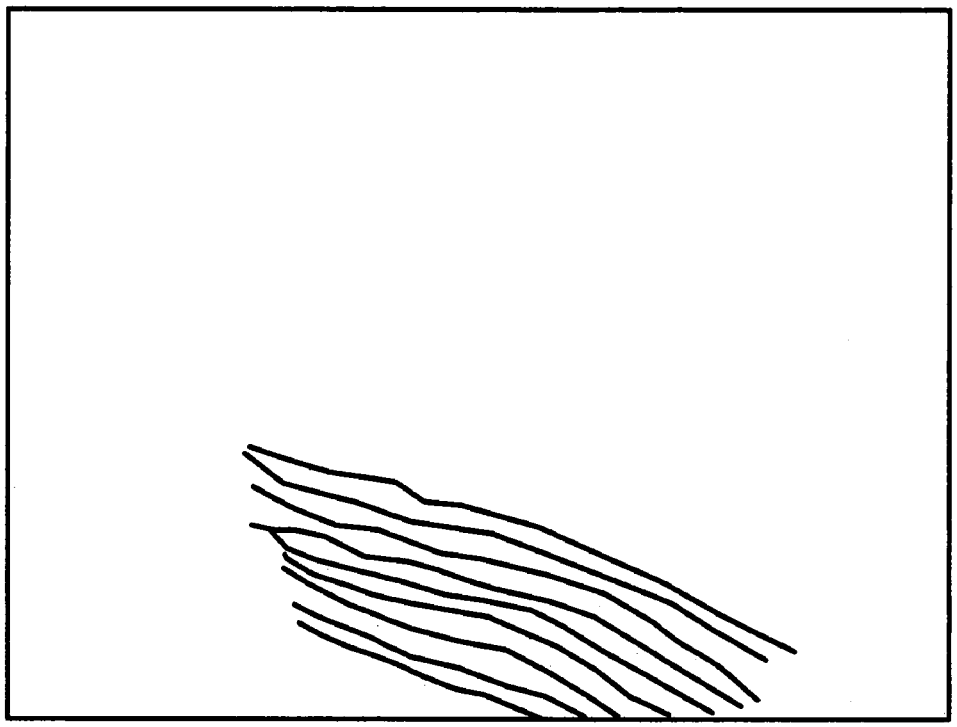
FIGS. 7A and 7B are diagrams illustrating examples of digitized fingerprint images.
Figure 7A:
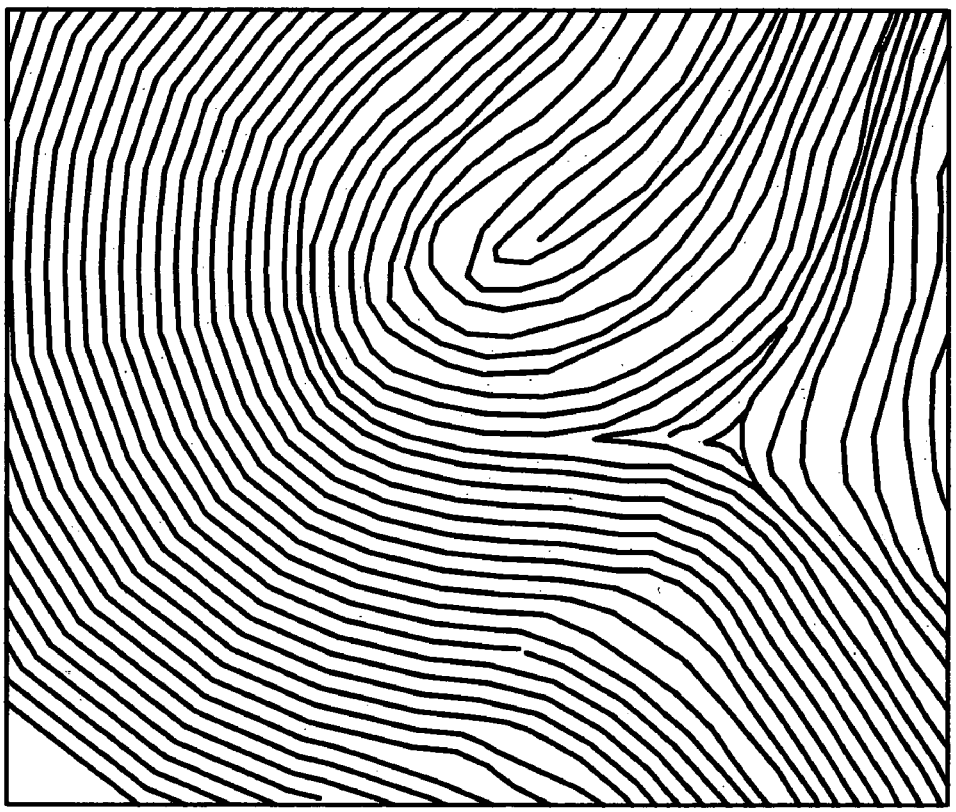

First, fingerprint image input unit 13 is applied with search-side fingerprint image 11 and file-side fingerprint image 12. In an example given in the description made herein, search-side fingerprint image 11 and file-side fingerprint image 12 are previously digitized into digital image data. FIGS. 7A and 7B illustrate examples of digitized fingerprint images. Specifically, FIGS. 7A and 7B illustrate exemplary images of a rolled fingerprint and a latent, respectively, which are digitized at an image resolution of 500 dpi (dots per inch) in accordance with ANSI/NIST-CSL-1-1993 Data Format for the Interchange of Fingerprint, Facial & SMT information which has been standardized by National Institute of Standards and Technology in the United States of America. In the example given in the following description, such digitized fingerprint images are subjected to the analysis. The description will be also made on the assumption that a rolled fingerprint as illustrated in FIG. 7A is applied as file-side fingerprint image 12, and a latent as illustrated in FIG. 7B is applied as search-side fingerprint image 11.

Referring back to FIG. 6, at step A501, fingerprint image input unit 13 transfers received search-side fingerprint image 11 and file-side fingerprint image 12 to data processing unit 14 which temporarily stores received fingerprint images 11, 12 in data storage unit 22, and also displays the images on data display unit 15. Alternatively, instead of applying both search-side fingerprint image 11 and file-side fingerprint image 12, one of the two images may be applied to fingerprint image input unit 13. For example, file-side fingerprint image may have been previously stored in the apparatus, so that search-side fingerprint image 11 alone can be applied at step A501.

Subsequently, at step A502, data processing control unit 21 in data processing unit 14 determines whether or not data related to skeletons and minutiae should be extracted from search-side fingerprint image 11 and file-side fingerprint image 12. For example, data processing control unit 21 determines that data related to skeletons and minutiae should be extracted when the examiner supplies an instruction to data input unit 16 to extract such data. Alternatively, data processing control unit 21 may automatically determine that the data related to skeletons and minutiae should be extracted when there have not been data on skeletons and minutiae on search-side fingerprint image 11 and file-side fingerprint image 12 which have been applied at step A501.

When data processing control unit 21 determines at step A502 that the data related to skeletons and minutiae should be extracted, the apparatus extracts skeleton data and minutia data from the fingerprint images, and displays the extracted skeletons and minutiae on data display unit 15 at step A503. At step A503, data processing control unit 21 reads search-side fingerprint image 11 and file-side fingerprint image 12 from data storage unit 22 for transfer to fingerprint feature data extraction unit 18.

Figures 8A, 8B:
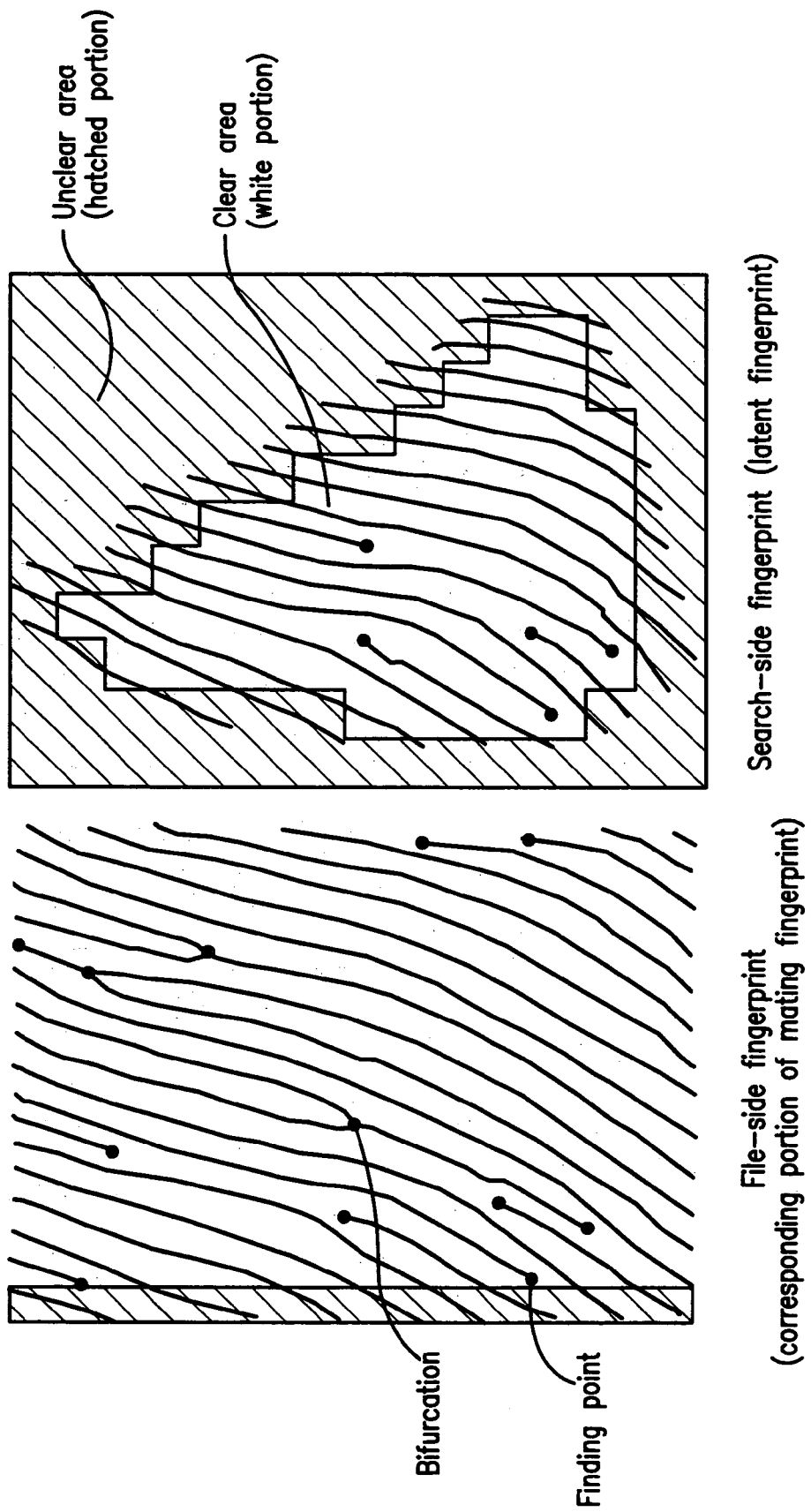
FIGS. 8A and 8B are diagrams illustrating examples of extracted skeletons.

Fingerprint feature data extraction unit 18 binarizes the received fingerprint images, and then transforms ridges on the images into skeletons to extract skeleton data. The binarization of fingerprint images and transformation of ridges into skeletons can be implemented by known techniques as described, for example, in Japanese Patent Publication No. 60-12674 (JP-B-60-12674) and U.S. Pat. No. 4,310,827 corresponding thereto. FIGS. 8A and 8B illustrate examples of skeletons extracted from the fingerprint images shown in FIGS. 7A and 7B, respectively. Skeleton data illustrated in FIGS. 8A and 8B shows whether each rectangular area comprised of 16 pixels horizontal and 16 pixels vertical presents a high or a low data reliability. The rectangular area composed of 16 pixels×16 pixels is called the "zone area" or simply the "zone." In FIGS. 8A and 8B, a region which includes a zone with a low data reliability, i.e., an unclear region is indicated by hatchings. While a skeleton is represented by individual black pixels which streak sequentially in a vertical direction, a horizontal direction or an oblique direction, skeletons in FIGS. 8A and 8B are shown as smooth curves. Skeletons are shown in a similar manner as well in FIGS. 9A and 9B onward.

Figure 9B:
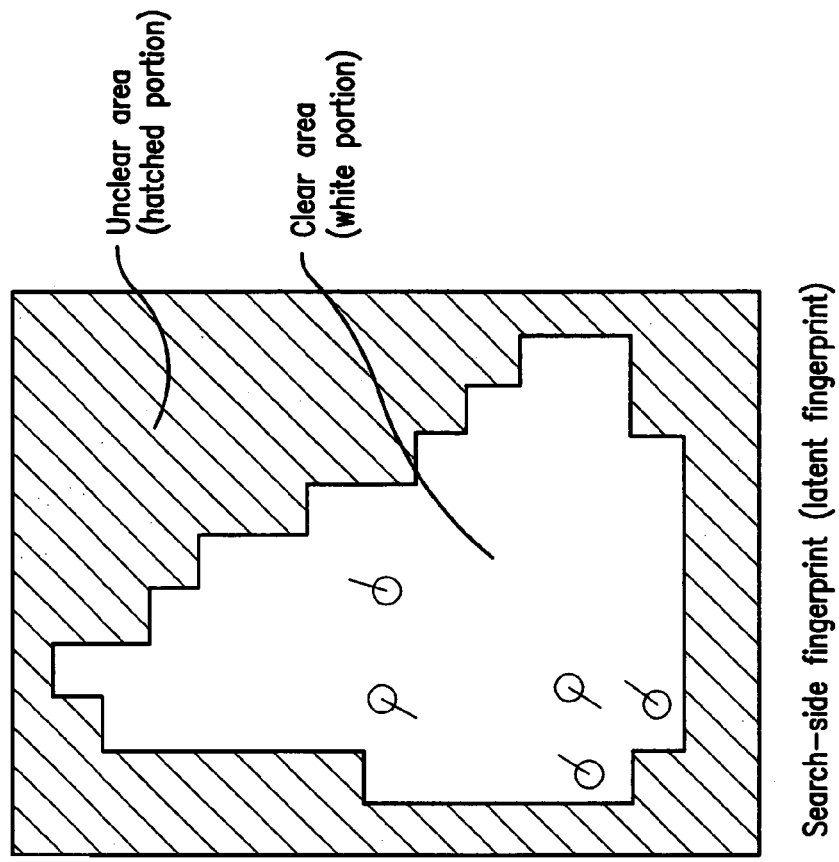
FIGS. 9A and 9B are diagrams illustrating examples of extracted minutiae.
Figure 9A:
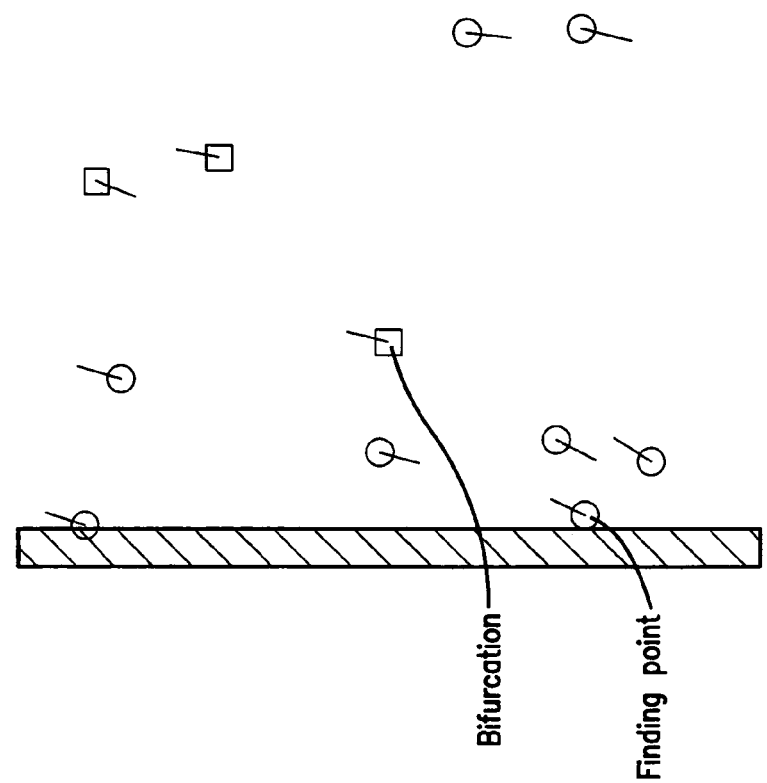

Upon extraction of skeleton data, fingerprint feature data extraction unit 18 extracts minutiae data (ending points and bifurcation points) from the skeleton data. This minutia extraction can be implemented by known techniques as described, for example, in JP-B-60-12674 (or U.S. Pat. No. 4,310,827). FIGS. 9A and 9B illustrate exemplary minutiae extracted from the fingerprint images shown in FIGS. 7A and 7B, respectively. In FIGS. 9A and 9B, bifurcation points extracted as minutiae are indicated by squares, and ending points by circles. Also, in FIGS. 9A and 9B, a short line segment extending from each minutia indicates a minutia direction.

Fingerprint feature data extraction unit 18 sends the extracted skeleton data and minutia data to data processing unit 14. Data processing control unit 21 in data processing unit 14 stores the skeleton data and minutia data in data storage unit 22, and displays images indicative of the states of the skeletons and minutiae illustrated in FIGS. 8A, 8B, 9A and 9B on data display unit 15 based on the skeleton data and minutia data. This concludes the processing at step A503.

Subsequent to step A503, data processing control unit 21 determines whether or not S-side minutiae are matched with F-side minutiae at step A504. The determination at step S504 is made not only at the end of step A503 but also at step A502 at which data processing control unit 21 determines that data related to skeletons and minutiae are not extracted. Data processing control unit 21 determines that S-side minutiae should be matched with F-side minutiae, for example, when the examiner applies data input unit 16 with an instruction to match the minutiae. Alternatively, data processing control unit 21 may automatically determine that the matching should be performed when there has been no result of matching minutiae.

When data processing control unit 21 determines at step A504 that S-side minutiae should be matched with F-side minutiae, the friction ridge analyzing apparatus matches the minutiae at step A505 and displays those minutiae which are determined to form pairs in association with each other on data display unit 15. At step A505, data processing control unit 21 reads S-side minutia data, F-side minutia data and the like from data storage unit 22 for transfer to minutia data matching unit 19.

Minutia data matching unit 19 matches the S-side minutia data with the F-side minutia data. Specifically, minutia data matching unit 19 brings minutiae which should form pairs into correspondence with each other, and creates a paired minutia list which shows the correspondence relationship between the S-side minutiae and F-side minutiae. Minutia data matching unit 19 also calculates matching scores for respective paired minutiae. This matching processing can be implemented by known techniques as described, for example, in JP-A-59-778 and U.S. Pat. No. 4,646,352 corresponding thereto.

Figure 1:
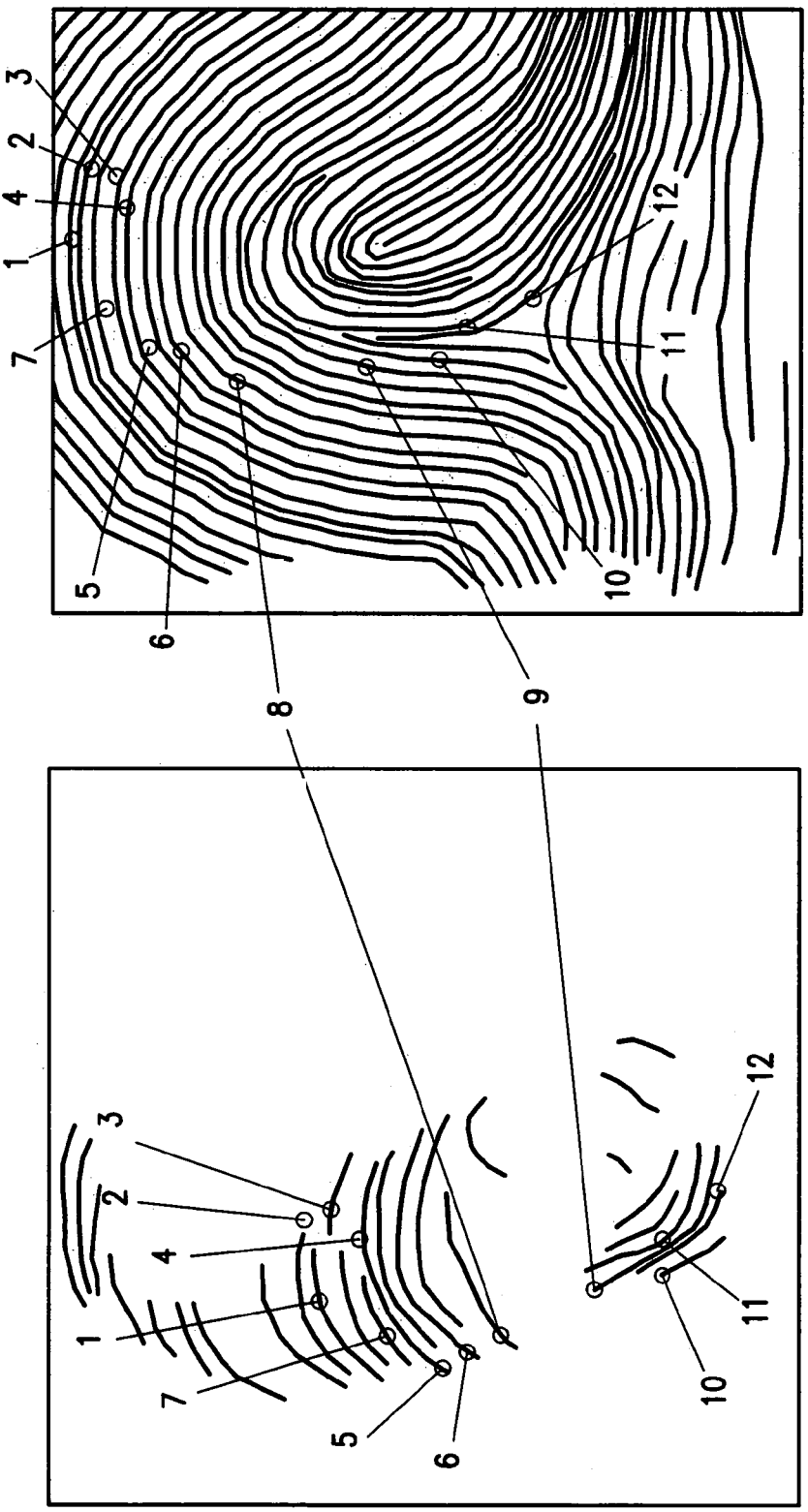
Figure 3B:
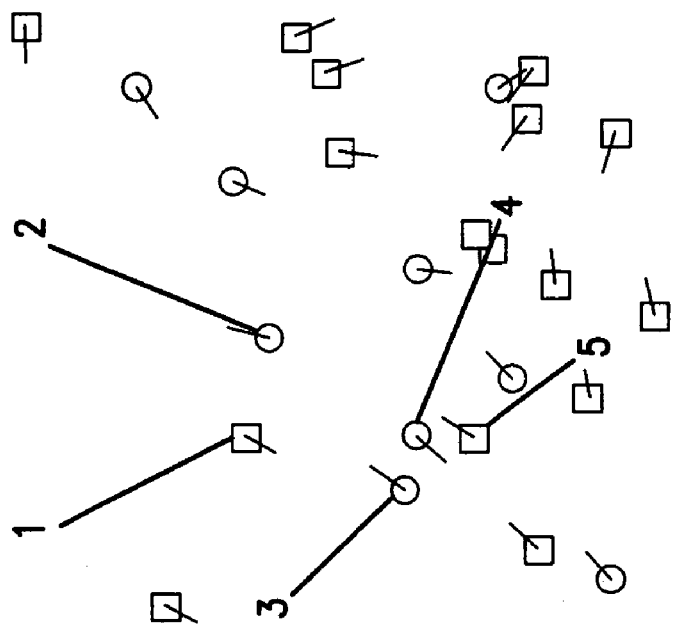
FIGS. 3A and 3B are diagrams illustrating an exemplary matching of a fingerprint only with minutiae.
Figure 3A:
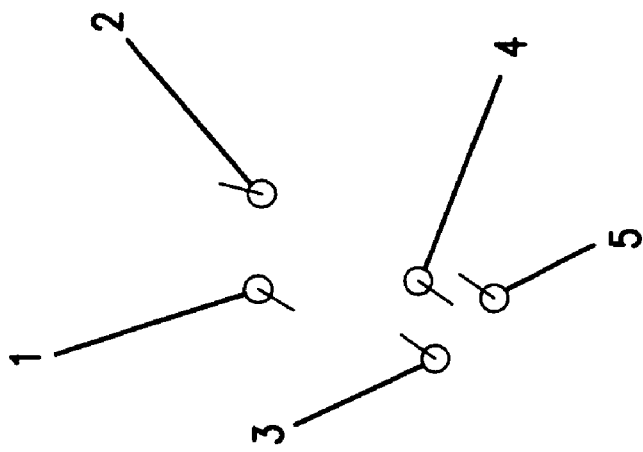

Minutia data matching unit 19 sends the result of the matching, i.e., the matching scores calculated for respective paired minutiae and the paired minutia list to data processing unit 14. Data processing control unit 21 in data processing unit 14 stores the result of the matching in data storage unit 22, and displays minutiae which are determined to form pairs in association with each other on data display unit 15 based on the paired minutia list. For example, similar to those illustrated in FIGS. 1A and 1B, data processing control unit 21 may display paired minutiae, as determined to form pairs, with the same numbers designated thereto. Data processing control unit 21 also displays the matching scores for respective paired minutiae on data display unit 15. This concludes the processing at step A505.

Subsequent to step A505, data processing control unit 21 determines at step A506 whether or not S-side skeleton data should be matched with F-side skeleton data. The determination at step S506 is made not only at the end of step A505 but also at step A504 at which data processing control unit 21 determines that S-side minutiae are not matched with F-side minutiae. Data processing control unit 21 determines that S-side skeleton data should be matched with F-side skeleton data, for example, when the examiner applies data input unit 16 with an instruction to match the skeleton data. Alternatively, data processing control unit 21 may automatically determine that the matching should be performed when there has been no result of matching skeleton data.

When data processing control unit 21 determines at step A506 that the skeleton data should be matched, the apparatus matches the S-side skeleton data with the F-side skeleton data at step A507, and displays skeleton points determined to form pairs in association with each other on data display unit 15. At step A507, data processing control unit 21 reads S-side skeleton data, F-side skeleton data, paired minutia list and the like for transfer to skeleton data matching unit 20.

Skeleton data matching unit 20 matches the S-side skeleton data with the F-side skeleton data. Specifically, skeleton data matching unit 20 brings S-side and F-side skeleton points which should form pairs into correspondence with each other, and creates a skeleton point correspondence list which shows the correspondence relationship between the S-side skeleton point and F-side skeleton points. Skeleton data matching unit 20 also calculates matching scores for respective skeletons. Details on the matching of skeleton data will be described later.

Skeleton data matching unit 20 sends the result provided from the matching of the skeleton data, i.e., the matching scores for respective skeletons and the skeleton point correspondence list to data processing unit 14. Data processing control unit 21 stores the result of the matching in data storage unit 22, and displays skeleton points determined to form pairs in association with each other on data display unit 15 based on the skeleton point correspondence list. For example, similar to those illustrated in FIGS. 1A and 1B, data processing control unit 21 may display S-side and F-side skeleton points, as determined to form pairs, with the same numbers designated thereto. This concludes the processing at step A507. It should be noted that the number of skeleton points in pair is larger than the number of minutiae in pair, i.e., the paired minutiae. Sets of skeleton points which form pairs, demonstrated by data processing control unit 21 with numbers or the like, may be part of all sets of skeleton points.

Subsequent to step A507, data processing control unit 21 determines at step A508 whether or not a modification should be made to data on paired minutiae or data on skeleton points in pair. The determination at step A508 is made not only at the end of step A507 but also at step A506 at which data processing control unit 21 determines that skeleton data are not matched. Data processing control unit 21 determines that a modification should be made to data on paired minutiae and skeleton points in pair, for example, when the examiner applies data input unit 16 with an instruction to modify the paired minutiae and the like.

Upon determining that a modification should be made to the paired minutiae and the like, data processing control unit 21 reads a variety of data including the paired minutia list, skeleton point correspondence list, fingerprint images and the like stored in data storage unit 22. Then, correspondence relationship modification unit 23 displays points which form pairs in association with each other on data display unit 15 based on the data read by data processing control unit 21. In this event, for example, similar to those illustrated in FIGS. 1A and 1B, data processing control unit 21 may display points which form pairs with the same numbers designated thereto. Alternatively, the correspondence relationship may be demonstrated by connecting points which form a pair with a line segment.

Subsequently, correspondence relation modification unit 23 prompts the examiner to modify information on points which form pairs in the S-side and F-side fingerprint images at step A509. Representative modifications to information on points which form pairs may be classified, for example, into the following three types. Correspondence relationship modification unit 23 provides GUI (Graphic User Interface) to prompt the examiner to make modifications as exemplified below.

A first modification involves addition of a corresponding point. This modification is made when a minutia or a skeleton point on one of the S-side and F-side fingerprint images, which should form a pair on a counterpart on the other fingerprint image, is not displayed as a point which forms a pair with that minutia or skeleton point, for adding such a minutia or skeleton point as a point which forms a pair. Correspondence relationship modification unit 23 modifies the paired minutia list or skeleton point correspondence list by pairing a point on the S-side fingerprint image with a point on the F-side fingerprint image specified by the examiner using data input unit 16. Also, correspondence relationship modification unit 23 displays the points specified by the examiner with the same number designated thereto, thereby showing that these points are brought into correspondence with each other.

A second modification involves deletion of a corresponding point. This modification is made when minutiae or skeleton points which do not essentially form pairs between the S-side fingerprint image and the F-side fingerprint image are displayed as those which form pairs for removing the correspondence relationship. As the examiner specifies paired minutiae or skeleton points which form a pair using data input unit 16, correspondence relationship modification unit 23 deletes information on the specified paired minutiae or skeleton points from the paired minutia list or skeleton point correspondence list. Correspondence relationship modification unit 23 also erases the display of numbers or the like which indicate points which form pairs.

A third modification involves a movement of a point on the S-side or F-side fingerprint image, which is displayed as a point that forms a pair with a point on the other fingerprint image. As the examiner specifies a point which should be moved, and a destination through data input unit 16, correspondence relationship modification unit 23 updates positional information on points included in the paired minutia list and skeleton point correspondence list. Also, in response to the destination specified by the examiner, correspondence relationship modification unit 23 updates the position indicated by the number, and the like, and displays again the updated image.

Correspondence relationship modification unit 23 provides the examiner with GUI for specifying the position of a point and the destination of the point, so that the examiner utilizes the GUI to make a variety of modifications. As the examiner indicates the end of a modification, correspondence relationship modification unit 23 stores updated data, i.e., the updated paired minutia list, skeleton point correspondence list and the like in data storage unit 22. This concludes the processing at step A509.

Subsequent to step A509, data processing control unit 21 determines at step A510 whether or not skeleton data should be modified. The determination at step A510 is made not only at the end of step A509 but also at step A508 at which data processing control unit 21 determines that no modification is made to data on paired minutiae or data on skeleton points in pair. Data processing unit 21 determines that skeleton data should be modified, for example, when the examiner applies data input unit 16 with an instruction to modify the skeleton data.

Upon determining that the skeleton data should be modified, data processing control unit 21 reads a variety of data such as the skeleton data, fingerprint images and the like stored in data storage unit 22. Skeleton data modification unit 24 displays the skeleton data and fingerprint images on data display unit 15 based on the data read by data processing control unit 21.

Subsequently, skeleton data modification unit 24 prompts the examiner to modify the skeleton data at step A511. For example, some skeletons may be cut as a result of an injury on a finger. When the fingerprint of such an injured finger is matched with that before the injury, skeleton data modification unit 24 makes a modification to connect cut skeletons. As the examiner specifies ending points of skeletons to be connected using data input unit 16, skeleton data modification unit 24 modifies skeleton data to connect the specified ending points to each other.

There may be a case where a location which should be essentially an ending point is connected to another skeleton to form a bifurcation point. Conversely, a minutia which is a bifurcation point may change to an ending point. As the examiner instructs a modification to these minutiae, skeleton data modification unit 24 modifies the skeleton data in accordance with the contents of the instruction.

The modification of such skeleton data can be implemented by known techniques as described, for example, in JP-A-2002-74381.

Skeleton data modification unit 24 provides the examiner with GUI for specifying the location of a modification and details on the modification, so that the examiner utilizes the GUI to make a variety of modifications. As the examiner instructs the end of a modification, skeleton data modification unit 24 stores updated skeleton data and the like in data storage unit 22. This concludes the processing at step A511.

Subsequent to step A511, data processing control unit 21 determines at step A512 whether or not distortions in the images should be modified. The determination at step A512 is made not only at the end of step A511 but also at step A510 at which data processing control unit 21 determines that skeleton data is not modified. Data processing control unit 21 determines that distortions in the images should be modified, for example, when the examiner applies data input unit 16 with an instruction to modify distortions in the images.

Upon determining that distortions in the images should be modified, data processing control unit 21 reads a variety of data such as fingerprint images, skeleton data, paired minutia list, skeleton point correspondence list and the like stored in data storage unit 22. Image distortion modification unit 25 modifies distortions in the images based on the data read by the data processing control unit 21, and displays images of the fingerprint images (gray-scale images) and skeleton data, after the distortions have been modified, on data display unit 15. The gray-scale image refers to an image which represents a streaked pattern by changing the density of color.

The modification of distorted images can be implemented by known techniques as described, for example, in JP-A-7-114649. JP-A-7-114649 discloses a method of reducing distortions in an image by specifying a vector on the image and transforming the image in accordance with the vector. Here, description will be made on an example of reducing distortions using the method described in JP-A-7-114649. When this method is applied, the coordinates of a point existing on the file-side fingerprint image are defined as the start point of a vector out of paired minutiae and skeleton points which form pairs. Also, the coordinates of a point on the search-side fingerprint image corresponding to each point on the file-side fingerprint image are defined as the ending point of the vector. Then, the file-side image data may be transformed or skeleton data may be modified in accordance with each vector which has the defined start point and ending point.

As described in JP-A-7-114649, the direction of a vector indicates the direction in which a point is moved, and the length of a vector indicates the distance over which the point is moved. Therefore, when the coordinates of a point existing on the file-side fingerprint image are defined as the start point of a vector, and the coordinates of a point on the search-side fingerprint image corresponding to each point on the file-side fingerprint image are defined as the ending point of the vector, distortions can be modified by bringing corresponding points closer to each other.

Points used to define vectors include skeleton points which form pairs as well as paired minutiae. However, vectors need not be defined for all skeleton points. For example, a skeleton point on the F-side fingerprint image and a corresponding skeleton point on the S-side fingerprint image may be extracted at predetermined intervals, for example, every several pixels to define a vector with each of the extracted skeleton points and each of the skeleton points on the F-side fingerprint image which forms part with that skeleton point. As a larger number of skeleton points are selected for defining vectors, distortions can be modified with a higher accuracy. However, since a longer time is required for the modification, it is preferred to select a number of skeleton points which permits the modification to be completed within an appropriate time period.

While distortions generally occur in data on both the S-side and F-side fingerprint images, data on the F-side fingerprint image is modified herein on the assumption that distortions occur only in data on the F-side fingerprint image.

FIGS. 10A to 10C illustrate a search-side fingerprint gray-scale image; a file-side gray-scale image which has been modified to remove distortions; and a file-side gray-scale image before the modification to remove distortions, respectively. There are five sets of paired minutiae, which form pairs, between the S-side data shown in FIG. 10A and the F-side data before the modification shown in FIG. 10C. In the following, a practical example will be given for describing how the image is modified to remove distortions therefrom.

Approximately 400 skeleton points were selected from among those skeleton points which formed pairs in the S-side data shown in FIG. 10A and the F-side data before a modification shown in FIG. 10C. The selection of skeleton points was made such that one skeleton point was selected every several pixels and skeleton points were evenly selected from the overall images. Then, vectors were defined, each starting from a point in one of five sets of paired minutiae and approximately 400 sets of skeleton points on the F-side data and ending at the counterpart on the S-side data. Also, the F-side gray-scale image was modified based on the thus defined vectors. The modified F-side gray-scale image is shown in FIG. 10B. Distortions are modified over the overall image because the skeleton points are evenly selected from all over the image.

Figure 11C:
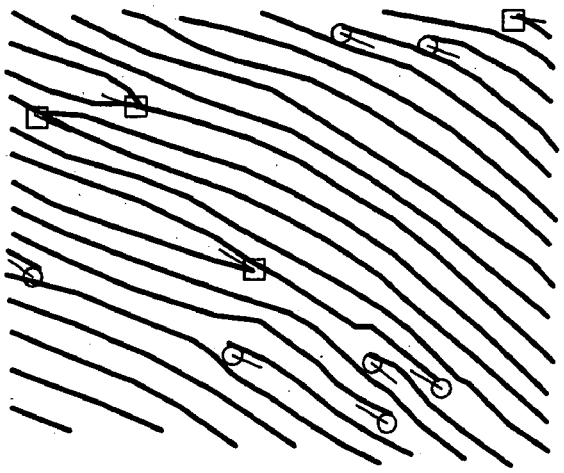
FIGS. 11A to 11C are diagrams for describing a modification of distortions in a skeleton image.
Figure 11B:
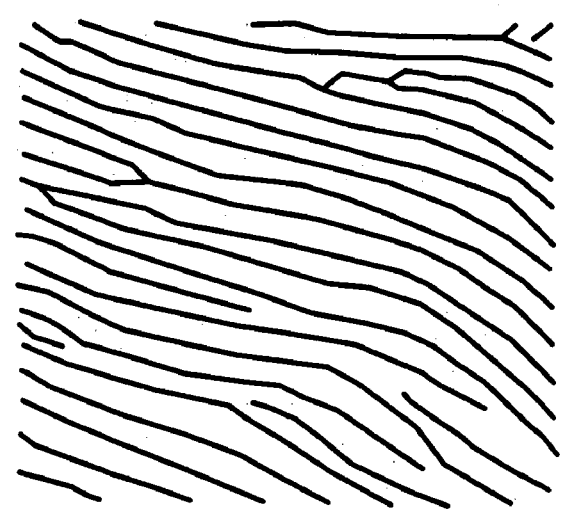
Figure 11A:
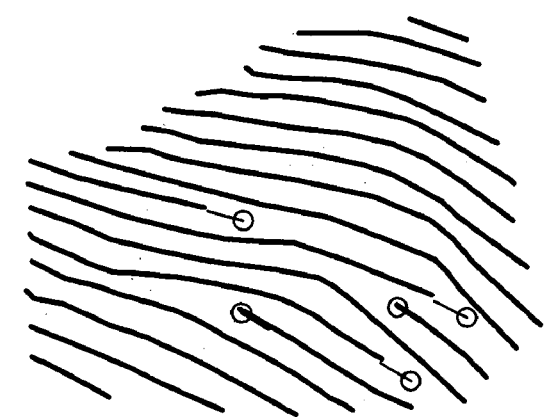

FIGS. 11A to 11C show a search-side skeleton image; a file-side skeleton image after a modification to remove distortions; and a file-side skeleton image before the modification, respectively. Specifically, FIGS. 11A to 11C show skeleton images which correspond to the gray-scale images shown in FIGS. 10A to 10C, respectively. Image distortion modification unit 25 displays the gray-scale image or skeleton image on data display unit 15 in response to an instruction from the examiner.

In the example given above, distortions were modified based on five sets of paired minutiae and approximately 400 sets of skeleton points. For comparison, description will be made on a modification of distortions based only on five sets of paired minutiae.

Figure 13C:
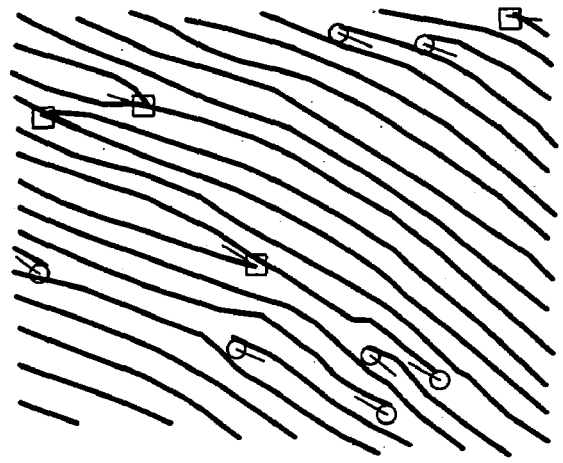
FIGS. 13A to 13C are diagrams for describing a modification of distortions in a skeleton image.
Figure 13B:
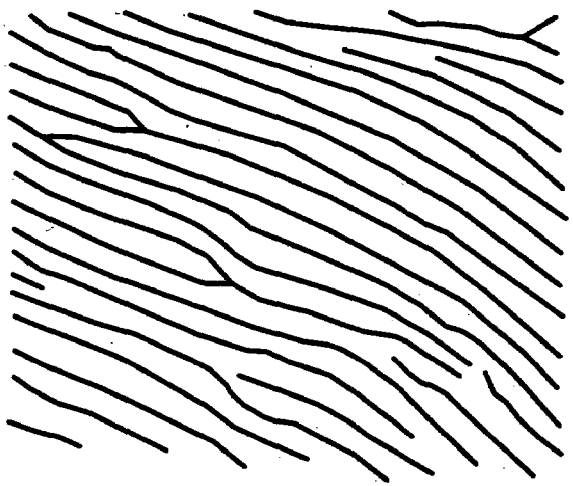
Figure 13A:
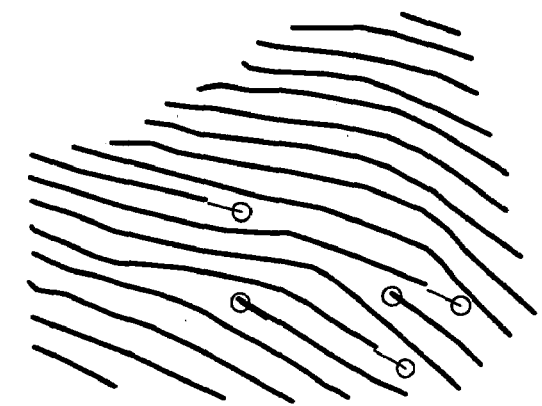

FIGS. 12A to 12C show a search-side fingerprint gray-scale image; a file-side gray-scale image which has been modified to remove distortions; and a file-side gray-scale image before the modification to remove distortions, respectively. FIGS. 12A and 12C show the same images as FIGS. 10A and 10C, respectively. There are five sets of paired minutiae, which form pairs, between the S-side data shown in FIG. 12A and the F-side data before modification shown in FIG. 12C. Vectors were defined, each starting from a point of paired minutiae on the F-side data and ending at the counterpart on the S-side data, and the F-side gray-scale image was modified based on the defined vectors. The modified F-side gray-scale image is shown in FIG. 12B. FIGS. 13A to 13C are skeleton images corresponding to FIGS. 13A to 13C, respectively.

In the images shown in FIGS. 12B and 13B, distortions are modified near regions in which paired minutiae exist. However, distortions are not sufficiently modified in regions away from paired minutiae. It is therefore preferred to select skeleton points from all over the images and defines vectors based on the skeleton points, as previously described with reference to FIGS. 10A to 10C and FIGS. 11A to 11C.

Image distortion modification unit 25 modifies a variety of data such as the fingerprint images, skeleton data, paired minutia list, skeleton point correspondence list, and the like, associated with the modification of the F-side data to remove distortions. Then, image distortion modification unit 25 stores a variety of modified data in data storage unit 22. This concludes the processing at step A513.

Subsequent to step A513, data processing control unit 21 determines at step A514 whether or not a fingerprint image under analysis is edited for display. The determination at step A514 is made not only at the end of step A513 but also at step A512 at which data processing control unit 21 determines that distortions in the images are not modified. Data processing control unit 21 determines that a fingerprint chart should be edited for display, for example, when the examiner applies data input unit 16 with an instruction to edit a fingerprint chart for display.

Upon determining that a fingerprint chart should be edited for display, data processing control unit 21 reads a variety of data such as the fingerprint images, skeleton data, paired minutia list, skeleton point correspondence list, and the like stored in data storage unit 22. At step A515, fingerprint chart edit/display unit 26 edits the image using the data read by data processing control unit 21, and displays the edited image on data display unit 15.

Now, description will be made on how the image is displayed at step A515. Fingerprint chart edit/display unit 26 displays an image in one of the following three modes, as requested by the examiner.

A first display mode involves displaying a search-side fingerprint image (gray-scale image) and a file-side gray-scale image modified to remove distortions which are placed side by side. For example, the images shown in FIGS. 10A and 10B are displayed side by side. The side-by-side display of the S-side gray-scale image and F-side gray-scale image modified to remove distortions permits the examiner to readily compare both images.

A second display mode involves superimposing the file-side gray-scale image modified to remove distortions on the S-side gray-scale image. FIGS. 14A to 14C show an example of how one gray-scale image is superimposed on another gray-scale image for display. Specifically, FIGS. 14A and 14C show a search-side gray-scale image and a file-side gray-scale image after it has been modified to remove distortions. FIG. 14B shows a gray-scale image resulting from the superimposition of the image shown in FIG. 14C on the image shown in FIG. 14A. Before generating the superimposed image shown in FIG. 14B, the density of the S-side and F-side images are reduced to 50%.

Additionally, the second display mode may involve automatically selecting a region in which minutiae are matched at step A505 and a region in which skeleton points are matched at step A507, and superimposing the file-side gray-scale image on the S-side gray-scale image in these regions. Alternatively, an F-side gray-scale image may be superimposed on an S-side gray-scale image only in a region specified by the examiner through data input unit 16. Further, for superimposing an F-side gray-scale image on an S-side one, the density of each pixel may be determined to be an average of the densities of the corresponding S-side and F-side gray-scale images. Moreover, the examiner may be allowed to specify the opacity for an S-side image or a F-side image. As the examiner specifies the density of an S-side or an F-side gray-scale image, fingerprint chart edit/display unit 26 changes the density of the gray-scale image in accordance with the specified value.

Figure 15C:
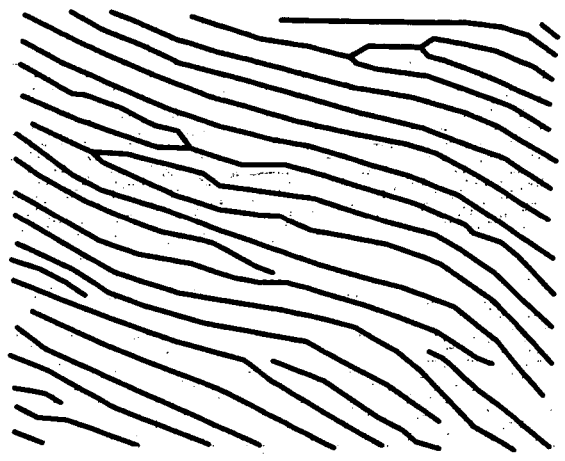
FIGS. 15A to 15C are diagrams for describing how a file-side fingerprint skeleton image is superimposed on a search-side fingerprint skeleton image to display the resulting superimposed image.
Figure 15B:
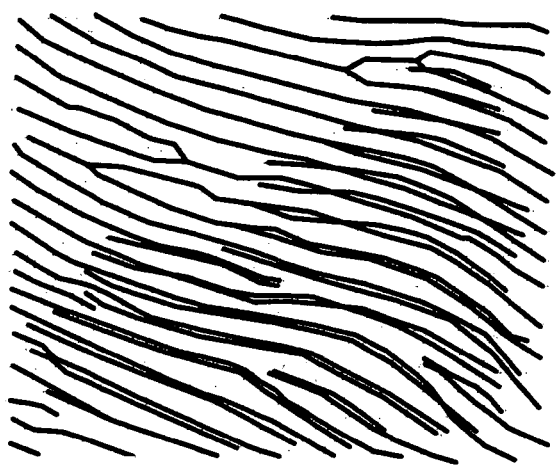
Figure 15A:
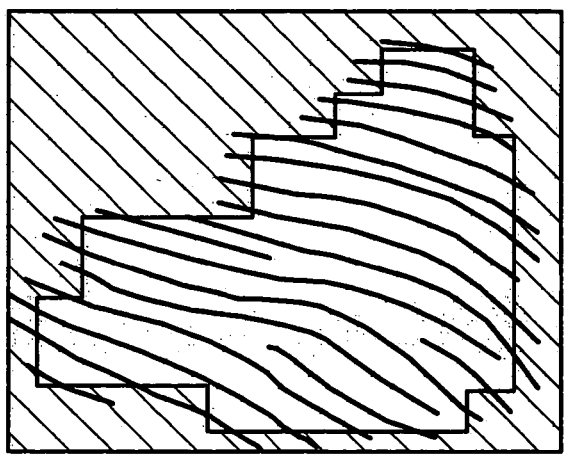

A third display mode involves superimposing an F-side skeleton image modified to remove distortions on an S-side skeleton image for display. FIGS. 15A to 15C show an example of how one skeleton image is superimposed on another skeleton image for display. Specifically, FIGS. 15A and 15C show a search-side skeleton image and a file-side skeleton image after it has been modified to remove distortions. FIG. 15B shows a gray-scale image resulting from the superimposition of the image shown in FIG. 15C on the image shown in FIG. 15A. As shown in FIG. 15B, since corresponding skeletons overlap in the resulting image, the examiner can readily identify that the two images represent the same fingerprint.

A skeleton image, which is a binary image, is composed of thin lines. Therefore, it can be readily seen how corresponding skeletons overlap on the resulting image, and hence readily analyze the fingerprint. Data input unit 16 may accept colors for use in displaying the S-side and F-side skeletons. In this event, when colors are specified through data input unit 16, fingerprint chart edit/display unit 26 displays the S-side skeletons and F-side skeletons in different colors in accordance with the specified colors. In addition, data input unit 16 may also accept a color specified for overlapping portions such that such overlapping portions are displayed in a different color from a color used for non-overlapping portions.

Figure 16C:
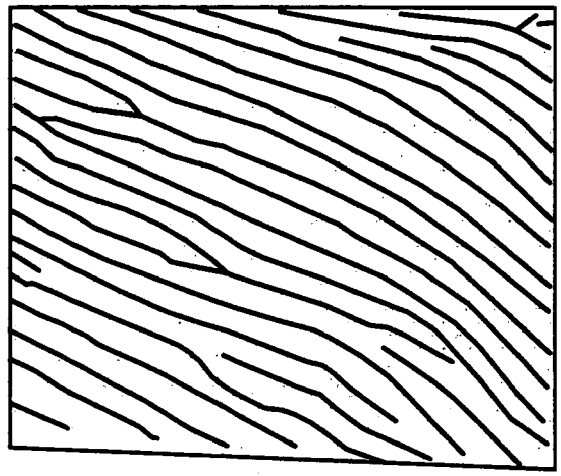
FIGS. 16A to 16C are diagrams for describing how a file-side fingerprint gray-scale image is superimposed on a search-side fingerprint gray-scale image to display the resulting superimposed image.
Figure 16B:
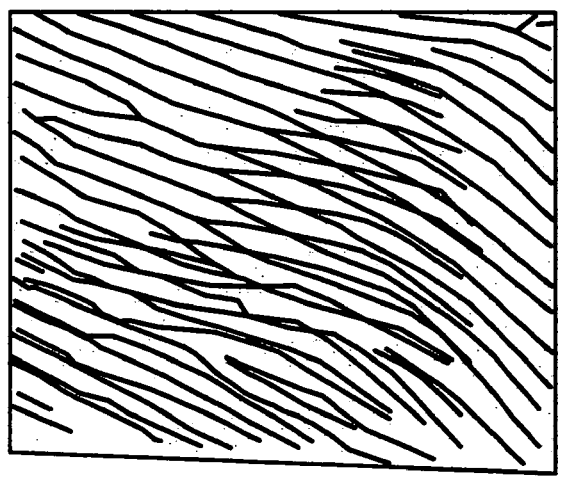
Figure 16A:
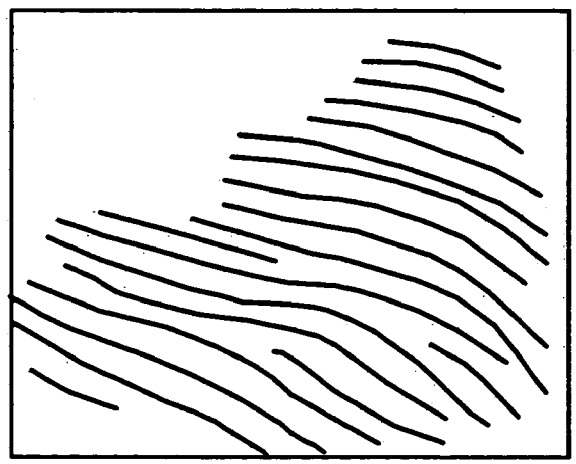

It should be noted that the images shown in FIGS. 14A to 14C and FIGS. 15A to 15C are examples in which distortions are modified using information on skeleton points as well as paired minutiae. For comparison, an exemplary superimposed image is shown, where the image is modified using only five sets of paired minutiae. FIG. 16A illustrates a search-side gray-scale image similar to that of FIG. 14A. FIG. 16C illustrates a file-side gray-scale image which has been modified to remove distortions using only five sets of paired minutiae. FIG. 16B illustrates an image resulting from the superimposition of the image in FIG. 16C on the image in FIG. 16A.

Figure 17C:
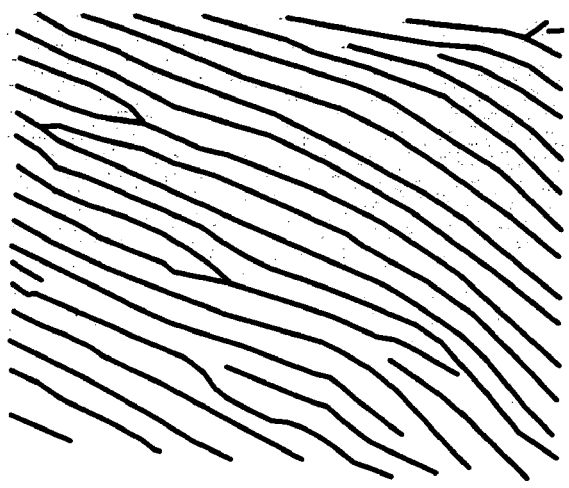
FIGS. 17A to 17C are diagrams for describing how a file-side fingerprint skeleton image is superimposed on a search-side fingerprint skeleton image to display the resulting superimposed image.
Figure 17B:
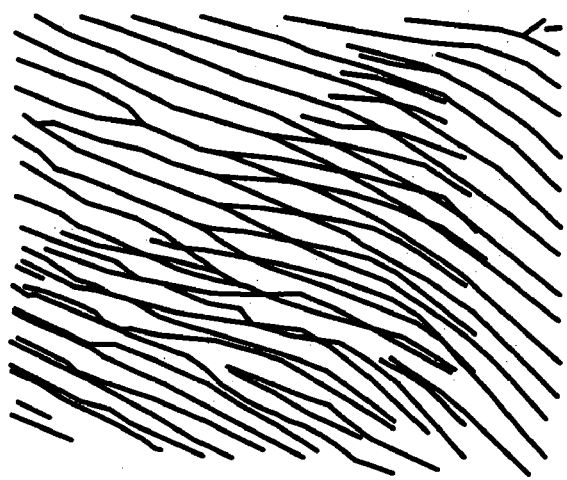
Figure 17A:
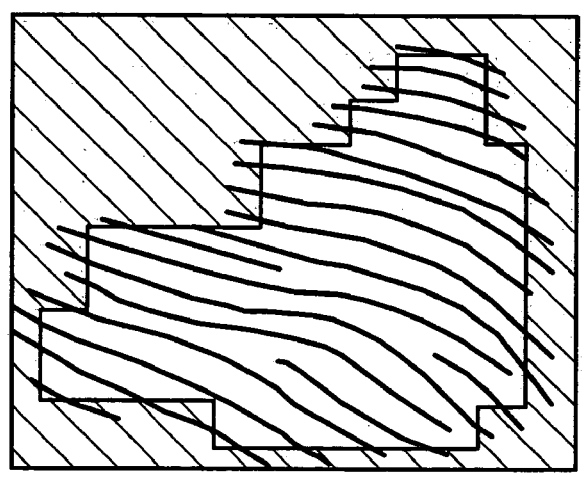

FIG. 17A illustrates a search side skeleton image similar to FIG. 15A. FIG. 17C illustrates a file-side skeleton image which has been modified to remove distortions using only five sets of paired minutiae. FIG. 17B illustrates an image resulting from the superimposition of the image in FIG. 17C on the image in FIG. 17A. In other words, FIGS. 17A to 17C illustrate skeleton images corresponding to FIGS. 16A to 16C, respectively. While FIG. 16B shows that the S-side and F-side skeletons overlap, FIG. 17B shows that the skeletons intersect with each other, making it difficult to identify the fingerprint. This is because in the later image, distortions are modified only near paired minutiae, as previously mentioned. It can be understood from the foregoing that the fingerprint can be readily identified if distortions are modified across the overall image using skeleton points.

Next, a fourth display mode will be described. The fourth display mode involves automatically switching an S-side fingerprint gray-scale image and an F-side fingerprint gray-scale image which has been modified to remove image distortions at regular intervals. The S-side fingerprint gray-scale image and F-side fingerprint gray-scale image are displayed at the same position. In other words, they are displayed such that they overlap if they are displayed simultaneously. The images are switched at intervals of 0.05 seconds (20 times per seconds) to 0.2 seconds (five times per second), by way of example. The switching of images at such intervals permits the examiner to compare an image before the switching, which remains as an afterimage, with a replaced image. It is therefore possible to readily compare the S-side image with the F-side image.

The fourth display mode may alternately switch only partial regions of images, rather than alternately switching entire images. For example, the fourth display mode may involve automatically selecting a region in which minutiae are matched at step A505, and a region in which skeletons are matched at step A507, and determining such regions as image switching regions. Alternatively, a region specified by the examiner through data input unit 16 may be determined as an image switching region.

FIG. 18 illustrates an S-side image and an F-side image which are switched at regular intervals. Note that only partial regions of the images are switched in an example shown in FIG. 18. Fingerprint chart edit/display unit 26 switches partial regions of the images to alternately display two types of images as illustrated in FIG. 18 on data display unit 15.

Fingerprint chart edit/display unit 26 displays images in a display mode in response to an instruction entered through data input unit 16. The display mode is not limited to the aforementioned first to fourth display modes alone. For example, an S-side fingerprint gray-scale image may be superimposed on an F-side skeleton image on data display unit 15. Alternatively, an F-side fingerprint gray-scale image may be superimposed on an S-side skeleton image on data display unit 15.

Fingerprint chart edit/display unit 26 also prints an image displayed on data display unit 15 in response to an instruction from the examiner. In this event, fingerprint chart edit/display unit 26 transmits data on the display screen to printer unit 17 through data processing control unit 21. Printer unit 17 prints the display screen based on the received data. This concludes the processing at step A515.

Subsequent to step A515, data processing control unit 21 determines at step S516 whether or not the processing at step A502 onward should be repeated. The determination at step A516 is made not only at the end of step A515 but also at step A514 at which data processing control unit 21 determines that a fingerprint image under analysis is not edited for display. Data processing control unit 21 repeats the processing at step A502 onward, for example, when the examiner applies data input unit 16 with an instruction to again process the fingerprint images. When the examiner instructs termination of the processing, data processing control unit 21 terminates the processing at step A516 in accordance with the instruction.

The examiner may enter the instruction to repeat the processing at step A502 onward, for example, when expected images are not displayed at step A515. In this way, it is possible to make modifications related to the paired minutiae and skeleton points, which form pairs, shown at step A509, as well as modifications to the skeleton data shown at step A511. Such modifications can result in the modification of image distortions at a higher accuracy, and delivery of a better fingerprint chart at step A515. Alternatively, the processing may be repeated from a particular step indicated by the examiner, rather than the repetition of the processing from step A502 onward after step A516. For example, after step A516, the operation may be repeated from step A506 onward.

Figure 6:
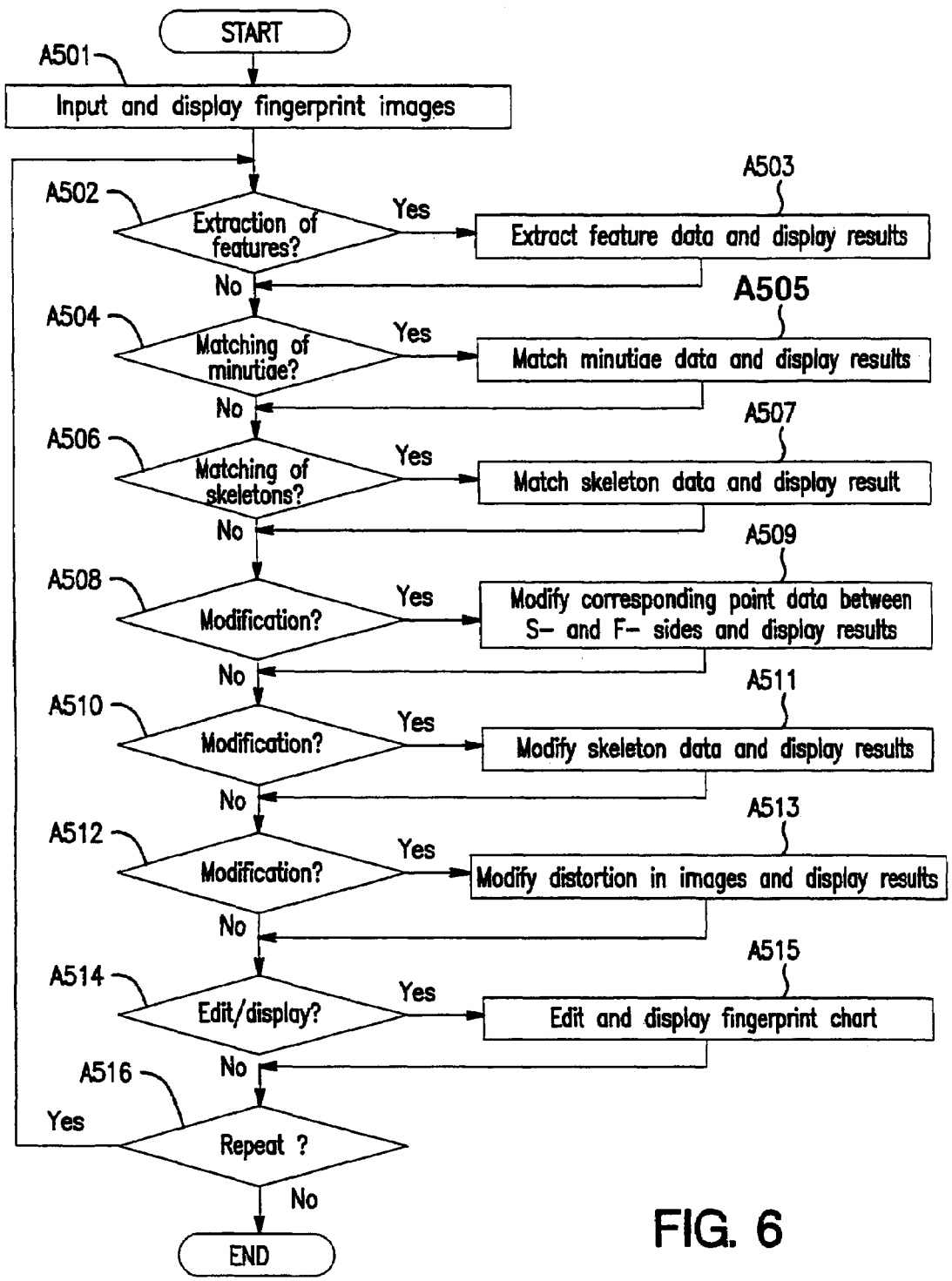
FIG. 6 is a flow chart illustrating a processing procedure for analyzing a fingerprint using the apparatus illustrated in FIG. 5.

It should be understood that the processing involved in the fingerprint analyzing method in this embodiment is not limited to the processing performed in the order illustrated in FIG. 6. The examiner may be allowed to determine the order in which the associated components of the fingerprint analyzing apparatus make a variety of determinations at steps A502, A504 and the like shown in FIG. 6, and execute the respective steps (step A503, A505 and the like) subsequent to these determinations.

While the description made above has taken an example in which the examiner operates the friction ridge analyzing apparatus (i.e., fingerprint analyzing apparatus), any person other than an expert on the analysis may operate the apparatus of the present invention.

According to the foregoing embodiment, one of a search-side and a file-side image is modified to reduce distortions in the image based on points which form pairs on the search-side and file-side images. Then, the modified image can be superimposed on the other image for display. Since the display of the superimposed image facilitates the determination as to whether the two fingerprints are identical, the analysis can be made easier.

The modification of distortions involves the use of a large number of skeleton points which form pairs on the S-side and F-side images as well as the paired minutiae. It is therefore possible to evenly modify distortions across the overall image, rather than only near the paired minutiae, resulting in an improved accuracy for the modification of distortions. As a result, the determination can be further facilitated as to whether or not the two fingerprints are identical when one image is superimposed on the other.

Also, in addition to the superimposition of a ridge line image on another ridge line image, the superimposition for display can be made with a skeleton image on another skeleton image, or a skeleton image on a ridge line image. The realization of such a display mode further facilitates the determination as to whether or not two fingerprints are identical.

According to the foregoing embodiment, the search-side image and file-side image are alternately displayed several times to 20 times per second. As a result, since this mode of display facilitates the determination as to whether or not two fingerprints are identical, the analysis can be made easier.

In addition, since the fingerprint analyzing apparatus according to the foregoing embodiment not only shows information on minutiae but also shows the structure of ridge lines and skeletons, any person, not limited to examiners, can readily determine whether or not two fingerprints are identical.

Figure 19:
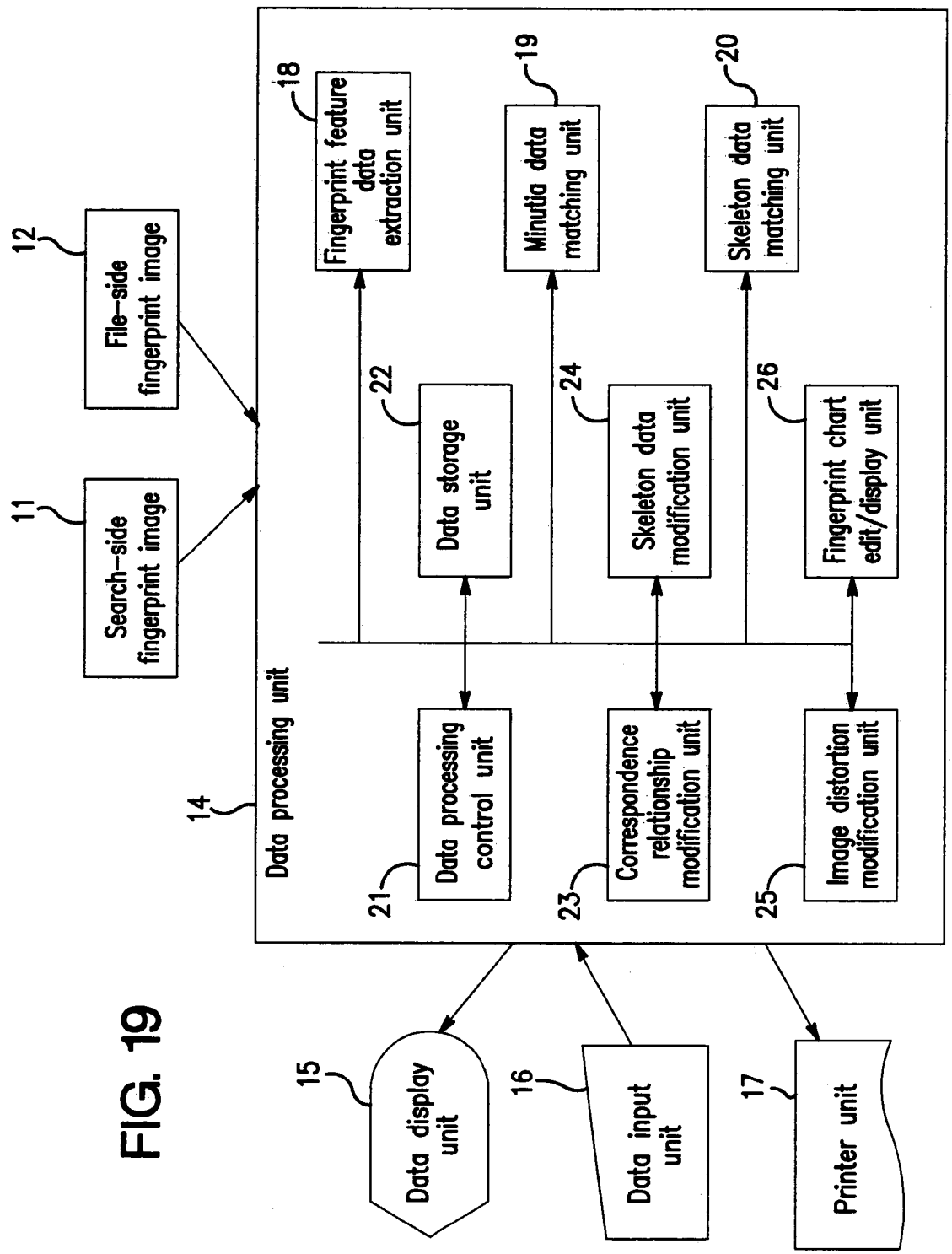
FIG. 19 is a block diagram illustrating the configuration of a friction ridge analyzing apparatus which implements a streaked pattern image analyzing apparatus according to another embodiment of the present invention.

Next, description will be made on a streaked pattern image analyzing apparatus according to another embodiment of the present invention. FIG. 19 illustrates the configuration of the streaked pattern image analyzing apparatus. Since this streaked pattern image analyzing apparatus will be described herein in connection with an example in which a fingerprint is identified, the streaked pattern image analyzing apparatus of this embodiment is also referred to as the friction ridge analyzing apparatus or fingerprint analyzing apparatus.

In the friction ridge analyzing apparatus illustrated in FIG. 5, search-side fingerprint data 11 and file-side fingerprint data 12 are entered through fingerprint image input unit 13. The apparatus may be associated with another fingerprint matching system such that this apparatus is applied with search-side fingerprint data 11 and file-side fingerprint data 12 from the fingerprint matching system. Assume that a fingerprint matching system previously saves file side fingerprint data in a database, and matches search side fingerprint data applied thereto with the stored file side fingerprint data. Data processing unit 14 may be applied with search side fingerprint data 11 and file side fingerprint data 12 from such a fingerprint matching system.

As illustrated in FIG. 19, in the fingerprint analyzing apparatus according to the other embodiment of the present invention, data processing unit 14 may contain fingerprint feature data extraction unit 18, minutia data matching unit 19, and skeleton data matching unit 20. Such a configuration can further facilitate the control. For example, the control can be facilitated by implementing in software the function of data processing unit 14, as well as the functions of fingerprint feature data extraction unit 18, minutia data matching unit 19 and skeleton data matching unit 20 in the same data processing apparatus or computer system.

Figure 20B:
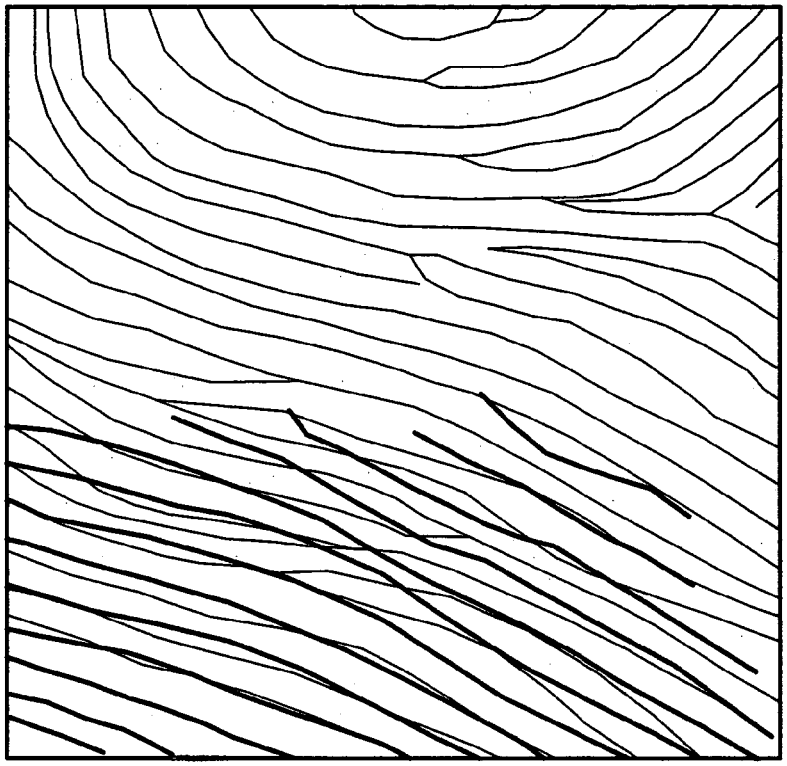
FIGS. 20A and 20B are diagrams for describing how a search-side image is modified.
Figure 20A:
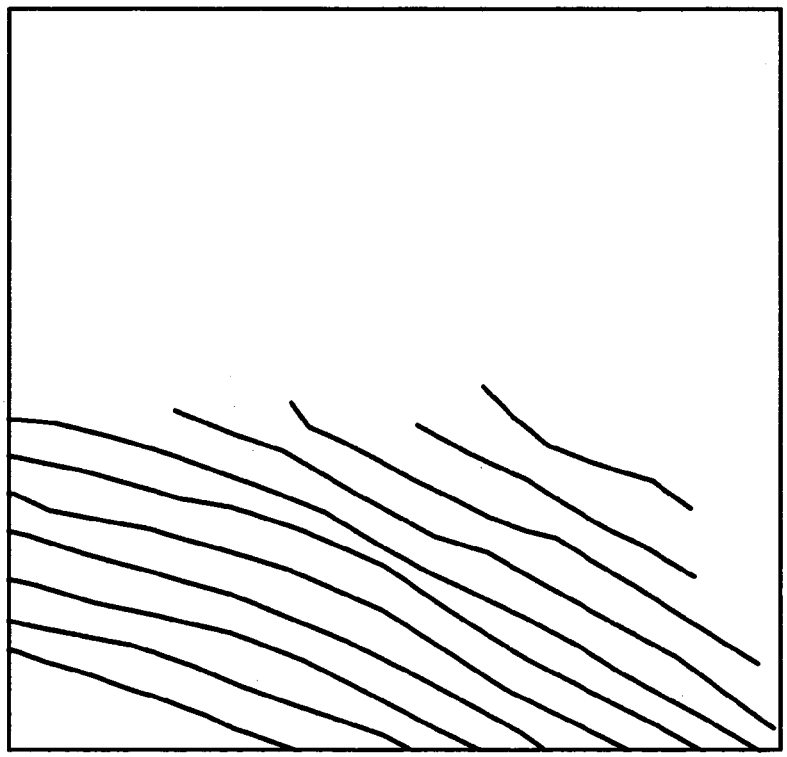

In connection with the flow chart illustrated in FIG. 6, description made for step A513 involves modifying file-side data to remove distortions in the image. Alternatively, at step A513, search-side data may be modified without modifying the file-side data. FIG. 20A illustrates a search side fingerprint gray-scale image which has been modified to remove image distortions. FIG. 20B illustrates an image in which a file-side skeleton image is superimposed on the search side fingerprint gray-scale image which has been modified to remove image distortions. As illustrated in FIG. 20B, even if data is modified on the search-side gray-scale image, the identity of the fingerprint can be determined by confirming the extent to which ridge lines on the search side image overlap skeletons on the file side image.

The applicable scope of the present invention is not limited to the analysis of fingerprint. For example, the present invention can be applied to any analysis on curves and the like which form a streaked pattern, such as a palm pattern and the like.

Next, description will be made on the processing for matching skeleton data by skeleton data matching unit 20, i.e., the creation of a skeleton point correspondence list, and the calculation of skeleton matching score. First described will be premises made for the skeleton data matching processing, data subjected to the processing, and the like.

The skeleton data matching processing is performed on the premise that there are at least three sets of paired minutiae included in the paired minutia list. Skeleton data matching unit 20 halts the skeleton data matching processing if there are two sets or less of paired minutiae included in the paired minutia list.

Skeleton data matching unit 20 processes skeleton data defined by eight linked adjacent pixels. This data comprises a black pixel which represents each point on a skeleton, i.e., at which a skeleton point exists, such that the type of a particular point can be discriminated from eight pixels near the particular point. FIG. 21A represents a mask pattern which shows a pixel representative of a skeleton point and eight points near the skeleton point. In the mask pattern shown in FIG. 21A, a black pixel is represented by "1," while a white pixel is represented by "0." Specifically, a pixel expressed by $Xn=1$ indicates a black pixel at which a skeleton point exists, and a pixel expressed by $Xn=0$ indicates a pixel other than a skeleton point, where $n=0$ to 8. In any case, eight locations (X1 to X8) near a skeleton point (X0) will never include four or more black pixels. In other words, a total sum of the values of the pixels X1 to X8 is equal to or less than three. Also, in this data, black pixels will not be located adjacent to each other within eight pixels near a certain black pixel. For example, both X1 and X2 will not take the value of "1" (representative of black pixel).

Skeleton points represented by the foregoing mask pattern can be classified into four: an ending point, a bifurcation point, a continuous point, and an extensive end point. The ending point (hereinafter indicated by "E") refers to a skeleton point with only one black pixel included in the eight adjacent pixels, as can be seen in FIG. 21B. The bifurcation point (hereinafter indicated by "B") refers to a skeleton point with three black pixels included in the eight adjacent pixels and with a white pixel which necessarily exists between two arbitrary black pixels chosen from the three black pixels, as can be seen in FIG. 21C. The continuous point (hereinafter indicated by "C") refers to a skeleton point with two black pixels in the eight adjacent pixels and with a white pixel existing between the two black pixels, as can be seen in FIG. 21D. The continuous point corresponds to a point on skeleton which may extend both sides. The extensive end point (hereinafter indicated by "X") refers to a continuous point to which a skeleton is essentially deemed to extend. Out of these skeleton points, ending point E and bifurcation point B are the minutiae. Continuous point C includes any skeleton point which is not a minutia or extensive end point X.

Figure 22A:
FIGS. 22A and 22B are diagrams each showing an exemplary modification of a mask pattern.

It is extremely rare that ridge lines intersect each other on a fingerprint. When skeleton data is extracted, mask patterns indicative of intersections of skeletons are removed. For example, when a mask pattern is generated as shown on the left-hand side of FIG. 22A, fingerprint feature data extraction unit 18 modifies the mask pattern to that as shown in the middle or on the right-hand side of FIG. 22A. In other words, the intersection is modified to two bifurcation points.

Figure 22B:

B. As shown in FIG. 22B, when a mask pattern includes pixels X1, X3, X5, X7 which are at "1," this mask pattern is excluded from a matching range because the intersection cannot be modified to two bifurcation points. In other words, a zone including the intersection shown in FIG. 22B is defined as an unclear area.

A fringe of impression refers to a point which appears to be an ending point as a result of failing to roll a ridge line which should essentially extend. Fingerprint feature data extraction unit 18 also defines as an unclear area a zone which includes a fringe of impression and a pixel from which a skeleton structure cannot be discriminated beyond a certain location, as is the case with the fringe of impression. Extensive end point X is defined as a "skeleton point immediately before an unclear area."

Eight adjacent pixels are represented by 1-byte data. Specifically, the value of pixel X1 of a mask pattern is placed at the zero-th bit of the 1-byte data, and the values of the subsequent pixels up to X8 are arranged in order to complete the 1-byte data. FIG. 23A shows exemplary 1-byte data which is represented in the foregoing manner. The 1-byte data which represents the eight adjacent pixels is referred to as "Code 8" or "C8." FIG. 23B shows an example of C8. For example, when only pixel X1 of the eight adjacent pixels is at "1," resulting C8 presents "0000001," so that C8 has the value of one.

FIG. 24 shows an exemplary representation of skeleton data. The skeleton data is represented by a set of skeleton units. The skeleton unit refers to a minimum unit of a skeleton which starts from and ends at any of ending point E, bifurcation point B and extensive end point X. For example, skeleton unit 1 shown in FIG. 24 is a skeleton unit which starts from extensive end point X and ends at ending point B, and which includes continuous points C in between. As shown in FIG. 24, in the skeleton data, the type and coordinates of a skeleton point are brought into correspondence with Code 8 for each pixel.

Figure 25:
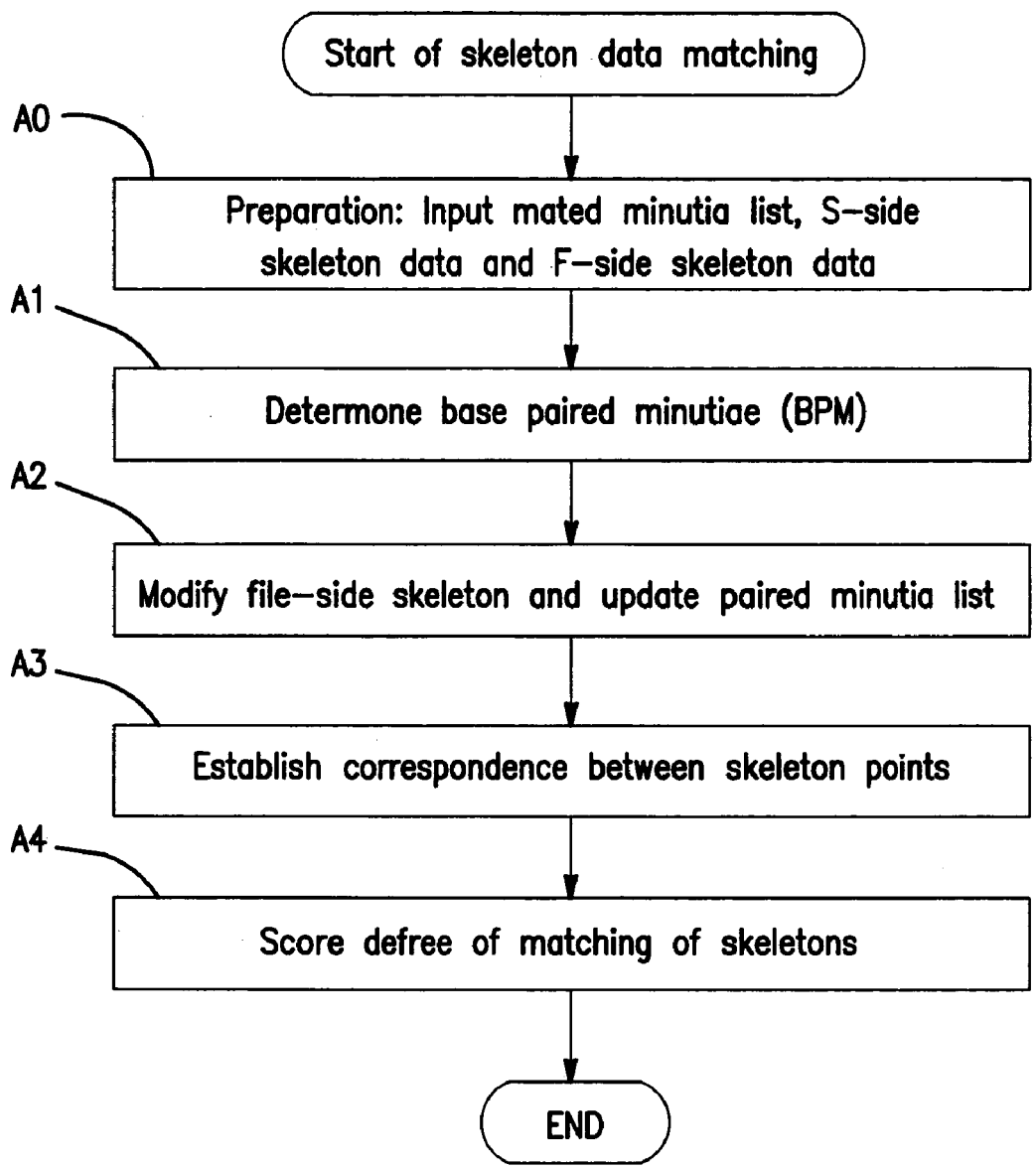
FIG. 25 is a flow chart generally illustrating a routine for identifying skeleton data.

Next, an outline of the skeleton data matching processing will be described with reference to FIG. 25. Skeleton data matching unit 20 first reads a paired minutia list, S-side skeleton data and F-side skeleton data at step A0, and extends them on an internal memory used by skeleton data matching unit 20. Skeleton data matching unit 20 reserves a memory area required therefor, for example, a memory area for use as a work table, and the like. Step A0 is positioned at a preparatory stage for the skeleton data matching processing.

It should be noted that in the paired minutia list, an S-side minutia and an F-side minutia, which form a pair, are not always classified into the same type. In the following description, paired minutiae which are classified into the same type both on the S-side and F-side are defined as the "determinate paired minutiae." In some documents, the term "determinate paired minutiae" is regarded as a synonym of the "paired minutiae" so that the term "determinate paired minutiae" is sometimes used even if the paired minutiae are not identical in type. On the contrary, in the following description, those paired minutiae which are identical in type are called the "determinate paired minutiae."

At steps A1 to A4 shown below, when appropriate data is selected from a plurality of data, a value indicative of the degree of improperness is assigned to individual data. This value is referred to as the "penalty."

After step A0, skeleton data matching unit 20 determines base paired minutiae (hereinafter called "BPM") at step A1. BPM refers to paired minutiae which serve as the criteria for determining a selecting order when skeleton points, skeleton units and the like are selected.

After step A1, skeleton data matching unit 20 modifies file-side skeleton data such that respective paired minutiae are identical in type both on the search-side and file-side. Simultaneously, skeleton data matching unit 20 also modifies type information on file-side minutiae included in the paired minutia list. Skeleton data matching unit 20 counts the penalties in accordance with the degrees of modifications to skeleton data and the like. If paired minutiae present a discrepancy too large to modify data on the file side, skeleton data matching unit 20 deletes the paired minutiae from the paired minutia list. Also, as described later, skeleton data matching unit 20 may create a plurality of types of skeleton data for F-side skeleton data at step A1. In such an event, skeleton data matching unit 20 selects data with less degree of modifications based on the penalties. In addition, minutiae which do not form pairs on the S-side and F-side may cause skeleton conditions such as so-called "whisker," "disconnection" and the like. Skeleton data matching unit 20 modifies the skeleton data to remove such skeleton conditions.

Subsequently, skeleton data matching unit 20 determines for each skeleton point on the search side whether or not a corresponding skeleton point exists on the file side. If a corresponding skeleton point exists on the file side, skeleton data matching unit 20 brings the skeleton point on the search side into correspondence with the skeleton point on the file side at step A3. The execution of step A3 results in a correspondence of continuous points C and extensive end points X as well as the minutiae. A set of information on skeleton points which form pairs brought into correspondence between the search side and file side is referred to as the "skeleton correspondence list."

Next, skeleton data matching unit 20 measures the length over which corresponding skeleton points extend, i.e., a skeleton length. Skeleton data matching unit 20 measures the skeleton length for each skeleton on the S-side which is brought into correspondence with the counterpart on the F-side (hereinafter referred to as the "determinate skeleton"), and calculates the total sum of the measured skeleton lengths. Then, skeleton data matching unit 20 calculates a matching score for the skeleton based on the total sum and the penalties which have been counted in Step A1 to Step A3. The distance between vertically or horizontally adjacent pixels defines a length unit. Therefore, the distance to an obliquely adjacent pixel is calculated to be approximately 1.4 pixels ($\sqrt{2}$ pixels).

Next, detailed description will be given on each of steps A1 to A4 in the skeleton data matching processing.

Figure 26:
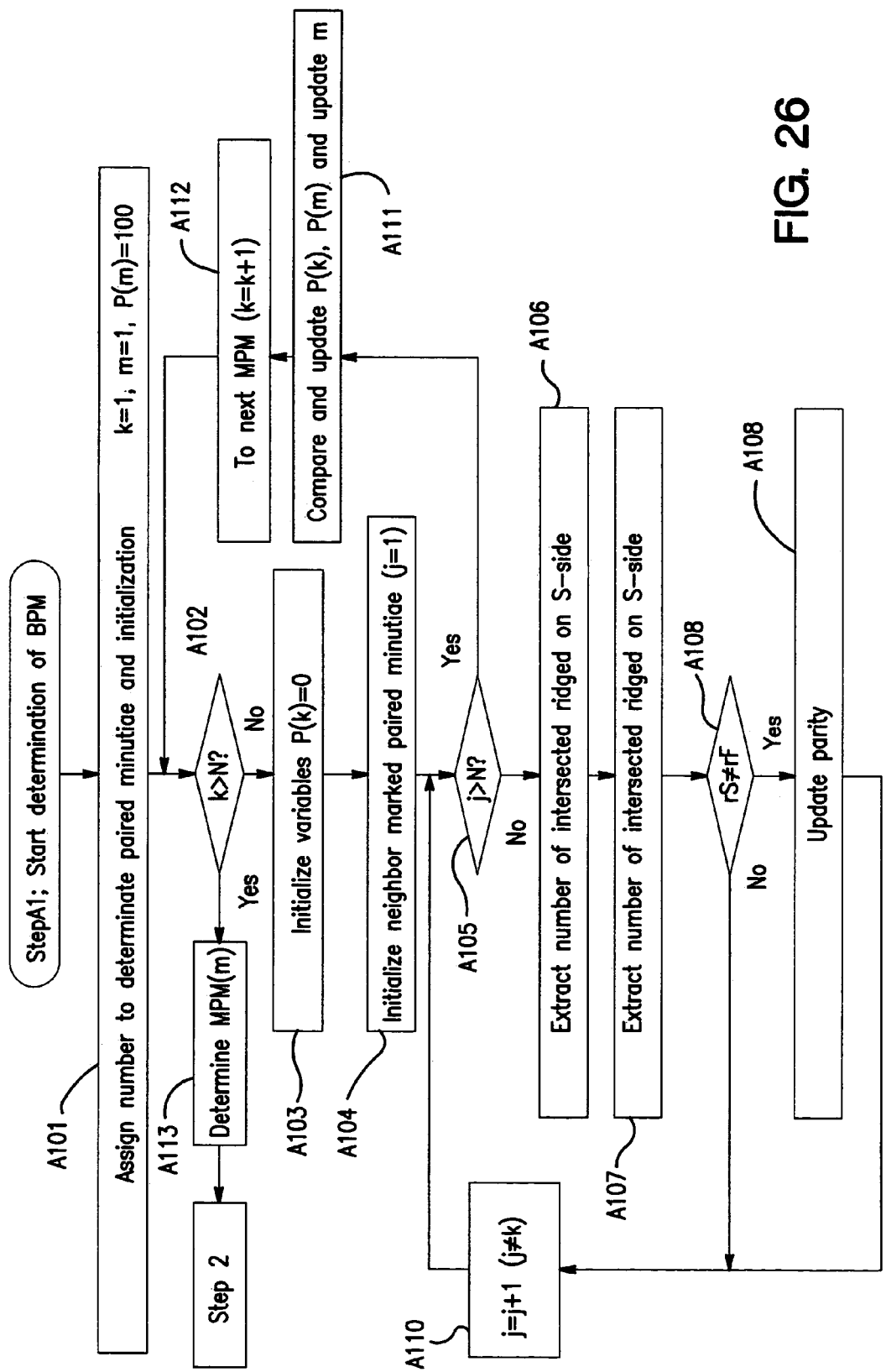
FIG. 26 is a flow chart illustrating a routine for determining BPM.

FIG. 26 illustrates the flow of the processing at step A1 (for determining BPM). Skeleton data matching unit 20 determines BPM in the following manner, wherein important criteria for determination is that the paired minutiae are identical in type. Specifically, at step A101, skeleton data matching unit 20 retrieves all determinate paired minutiae from paired minutiae and assigns numbers to the retrieved determinate paired minutiae. A determinate paired minutia assigned a number is referred to as the "marked paired minutia" and is represented by MPM(n), where "n" is a number assigned to the paired minutia. Assume that a maximum value for the assigned number is N. Skeleton data matching unit 20 also sets an initial value k=1, where k is a variable for orderly selecting marked paired minutiae one by one from all MPM(n), and a selected marked paired minutia (i.e., marked paired minutia of interest) is represented by MPM(k). k is incremented by one after one marked paired minutia is selected. Skeleton data matching unit 20 also sets initial values m=1 and P(m)=100, where m is a variable for identifying a marked paired minutia that has the smallest penalty. While the initial value for P(m) is herein set to 100, the initial value for P(m) may be any value as long as it is sufficiently larger than P(k). A selected paired minutia is represented by the term "of interest."

After step A101, skeleton data matching unit 20 determines at step A102 whether or not all MPM(n) have been selected. If k>N is satisfied, skeleton data matching unit 20 determines that all MPM(n) have been selected, followed by a transition of the processing to step A113. If k>N is not satisfied, skeleton data matching unit 20 sets an initial value P(k)=0 at step A103, where P(k) is a penalty corresponding to a marked paired minutia of interest MPM(k).

Subsequently, skeleton data matching unit 20 sets an initial value j=1 at step A104, where j is a variable for orderly selecting marked paired minutiae near MPM(k) one by one. A selected adjacent marked minutia, i.e., an adjacent paired minutia of interest is represented by MPM(j). When k=1, the initial value for j is set to two. The initial value for j set to two can prevent MPM(k) and MPM(j) from resulting in the same paired minutia.

After step A104, skeleton data matching unit 20 determines at step A105 whether or not it has selected each of adjacent marked paired minutiae. Skeleton data matching unit 20 so determines when j>N is satisfied, followed by a transition to step A111, later described. If J>N is not satisfied, skeleton data matching unit 20 finds a number rS of ridge lines which are intersected with a line segment that connects marked paired minutia MPM(k) of interest to marked adjacent paired minutia MPM(j), i.e., a line segment on the search side, based on search side skeleton data. At step A107, skeleton data matching unit 20 similarly finds a number rF of ridge lines which are intersected with a line segment that connects marked paired minutia of interest MPM(k) to adjacent paired minutia of interest MPM(j), i.e., a line segment on the file side based on file side skeleton data.

After step A107, skeleton data matching unit 20 determines at step A108 whether or not there is a difference between the numbers rS and rF of ridge lines which are intersected with the respective line segments. If rS=rF, the value of j is incremented by one at step A110. However, if j=k, the value of j is again incremented by one.

If rS≠rF, i.e., if there is a difference between the numbers rS and rF of ridge lines which are intersected with the respective line segments at step 108, skeleton matching unit 20 calculates a penalty in accordance with adjacent paired minutia of interest MPM(j), and adds the penalty to P(k) at step A109. Penalty P in accordance with adjacent paired minutia of interest MPM(j) is calculated by the following equation:

$$P=|rS-rF|/\max(\min(rS, rF), 1)$$

where max and min are functions for specifying a maximum and a minimum for the values in the parenthesis, respectively. After updating P(k), skeleton data matching unit 20 performs the processing at step A110 (incrementing j), and repeats the operation at step A105 onward.

On the other hand, upon determining at step A105 that it has selected each adjacent marked paired minutia, skeleton data matching unit 20 compares a minimum value P(m) for the penalties so far calculated with penalty P(k) for marked paired minutia of interest MPM(k) at step A111. If P(k)<P(m), skeleton data matching unit 20 updates P(m) with the value of P(k), and updates m with the value of k. If P(k)=P(m), skeleton data matching unit 20 determines which of MPM(m) specified by m and marked paired minutia of interest MPM(k) is closer to barycenter coordinates of an S-side paired minutia group. If MPM(k) is closer, P(m) and m are updated with the values of P(k) and k, respectively. If P(k)>P(m), no updates are made.

After step A111, skeleton data matching unit 20 increments the value of k by one to select the next marked paired minutia at step A112, followed by the processing returning to step A102. If k>N is determined at subsequent step A102, this means that skeleton data matching unit 20 has selected all marked paired minutiae. The value m at this time identifies the marked paired minutia that has the smallest penalty. Therefore, skeleton data matching unit 20 determines MPM(m) identified by this value of m as the BPM at step A113.

The BPM determination processing illustrated in FIG. 26 cannot be applied when no determinate paired minutia exists in paired minutiae. Therefore, in such a case, the BPM is determined by exceptional processing shown below. When all paired minutiae differ in type between the S-side and F-side, the paired minutia nearest to the barycenter coordinates of the S-side paired minutia group is selected as a BPM candidate. Since the BPM candidate on the S-side differs in type from the BPM candidate on the F-side, the processing should be performed in accordance with the type.

Figure 27:
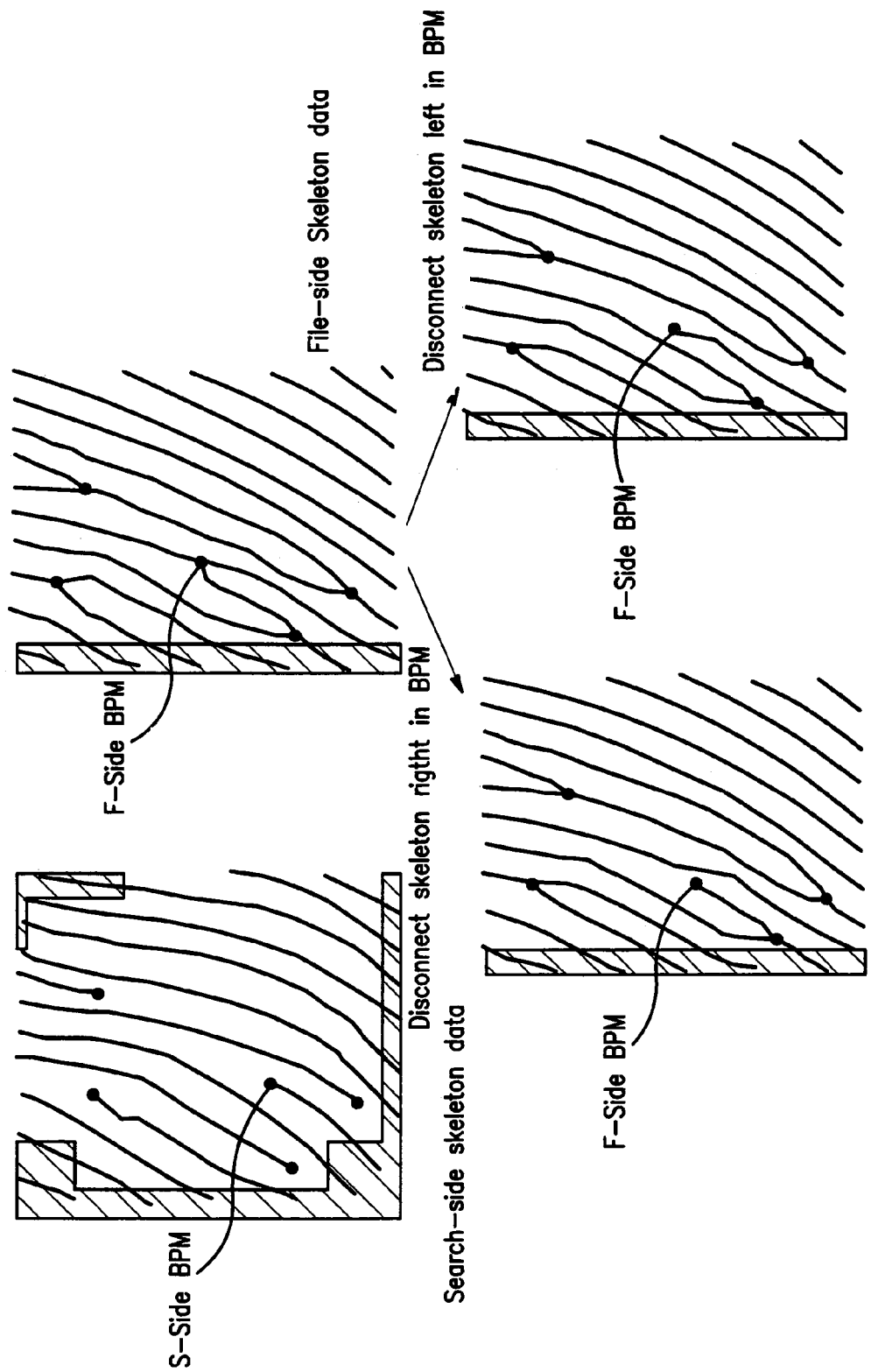
FIG. 27 is a diagram illustrating the processing for changing a bifurcation point to an ending point.

When the type of an S-side paired minutia, which is a BPM candidate, is ending point E, and the type of an F-side paired minutia is bifurcation point B, F-side bifurcation point B is changed to ending point E. Then, this ending point E is paired with S-side ending point E to form the BPM. FIG. 27 describes the processing for changing an F-side bifurcation point, i.e., a bifurcation point which is selected to be a BPM candidate, to an ending point. As illustrated in FIG. 27, two types of skeleton data and two types of paired minutia lists can be created depending on which to separate a skeleton that branches into the left and right directions. Skeleton data matching unit 20 creates and holds the two types of skeleton data. In any of the two types of skeleton data, ending points are determined as the BPM. When a minutia direction is chosen in the positive Y-axis direction, the right is defined in the positive X-axis direction, and the left is defined in the negative X-axis direction. As previously mentioned, the minutia direction is defined in the NIST Data Exchange Standard Definition (Sub-section 16.1.4). With a bifurcation point, a direction toward the middle of two branching skeleton units is defined as the minutia direction. With an ending point, a direction in which a skeleton extends from the ending point is defined as the minutia direction.

When the type of an S-side paired minutia, which is a BPM candidate, is branch point B, and the type of an F-side paired minutia is ending point E, F-side ending point E is changed to bifurcation point B. Then, this bifurcation point B and an S-side bifurcation point B are combined into a pair which is chosen to be the BPM. In this event, two types of skeleton data and two types of paired minutia lists can be created depending on whether the skeleton forming an ending point is connected to a left or a right skeleton to form a bifurcation point. Skeleton data matching unit 20 creates and holds the two types of skeleton data. In any of the two types of skeleton data, bifurcation point, ending point are determined as the BPM.

When two types of skeleton data are created in the exceptional processing, the skeleton data are labeled F-Skel (1), Skel(2), respectively.

Figure 28A:
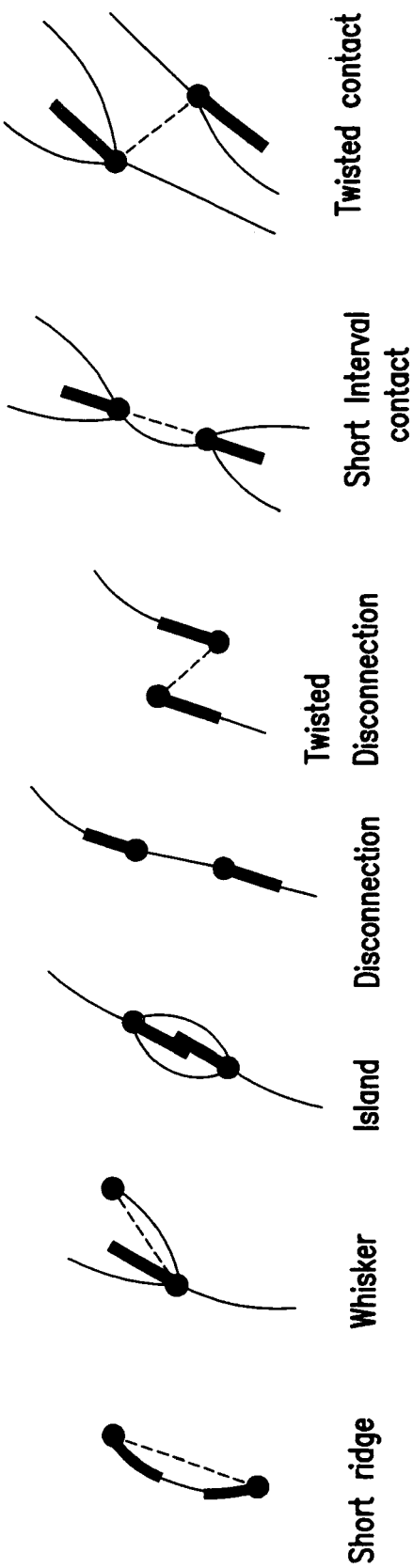

Next, description will be made on the processing at step A2 in the flow chart illustrated in FIG. 25. The processing at step A2 is divided into three sub-steps. The first sub-step A2-1 involves modifying the file side skeleton data and paired minutia list for those paired minutiae which are not determinate paired minutiae in such a manner that they have the same type. The second sub-step A2-2 involves deleting minutiae which do not form pairs between the S-side and F-side and which are in an opposing relationship from the F-side skeleton data. The opposing relationship refers to a relationship of minutiae which orient in opposite directions to each other to cause an unfavorable skeleton condition in view of the fingerprint matching. FIG. 28A illustrates paired minutiae which are in the opposing relationship. In FIG. 28A, circles represent minutiae, and the minutia direction is indicated by a fat line extending from each minutia. The third sub-step A2-3 involves deleting those minutiae which do not form pairs between the S-side and F-side, and are in the opposing relationship.

Figure 29:
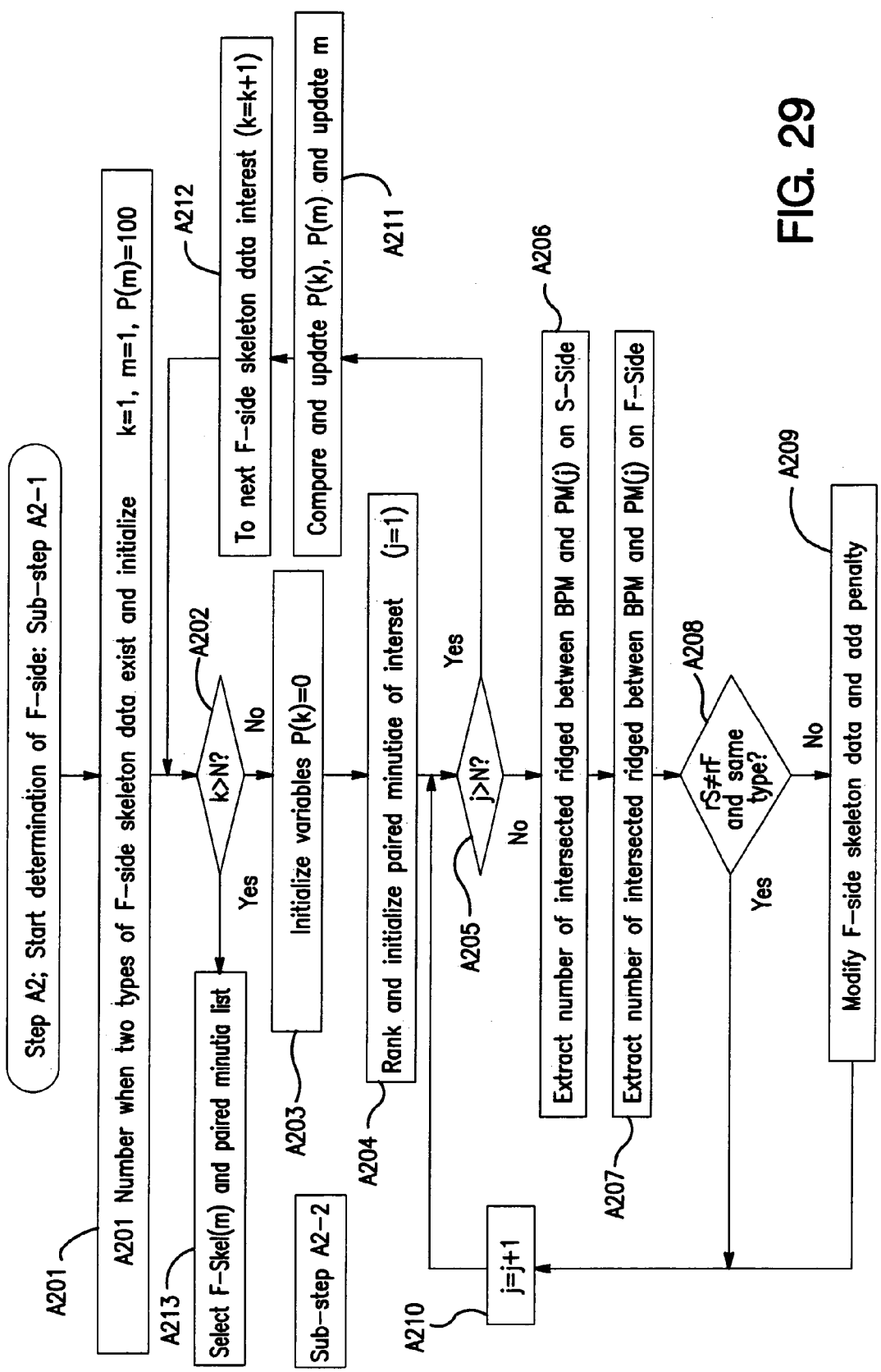
FIG. 29 is a flow chart illustrating a routine for modifying F-side skeleton data.

FIG. 29 illustrates the processing at sub-step A2-1. Sub-step A2-1 is executed on the assumption that the BPM comprises determinate paired minutiae. When there are two types of F-side skeleton data, skeleton data matching unit 20 sets an initial value k=1 at step A201. The value k used at sub-step A201 is a variable for orderly selecting F-Skel(1) and F-Skel(2), and selected skeleton data is represented by F-Skel(k). Skeleton data matching unit 20 sets initial values m=1 and P(m)=100, where m is a variable for identifying F-Skel(k) that has the smallest penalty, and P(m) is a minimum penalty value for each F-Skel(k). While the initial value for P(m) is herein set to 100, the initial value for P(m) may be any value as long as it is sufficiently larger than P(k).

After step A201, skeleton data matching unit 20 determines at step A202 whether or not the selection for F-Skel(1) and F-Skel(2) have been made. If k>2 is satisfied, skeleton data matching unit 20 determines that F-Skel(1) and F-Skel(2) have been selected, followed by a transition of the processing to step A213. If k>2 is not satisfied, skeleton data matching unit 20 sets an initial value P(k)=0 at step A203, where P(k) is a penalty corresponding to F-Skel(k) of interest.

Subsequent to step A203, skeleton data matching unit 20 determines an order in which respective paired minutiae are selected one by one. Skeleton data matching unit 20 also sets an initial value j=1, where j is a variable for orderly selecting paired minutiae one by one, and a selected paired minutia (i.e., paired minutia of interest) is represented by PM(j).

After step A204, skeleton data matching unit 20 determines at step A205 whether or not it has selected each paired minutia. If j>N is satisfied, skeleton data matching unit 20 determines that it has selected each minutia, followed by a transition of the processing to step A211. If j>N is not satisfied, skeleton data matching unit 20 finds a number rS of ridge lines which are intersected with a line segment that connects the BPM to paired minutia of interest PM(j), i.e., a line segment on the search side. At step A207, skeleton data matching unit 20 similarly finds a number rF of ridge lines which are intersected with a line segment that connects the BPM to paired minutia of interest PM(j), i.e., a line segment on the file side.

After step A207, skeleton data matching unit 20 determines at step A208 whether or not there is a difference between the numbers rS and rF of ridge lines which are interested with the respective line segments, as found at steps A206, A207, and also determines whether or not the paired minutia of interest on the S-side differs in type from that on the F-side. If there is no difference between rS and rF and if the paired minutiae of interest are identical in type on the S-side and F-side, the processing proceeds to step A210 where the value of j is incremented by one.

If the skeleton data matching unit 20 determines at step A208 rS≠rF, or that the paired minutia of interest on the S-side differs in type from that on the F-side, skeleton data matching unit 20 modifies the file side skeleton data, and counts penalty P(k) in accordance with what kind of modification is made. In this event, skeleton data matching unit 20 modifies the file side skeleton data such that the paired minutiae of interest are identical in type on the S-side and on the F-side, and the same number of ridge lines exist between the BPM and paired minutiae of interest PM(j) on the S-side and F-side. Skeleton data matching unit 20 also modifies data on the file side minutiae included in the paired minutia list as well as the file side skeleton data.

FIG. 30 is a table of rules which define the specifics of modifications at step A209. Skeleton data matching unit 20 modifies file side skeleton data and the like, and counts penalty P(k) in accordance with the rules shown in FIG. 30. As shown in FIG. 30, the specifics of modifications and the values of penalty associated therewith are determined by the difference between rF and rS, the type of the S-side paired minutia of interest, and the type of the F-side paired minutia. Assume, for example, that the type of the S-side paired minutia of interest is ending point E, and the type of the F-side paired minutia of interest is bifurcation point B. In this event, when rF−rS=0, skeleton data matching unit 20 modifies the F-side paired minutia of interest, i.e., the bifurcation point such that "a skeleton closer to the BPM is separated," and adds one to P(k). On the other hand, if rF−rS=−1, skeleton data matching unit 20 modifies the F-side paired minutia of interest (bifurcation point) such that "a skeleton further away from the BPM is separated," and adds one to P(k). Further, if rF−rS=1, skeleton data matching unit 20 makes a modification to "delete data of paired minutiae of interest PM(j) from the paired minutia list," and adds five to P(k).

While the foregoing description has been made in connection with an example where the type of the S-side paired minutia of interest is ending point E and the type of the F-side paired minutia of interest is bifurcation point B in the rules shown in FIG. 30, the specifics of modifications and penalty are determined in a similar manner in other cases as well. It should be noted that when a modification can be made such that the number of ridge lines between the BPM and paired minutia of interest is identical on the S-side and F-side, a smaller penalty is determined.

Figure 31A:
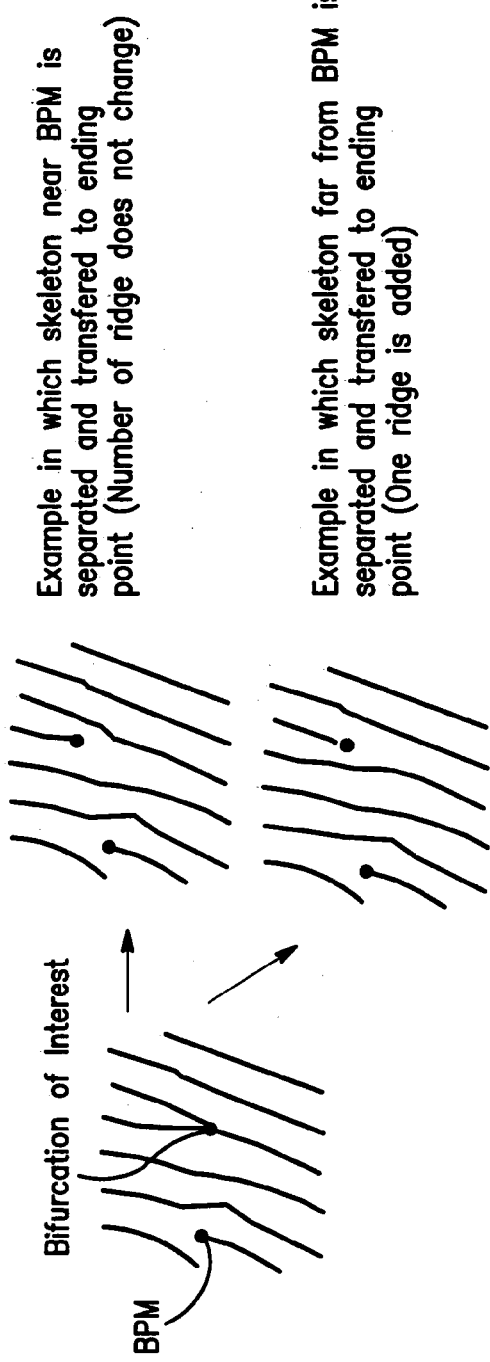
FIGS. 31A and 31B are diagrams for describing the processing for modifying a type of minutia.

FIG. 31A illustrates the processing performed when an F-side paired minutia of interest is a bifurcation point for modifying this bifurcation point to an ending point. Out of two skeletons divided from the bifurcation point, the skeleton closer to BPM or the skeleton further away from the BPM may be separated to change the bifurcation point to an ending point. The separation of which skeleton will result in a different number of ridge lines which are intersected with the line segment that connects the BPM to the F-side paired minutia of interest. The manner in which the skeleton is separated is determined in accordance with the rules shown in FIG. 30.

Figure 31B:
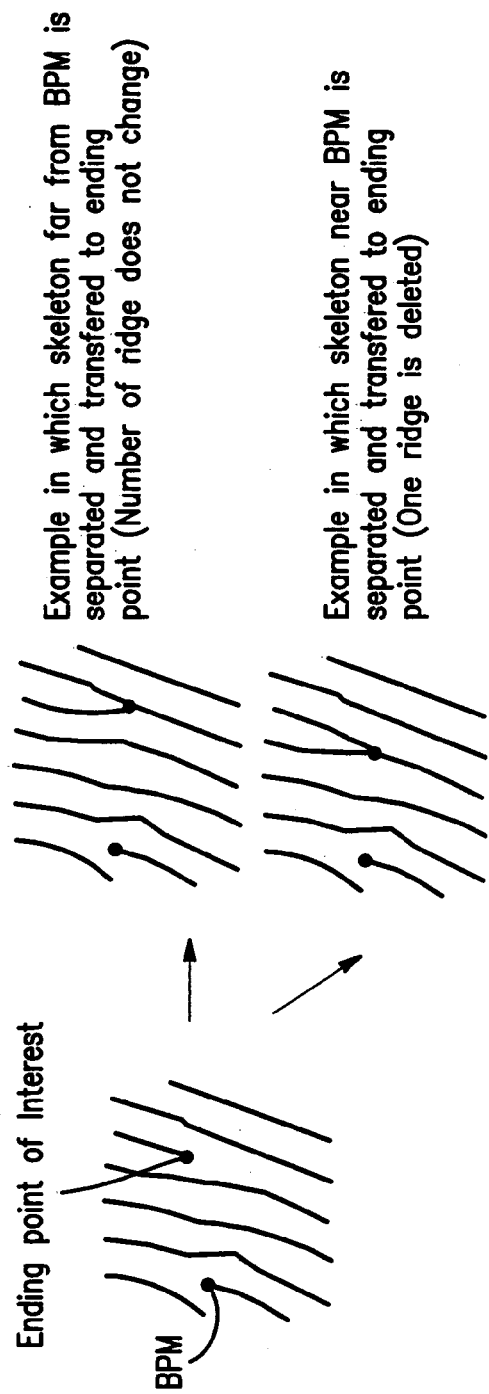

FIG. 31B illustrates the processing performed when an F-side paired minutia of interest is an ending point for modifying this ending point to a bifurcation point. An ending point can be changed to a bifurcation point by joining a skeleton which forms the ending point to a skeleton closer to BPM or a skeleton further away from the BPM. The connection of which skeleton will result in a different number of ridge lines intersected with a line segment that connects the BPM to the F-side paired minutia of interest. The manner in which the skeleton is joined is determined in accordance with the rules shown in FIG. 30.

Figure 32A:
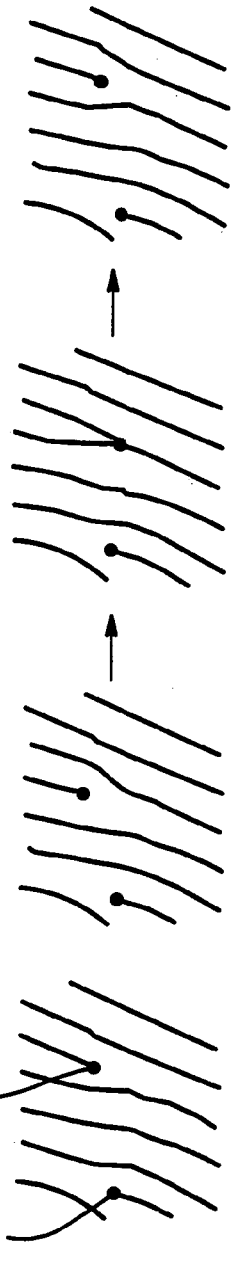
FIGS. 32A and 32B are diagrams for describing the processing for modifying an F-side paired minutia of interest.
Figure 32B:
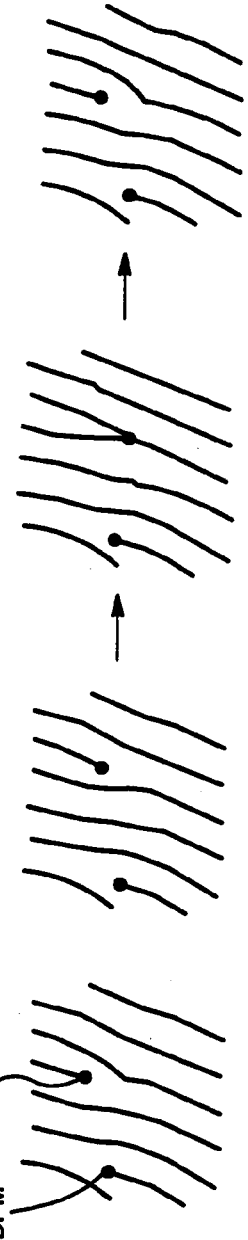

FIGS. 32A and 32B illustrate a situation in which the type of an S-side and an F-side paired minutia of interest is an ending point, and the F-side paired minutia of interest is modified because rS≠rF. FIG. 32A illustrates an example in which the F-side paired minutia of interest is modified such that an extra ridge line is increased since the number of ridge lines existing between BPM and F-side paired minutia of interest is smaller by one than the number of ridge lines existing between the BPM and S-side paired minutia of interest. An ending point is joined to the skeleton further away from the BPM, and then the skeleton further away from the BPM is separated out of the branching skeletons, as illustrated in FIG. 32A, resulting in the addition of one ridge line. FIG. 32B illustrates an example in which the F-side paired minutia of interest is modified such that one ridge line is removed since the number of ridge lines existing between BPM and F-side paired minutia of interest is larger by one than the number of ridge lines existing between the BPM and S-side paired minutia of interest. An ending point is joined to the skeleton closer to the BPM, and then the skeleton closer to the BPM is separated out of the branching skeleton, as illustrated in FIG. 32B, resulting in the reduction of one ridge line.

Figure 33A:
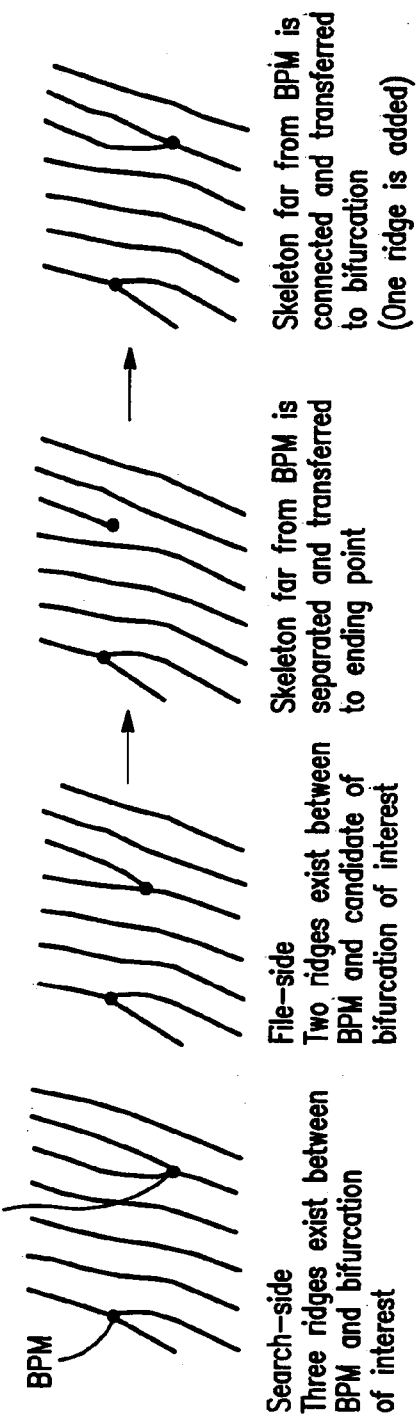
FIGS. 33A and 33B are diagrams for describing the processing for modifying an F-side paired minutia of interest.
Figure 33B:
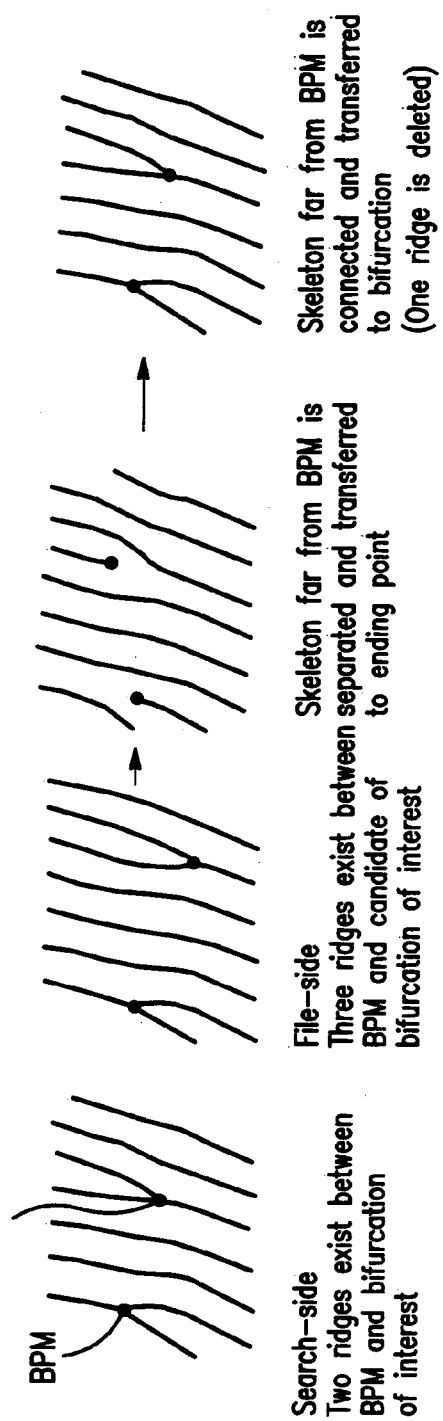

FIGS. 33A and 33B illustrate a situation in which the type of an S-side and an F-side paired minutia of interest is a bifurcation point, and the F-side paired minutia of interest is modified because rS≠rF. FIG. 33A illustrates an example in which the F-side paired minutia of interest is modified such that an extra ridge line is increased since the number of ridge lines existing between BPM and F-side paired minutia of interest is smaller by one than the number of ridge lines existing between the BPM and S-side paired minutia of interest. A skeleton further away from the BPM is separated out of the branching skeletons, and the resulting ending point is joined to the skeleton further away from the BPM, as illustrated in FIG. 33A, resulting in the increase of one ridge line. FIG. 33B illustrates an example in which the F-side paired minutia of interest is modified such that one ridge line is removed since the number of ridge lines existing between BPM and F-side paired minutia of interest is larger by one than the number of ridge lines existing between the BPM and S-side paired minutia of interest. A skeleton closer to the BPM is separated out of the branching skeletons, and the resulting ending point is joined to the skeleton closer to the BPM, as illustrated in FIG. 33B, resulting in the reduction of one ridge line.

Skeleton data matching unit 20 makes modifications as illustrated in FIGS. 31A, 31B, 32A, 32B, 33A and 33B in accordance with the rules shown in FIG. 30. Then, skeleton data matching unit 20 adds a penalty in accordance with a particular modification to P(k), followed by termination of the processing at step A209.

After step A209, skeleton data matching unit 20 performs the processing at step A210, i.e., increments j, and repeats the operation at step A205 onward.

Upon determining at step A205 that each paired minutia has been selected, the skeleton data matching unit 20 compares the smallest penalty value P(m) so far counted with penalty P(k) for selected F-Skel(k) at step A211. If P(k)<P(m), P(m) is updated with the value of P(k), and m is updated with the value of k. If P(k)≧P(m), no update is made. Subsequently, skeleton data matching unit 20 increments the value of k by one to select next F-Skel(k) at step A212.

When skeleton data matching unit 20 determines at step A202 in a later loop that k>2, this means that the selection has been completed for both F-Skel(1) and F-Skel(2). The value of m at this time identifies the skeleton data which presents the smaller penalty. At step A213, skeleton data matching unit 20 identifies skeleton data F-Skel(m) using this value of m, and identifies a paired minutia list corresponding to this F-Skel(m). At step A212, the processing at sub-step A2-1 ends. In the subsequent processing, F-Skel(m) and paired minutia list identified at step A213 undergo the processing.

Figure 34:
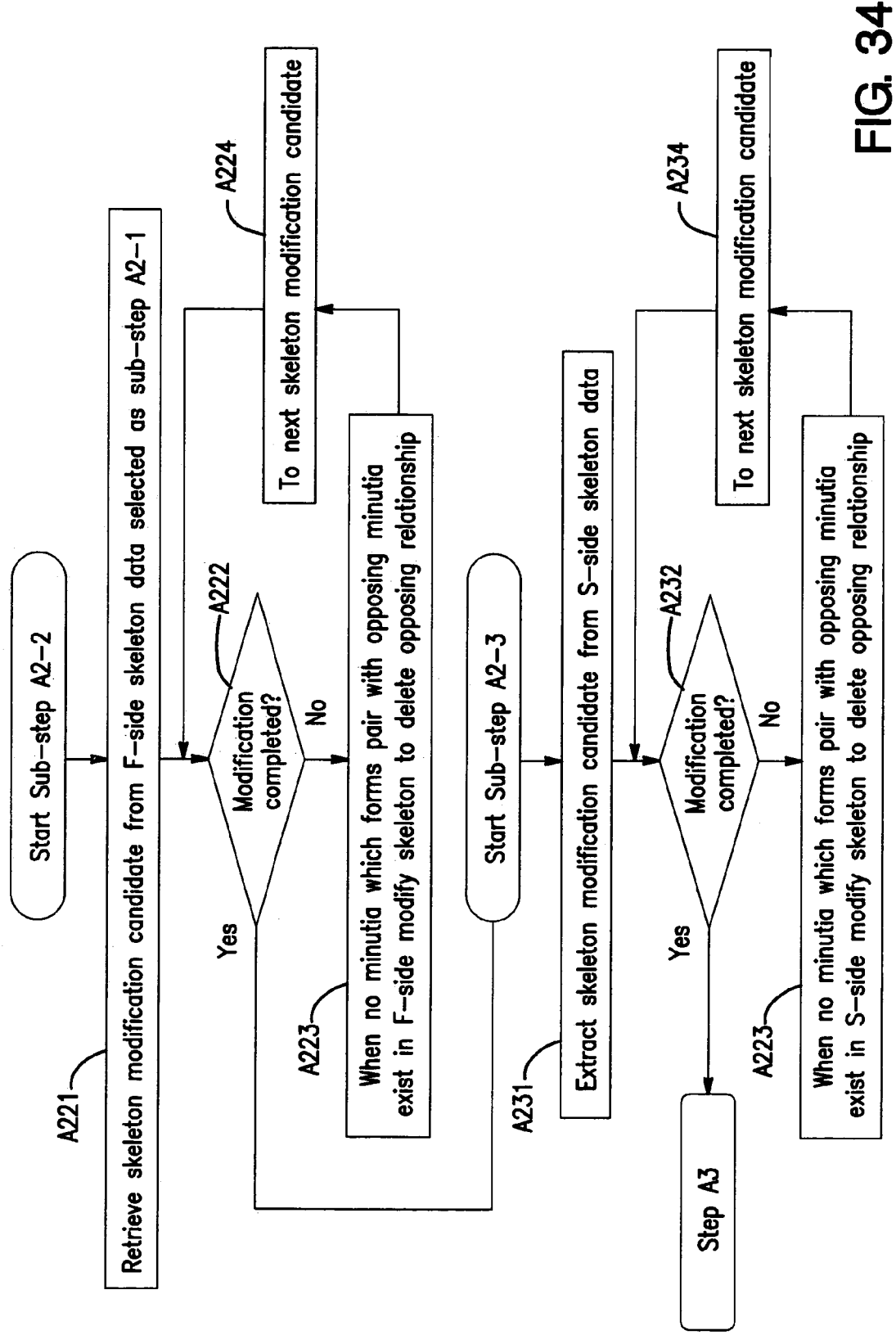
FIG. 34 is a flow chart illustrating a routine for deleting opposing minutiae.

Next, description will be made on sub-steps A2-2, A2-3. FIG. 34 illustrates the flow of the processing at sub-steps A2-2, A2-3.

At sub-step A2-2, skeleton data matching unit 20 deletes those minutiae which do not form pairs with counterparts on the S-side and are in the opposing relationship from the F-side skeleton data. Specifically, skeleton data matching unit 20 first extracts minutiae which are in the opposing relationship as illustrated in FIG. 28A, i.e., sets of opposing minutiae, from F-side skeleton data identified at sub-step A2-1, and orders the extracted sets of opposing minutiae at step A221. However, the extraction of all sets of opposing minutiae at step A221 is inefficient. Thus, skeleton data matching unit 20 may extract those determinate paired minutiae which exist within a predetermined range (for example, within 64 pixels) from the sets of opposing minutiae.

Subsequently, at step A222, skeleton data matching unit 20 determines whether or not the processing has been completed for all of the extracted opposing minutiae. If the modification has not been completed, skeleton data matching unit 20 selects one set of opposing minutiae in accordance with the order, and performs the processing on this set at step A233. Skeleton data matching unit 20 determines at step A233 whether or not a minutia which forms a pair with the selected opposing minutia exists on the S-side. If there is no minutia which forms a pair on the S-side, skeleton data matching unit 20 makes a modification to delete the opposing minutia. FIG. 28B shows a list which summarizes applicable modifications for deleting an opposing minutia. With the modification made to delete an opposing minutia, skeleton data matching unit 20 adds a penalty in accordance with the specifics of a particular modification to P(m) which has been finally calculated at sub-step A2-1. For example, with a "whisker," skeleton data matching unit 20 deletes a skeleton which forms the whisker, as instructed in FIG. 28B. Then, skeleton data matching unit 20 adds the length of the deleted skeleton multiplied by a predetermined coefficient to P(m) as a penalty.

A modification for providing a smooth connection can be implemented by known techniques as described, for example, in JP-A-2002-74381. For making a smooth skeleton connection with a "short interval contact," a "twisted disconnection," a "twisted contact" and the like, it is effective to reduce the skeleton at an ending point by the length equal to more or less the width of ridge line in addition to deletion of a skeleton between opposing minutiae.

There are a variety of known techniques for eliminating opposing minutiae. For example, U.S. Pat. No. 6,072,895 proposes the elimination of minutiae after extraction of skeleton data. U.S. Pat. No. 4,646,352 in turn describes that opposing minutiae are ignored when minutiae are matched.

After step A223, skeleton data matching unit 20 selects a set of opposing minutiae which is the next candidate for skeleton modification at step A224, and repeats the operation at step A222 onward. At step A222, if the modification has been completed for all of the extracted opposing minutiae, sub-step A2-2 ends, followed by the start of sub-step A2-3.

After sub-step A2-2, skeleton data matching unit 20 starts sub-step A2-3. At sub-step A2-3, skeleton data matching unit 20 deletes minutiae which do not form pairs with the F-side and are in the opposing relationship from S-side skeleton data. The contents of the processing at sub-step A2-3 is similar to those at sub-step A2-2. Steps A231, A232, A233, A234 shown in FIG. 34 are similar to steps A221, A222, A223, A224, respectively.

Figure 35:
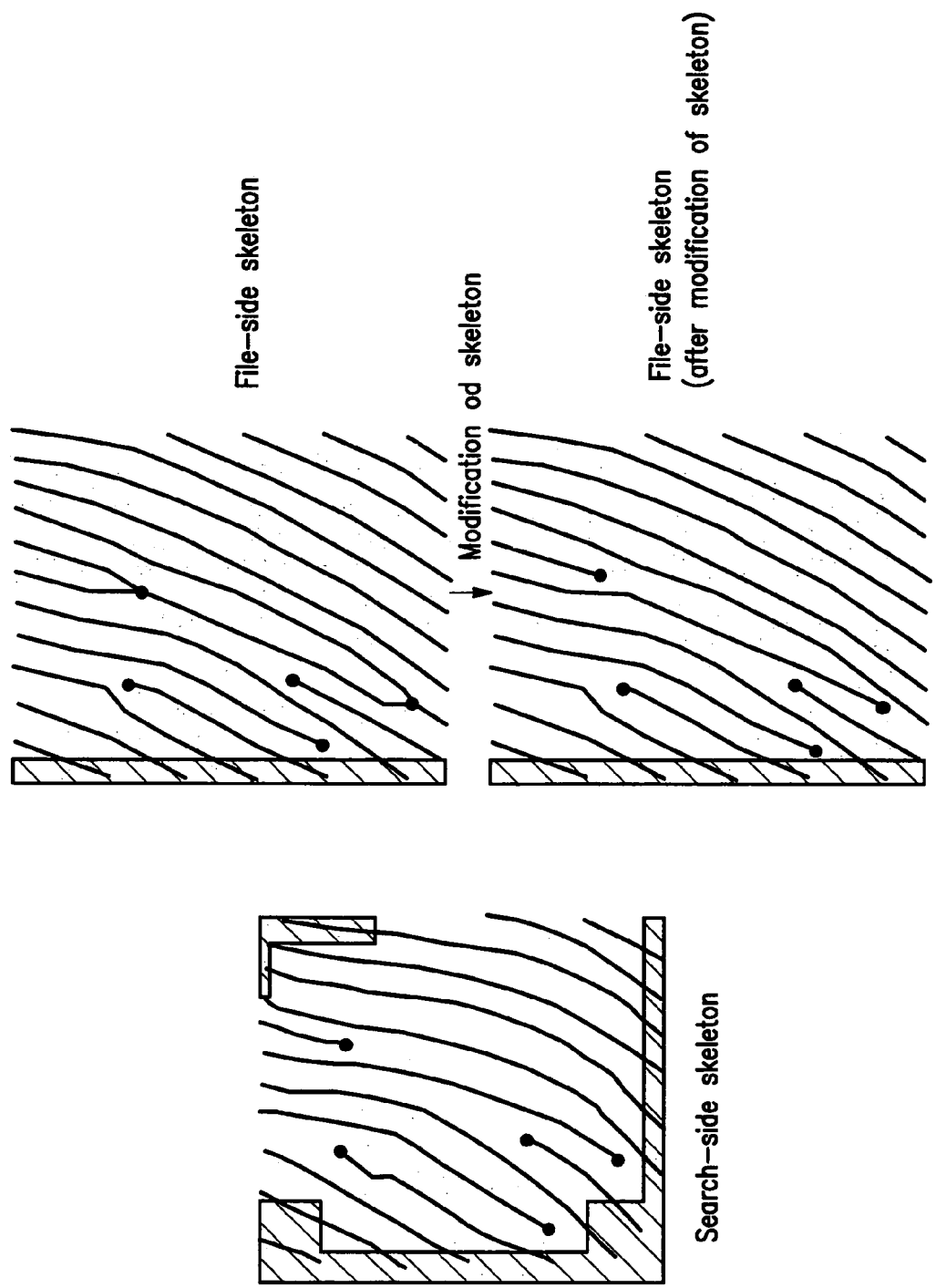
FIG. 35 is a diagram illustrating an exemplary change in an F-side skeleton associated with a modification.

The processing at step A2 ends at sub-step A2-3. FIG. 35 illustrates a change in F-side skeletons resulting from the processing at step A2. At the end of step A2, all paired minutiae on the paired minutia list are identical in type on the S-side and F-side. Here, the description on step A2 is concluded.

Next, description will be made on the processing at step A3 in the flow chart illustrated in FIG. 25. At step A3, skeleton data matching unit 20 checks whether each of S-side skeleton points has a corresponding F-side skeleton point. As previously described, a set of information on skeleton points which form a pair brought into correspondence between the search side and file side is referred to as the skeleton point correspondence list. FIG. 36 shows an exemplary skeleton point correspondence list. Skeleton data matching unit 20 creates the skeleton point correspondence list which is gradually updated with the progress of the check which is made on the correspondence relationship of skeleton points.

Skeleton data matching unit 20 selects S-side skeleton units, i.e., minimum skeleton units one by one, and selects every skeleton point on the selected skeleton unit. Then, skeleton data matching unit 20 checks the correspondence from the selected skeleton point to the F-side. The selection of the skeleton units and the like is made from the S-side because a latent which is placed on the search side generally has a smaller area and less minutiae. In the following description, a skeleton unit selected on the S-side, i.e., a skeleton unit for which the correspondence to the F-side is checked, is referred to as the "skeleton of interest." Also, a skeleton point which is on a skeleton of interest and is selected for checking the correspondence relationship with the F-side is referred to as the "skeleton point of interest" or simply the "point of interest." When a corresponding point corresponding to a point of interest exists on the F-side, the point of interest and corresponding point are referred to as the "determinate skeleton points." A determinate paired minutia and a determinate skeleton point which do not rest on a skeleton of interest are referred to as the "reference points." The reference points are utilized in checking the correspondence relationship for a point of interest.

Figure 37:
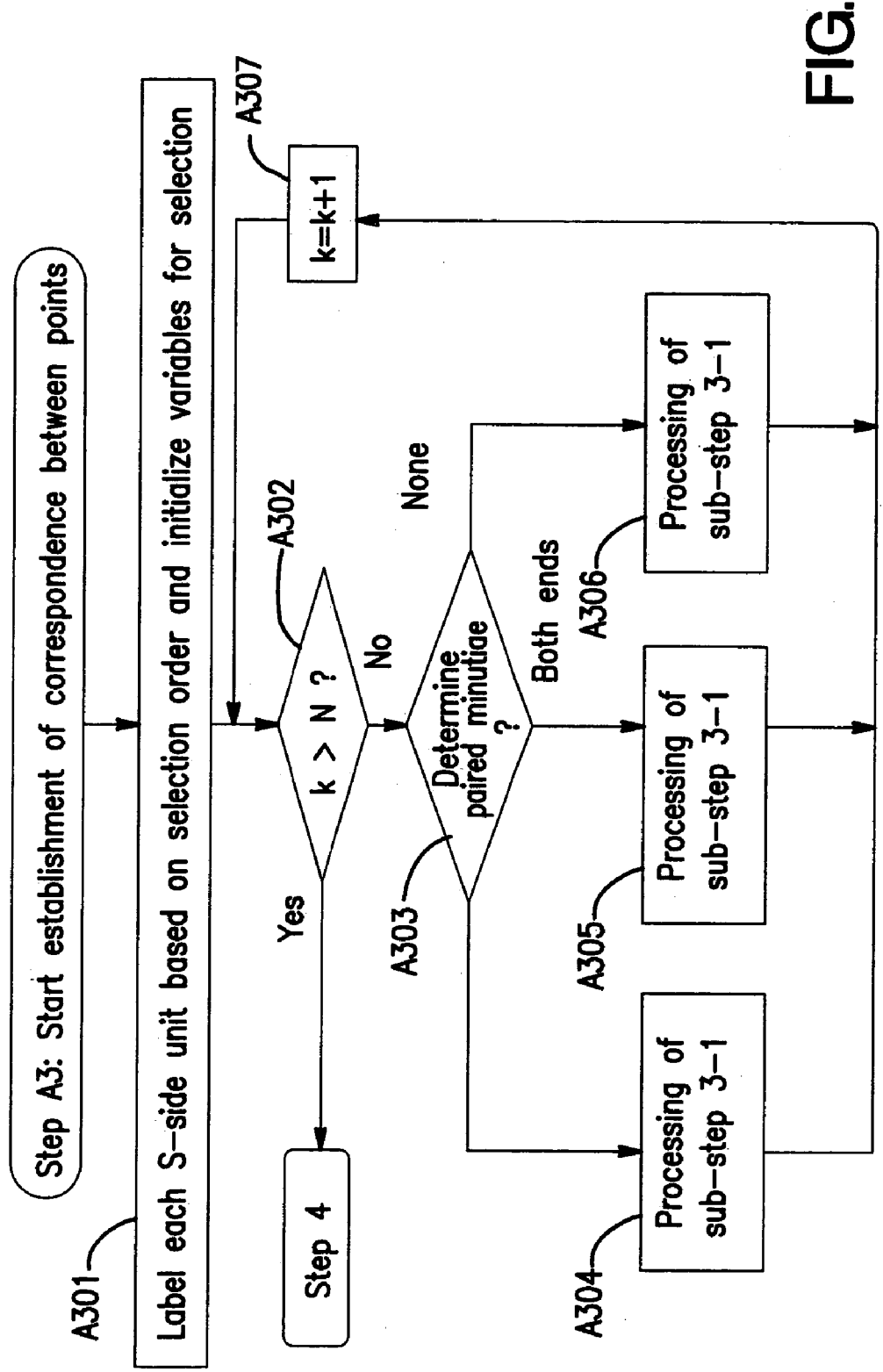
FIG. 37 is a flow chart illustrating a routine for bringing skeleton points into correspondence with each other.

FIG. 37 illustrates the processing at step A3, i.e., the flow of corresponding a skeleton point. Each skeleton unit on the S-side is labeled "S-Unit(n)" where "n" indicates the order in which S-side skeleton units are selected. Assuming that the total number of S-side units is N, $1 \leq n \leq N$ is established.

After starting step A3, skeleton data matching unit 20 first orders S-side skeleton units one by one at step A301. Skeleton data matching unit 20 also sets an initial value k=1. "k" at step A3 is a variable for selecting in order the S-side skeleton units one by one, and a selected skeleton unit is labeled "S-Unit (k)."

Now, description will be made on the criteria for determining the order of S-side skeleton units. The order is determined such that skeleton units connected to BPM are selected earlier. When the BPM of concern is an ending point, the order of a skeleton unit connected to this BPM is determined as the first position.

When the BPM of concern is a bifurcation point, this bifurcation point is regarded as an ending point, and the order is determined for three skeleton units connected to the ending point. In this event, the order is determined in the ascending direction as follows: (1) a skeleton unit which has a determinate paired minutia on the other end; (2) a skeleton unit which extends in a direction opposite to the minutia direction; (3) a skeleton unit which is placed immediately to the right of the minutia direction; and (4) a skeleton unit which is placed immediately to the left of the minutia direction. The directions referred to by "right" and "left" follow the previous description.

Figures 38A, 38B:
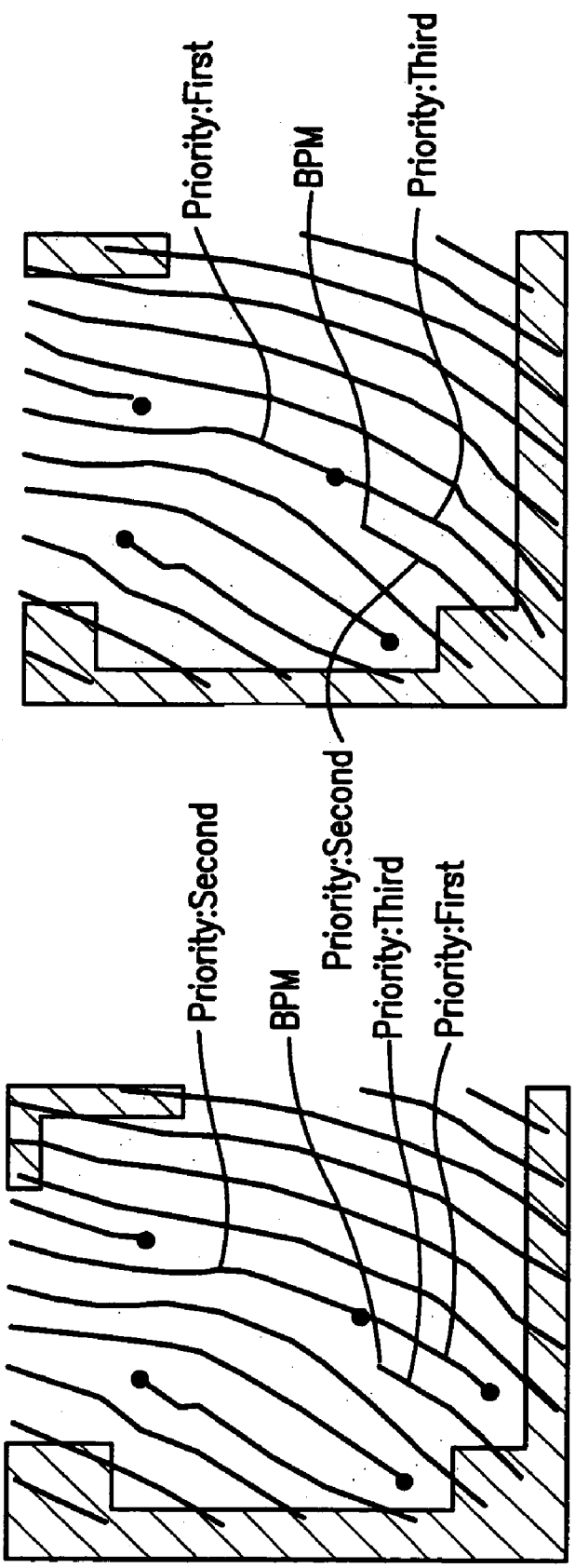
FIGS. 38A and 38B are diagrams each illustrating an exemplary ranking of skeleton units connected to BPM.

FIGS. 38A and 39B illustrate exemplary ordering of skeleton units which are connected to BPM that is a bifurcation point. In the example illustrated in FIG. 38A, the skeleton unit which is given "the highest priority" falls under (1) because it has a determinate paired minutia on the other end, and is therefore placed at the first position. The skeleton unit which is given "the next highest priority" in FIG. 38A falls under (2) because it extends in the direction opposite to the minutia direction at the BPM (direction from the BPM to the middle of two branching skeleton units), and therefore placed at the second position.

In the example illustrated in FIG. 38B, there is no skeleton unit which falls under (1). Therefore, a skeleton unit which extends in the direction opposite to the minutia direction at the BPM is shown to have the "highest priority." Also, a skeleton unit which is placed immediately to the right of the minutia direction at the BPM is shown to have the "next highest priority."

Figure 39:
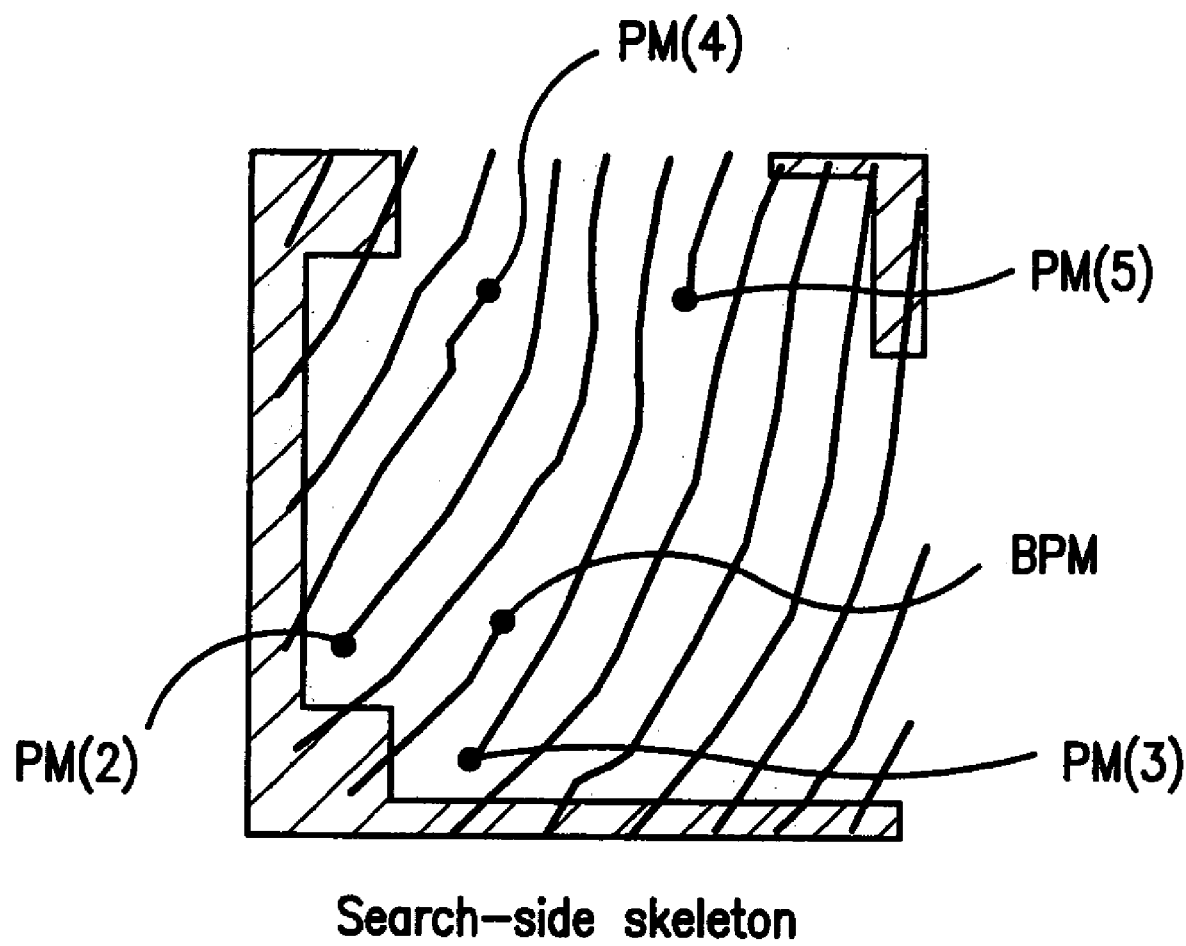
FIG. 39 is a diagram illustrating an exemplary ranking for determinate paired minutiae other than BPM.

After ordering the skeleton units connected to the BPM, skeleton data matching unit 20 selects one by one determinate paired minutiae which are closer to the BPM. Then, skeleton data matching unit 20 determines the order for skeleton units connected to the determinate paired minutiae from the one closest to the BPM. The ordering for skeleton units connected to determined minutiae other than the BPM is similar to the ordering for the skeleton units which are connected to the BPM. Specifically, if a determinate paired minutia of concern is an ending point, skeleton data matching unit 20 orders skeleton units connected to this ending point. When a determinate paired minutia of concern is a bifurcation point, skeleton data matching unit 20 regards this bifurcation point as an ending point, and determines the order for three skeleton units connected to the ending point in the ascending direction from (1) to (4). FIG. 39 illustrates exemplary ordering for determinate paired minutiae other than the BPM. As illustrated in FIG. 39, determinate paired minutiae except for the BPM are placed in an order in which they are closer to the BPM. Since there is no bifurcation point in this example, the ordering for determinate paired minutiae is the same as the ordering for skeleton units which are connected to the determinate paired minutiae.

Figure 40:
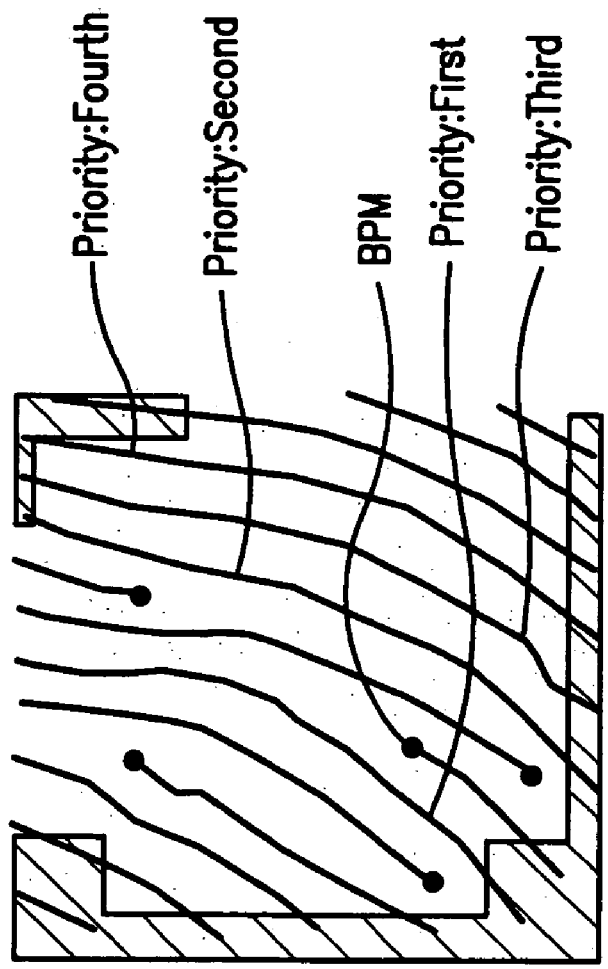
FIG. 40 is a diagram illustrating an exemplary ranking for skeleton units which are not connected to determinate paired minutiae.

Next, skeleton data matching unit 20 determines the order for skeleton units which are not connected to a determinate paired minutia. The skeleton units which are not connected to a determinate paired minutia are ordered such that they are given higher positions as they are closer to the BPM. FIG. 40 illustrates exemplary ordering for skeleton units which are not connected to a determinate paired minutia. As illustrated in FIG. 40, skeleton units closer to the BPM are given higher positions. For the skeleton units which are not connected to a determinate paired minutia, corresponding skeleton units do not always exist on the file side. On the other hand, a plurality of skeleton units on the file side may correspond to a single skeleton unit on the search side. As can be seen, FIG. 40 only illustrates skeleton units up to the fourth highest priority.

After the ordering for the S-side skeleton units, skeleton data matching unit 20 determines at step A302 whether or not the correspondence with the F-side has been completed for a skeleton point of each of the skeleton units for which the ordering has been determined. Skeleton data matching unit 20 determines that the correspondence with the F-side has been completed when k>N, followed by the flow proceeding to step A4. If k≦N, skeleton data matching unit 20 determines at step A303 whether or not any determinate paired minutia exists on skeleton of interest S-Unit(k). The result of this determination is classified into the following three cases. A first case is applied to skeleton of interest S-Unit(k) which has a determinate paired minutia (including the BPM) only at one end. A second case is applied to S-Unit(k) which has determinate paired minutiae (including the BPM) at both ends. A third case is applied to S-Unit(k) which has no determinate paired minutia.

In the first case, skeleton data matching unit 20 performs processing at sub-step A3-1, later described. In the first case, skeleton of interest S-Unit(k) has a determinate paired minutia only at one end thereof (including the BPM). At sub-step 3-1, skeleton data matching unit 20 selects skeleton points one by one in an order in which they are closer to the determinate paired minutia, and checks whether or not a skeleton point corresponding to the selected skeleton point (point of interest) exists on the F-side. It should be noted that a point of interest handled at sub-step A3-1 is a continuous point on the S-side (labeled "SC") or an extensive end point on the S-side (labeled "SX"). When "S" or "F" is prefixed to a variety of symbols such as "C," "X" and the like indicative of the type, "S" or "F" indicates the search side or file side.

In the second case, skeleton data matching unit 20 performs processing at sub-step A3-2, later described. In the second case, skeleton of interest S-Unit(k) has determinate paired minutiae on both ends thereof (including the BPM). At sub-step A3-2, skeleton data matching unit 20 selects skeleton points one by one in an order in which they are closer to the determinate paired minutia that is closer to the BPM, and checks whether or not a skeleton point corresponding to the selected skeleton point (point of interest) exists on the F-side. In this case, skeleton data matching unit 20 determines a skeleton point on the F-side based on the ratio of skeleton distances from the point of interest to both ends. It should be noted that a point of interest handled at sub-step A3-2 is only S-side continuous point SC.

In the third case, skeleton data matching unit 20 performs processing at sub-step A3-3, later described. In the third case, no determinate paired minutia exist on skeleton of interest S-Unit(k). Since skeleton units which fall under the third case are given lower priorities, sub-steps A3-1, A3-2 have already ended at the time sub-step A3-3 is executed. When skeleton data matching unit 20 checks the correspondence relationship with an F-side skeleton point, it uses a skeleton point which is determined to be a determinate skeleton point at sub-step A3-1 or A3-2.

After sub-step A3-1, A3-3 or A3-3, skeleton data matching unit 20 increments k by one to select a new skeleton of interest at step A307.

The following description will be made on the processing at steps A3-1 to A3-3. From sub-step A3-1 to sub-step A3-3, a large number of terms are used. For convenience, FIG. 41 shows a table of correspondence between terms used for S-side data and terms used for F-side data.

Figure 42:
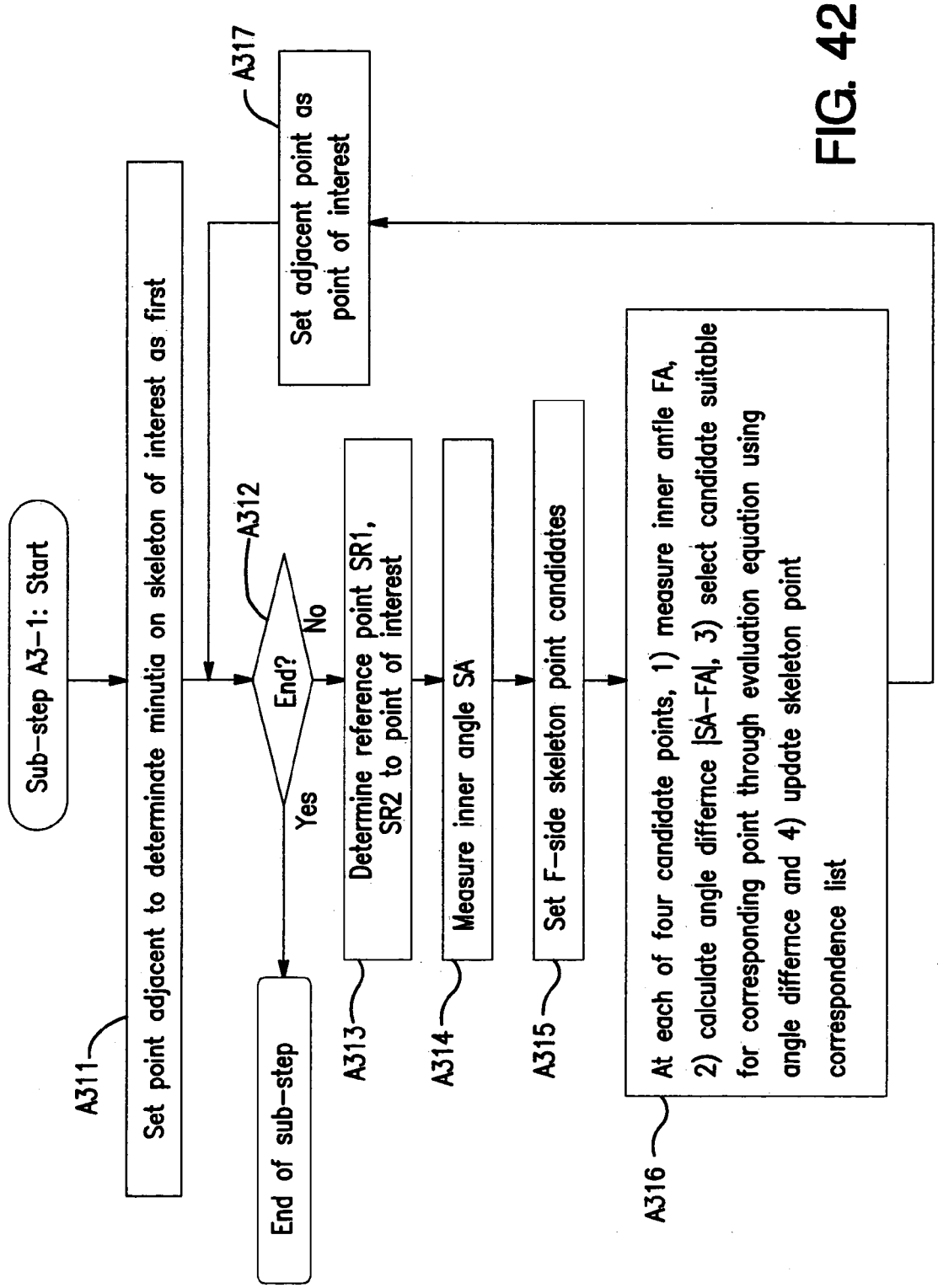
FIG. 42 is a flow chart illustrating a routine for bringing skeleton points into correspondence with each other.
Figure 43:
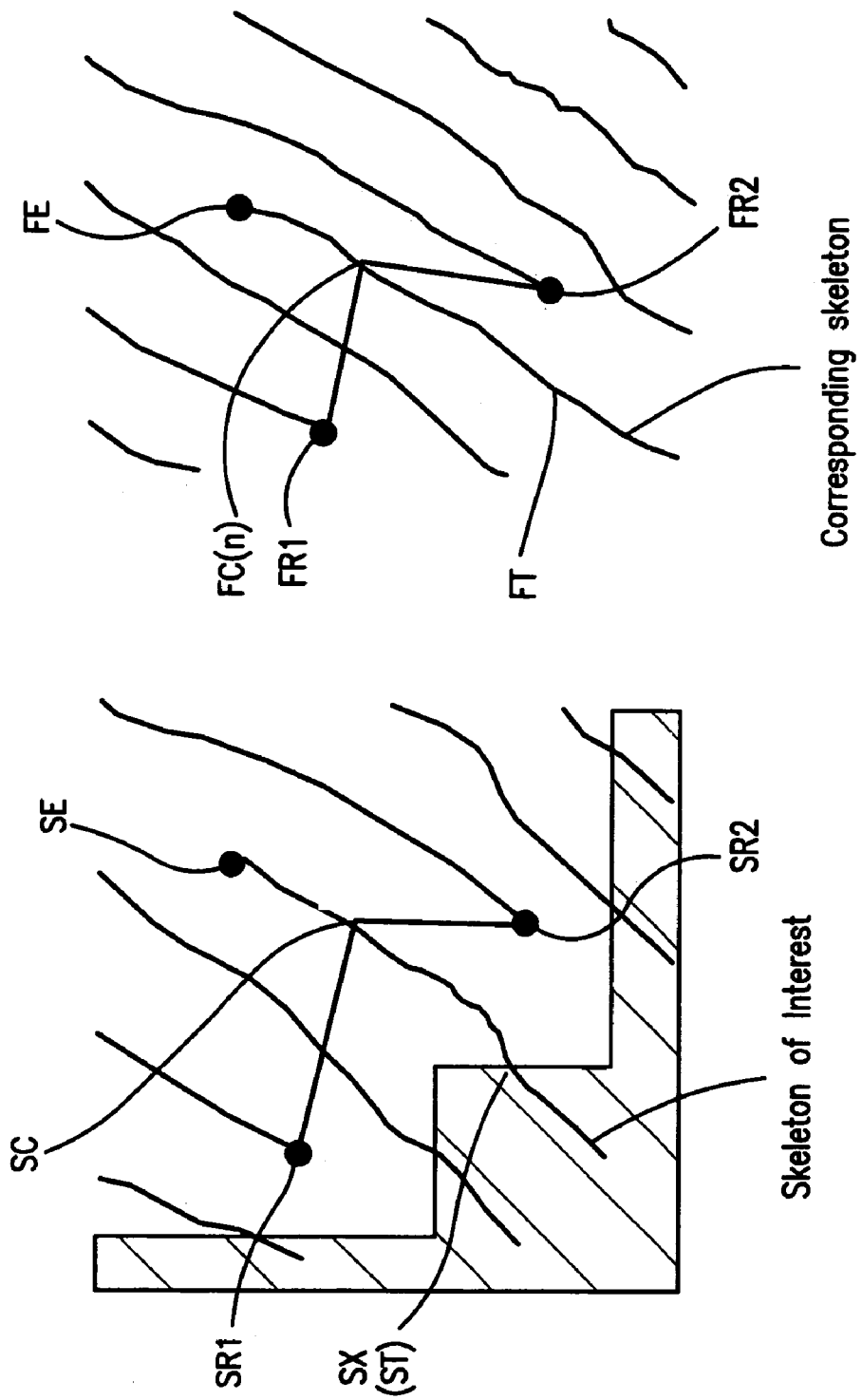
FIG. 43 is a diagram illustrating an exemplary correspondence of points of interest to corresponding points.

FIG. 42 illustrates an exemplary flow of the processing at sub-step A301. FIG. 43 in turn describes the correspondence of a point of interest to a corresponding point at sub-step A3-1. The processing at sub-step A301 is intended for a skeleton of interest which has a determinate paired minutia only on one end thereof, as the skeleton of interest illustrated in FIG. 43. While FIG. 43 shows that the determinate paired minutia is an ending point, the determinate paired minutia may be a bifurcation point. Even with a bifurcation point, it can be regarded as an ending point by separating a skeleton. Therefore, in the following description, this determinate paired minutia is represented by determinate ending point SE, using "E." The correspondence has previously been established between S-side determinate ending point SE and F-side determinate ending point FE.

After starting sub-step A3-1, skeleton data matching unit 20 first sets (selects) a point adjacent to determinate ending point SE on a skeleton of interest as the first point of interest at step A311. This point of interest is S-side continuous point SC. As illustrated in the left-hand figure in FIG. 44, continuous point SC adjacent to determinate ending point SE is selected as the first point of interest.

After step A311, skeleton data matching unit 20 determines at step A312 whether or not sub-step A3-1 is terminated. The condition which causes termination of sub-step A3-1 will be described later. If the terminating condition is not satisfied, skeleton data matching unit 20 selects the nearest reference point from each of both ends of a line segment which connects determinate ending point SE to point of interest SC at step A313. The reference points are labeled SR1, SR2, respectively (see FIG. 43). It should be noted that a selection of three or more reference points can improve the accuracy for the correspondence but causes an increase in processing time. In the example given herein, two reference points SR1, SR2 are selected for purposes of description. At step A314, skeleton data matching unit 20 measures inner angle SA which is formed by a line segment that connects reference point SR1 to point of interest SC and a line segment that connects point of interest SC to reference point SR2. This inner angle SA can be represented by:

$$SA=\angle(SR1, SC, SR2)$$

Figure 44:
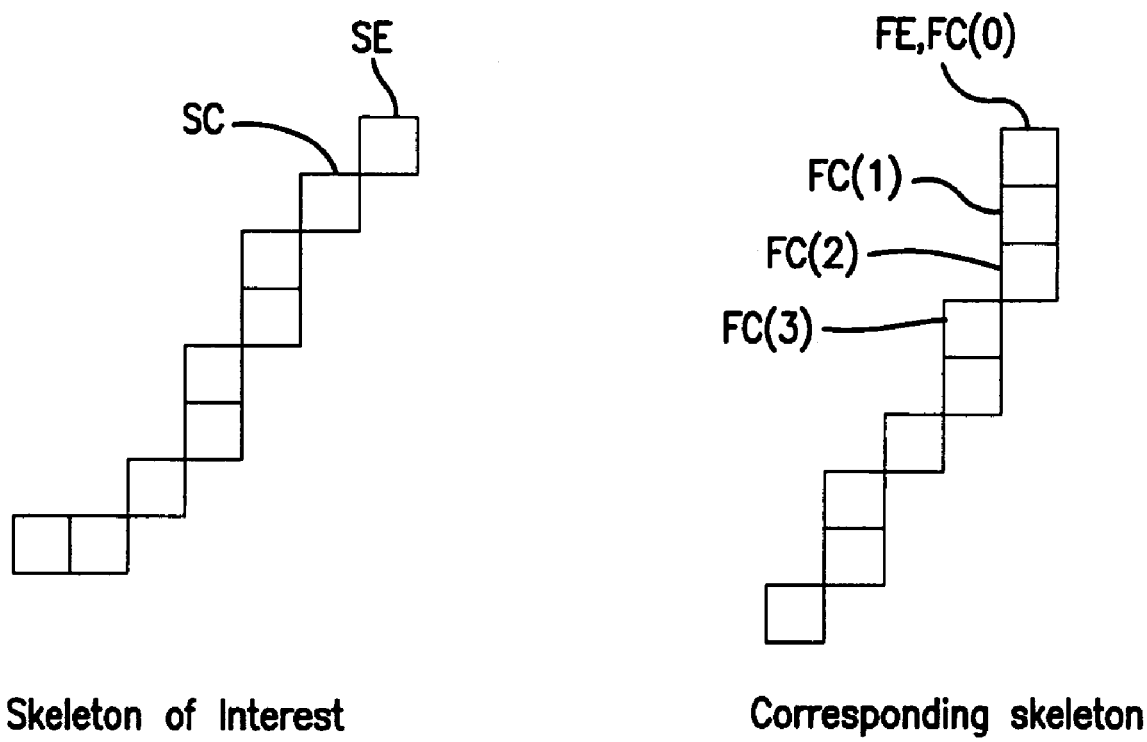
FIG. 44 is a diagram illustrating examples of points of interest and corresponding point candidates.

Next, skeleton data matching unit 20 selects a candidate corresponding point which corresponds to point of interest SC. An F-side skeleton point which has been previously confirmed that it corresponds to a skeleton point on a skeleton of interest is designated "apparent determinate point FC(0)." Skeleton data matching unit 20 selects three outer adjacent points of FC(0) as corresponding point candidates FC(1)-FC(3). Also, apparent determinate point FC(0) is included in corresponding point candidates. Outer adjacent points of a certain skeleton point refer to those skeleton points which form in a line from the skeleton point such that the resulting line withdraws from determinate ending point FE. For example, as illustrated in FIG. 44, assume that point of interest SC is an adjacent point of determinate ending point SE. In this event, the apparent determinate point is FE which corresponds to SE. Three skeleton points which extend to withdraw from FE are outer adjacent points of apparent determinate point FE. Skeleton data matching unit 20 selects FE and the three points as corresponding point candidates FC(0) to FC(3).

The number of corresponding point candidates except for FC(0) need not be three. However, the number of corresponding point candidates except for F(0) is preferably three in consideration of the maximum distance ($\sqrt{2}$) to the adjacent skeleton point, distortions, expansion, contraction of the images, and the like.

When outer adjacent points FC(1) to FC(3) include a non-determinate paired minutia (paired minutiae which are dissimilar in type on the S-side and F-side), outer adjacent points subsequent to the non-determinate paired minutia are excluded from corresponding point candidates.

At step A316, skeleton data matching unit 20 determines a corresponding point from corresponding point candidates FC(0) to FC(3). When FC(1) adjacent to apparent determinate point FC(0) is simply determined to be a corresponding point for point of interest SC, some contradiction may be found in the positional relationship. To avoid this inconvenience, a corresponding point is determined in consideration of the "positional relationship between the point of interest and a group of adjacent reference points." Skeleton data matching unit 20 determines F-side reference points FR1, FR2 corresponding to reference points SR1, SR2 (see FIG. 43). Then, skeleton data matching unit 20 measures, for each candidate, inner angel FA which is formed by a line segment that connects reference point FR1 to the corresponding point candidate and a line segment that connects the corresponding point candidate to reference point FR2. Inner angle FA can be represented by:

$$FA = \angle(FR1, FC(n), FR2)$$

In FC(n), $0 \leq n \leq 3$.

Then, skeleton data matching unit 20 evaluates each corresponding point candidate (each inner angle) with equation (1):

$$y1 = k1 + k2 \times |SA - FA| \quad (1)$$

Specifically, skeleton data matching unit 20 calculates y1 for each FA, and determines a corresponding point candidate which presents minimum y1 as the corresponding point. In equation (1), however, k1 is determined for each corresponding point candidate. Upon evaluation of FC(0), k1 is set to one (k1=1). With FC(1), k1 is set to zero (k1=0). With FC(2), k1 is set to one (k1=1). With FC(3), k1 is set to three (k1=3). K2 used in equation (1) is a coefficient associated with an angle difference, and is set to 0.2 in this example (k2=0.2). The determined corresponding point FC(n) and point of interest SC are selected as determinate skeleton points. Skeleton data matching unit 20 additionally provides the skeleton point correspondence list with information stating that determined corresponding point FC(n) corresponds to point of interest SC. The newly corresponded FC(n) is used as an apparent determinate point when step A315 is executed next time.

At step S317, skeleton data matching unit 20 sets an adjacent point to the determinate skeleton point, which has been finally brought into correspondence, as new point of interest SC. In other words, an adjacent point to the so far remarked point of interest is set as new point of interest SC. Subsequently, skeleton data matching unit 20 repeats the operation at step A312 onward.

At step A312, skeleton data matching unit 20 determines that sub-step A3-1 is terminated when any of the following first to fourth conditions is satisfied. A first condition is satisfied when the correspondence is completed for S-side extensive end point SC. A second condition is satisfied when F-side extensive end point FX is determined as a corresponding point in the correspondence which is made for certain point of interest SC. A third condition is satisfied when a non-determinate paired minutia is selected as a new point of interest SC at step A317. The non-determinate paired minutia refers to a paired minutia which does not match in type with the counterpart. A fourth condition is satisfied when an adjacent point to an F-side final corresponding point is a non-determinate paired minutia. When sub-step A3-1 is terminated in response to the satisfaction of the first or second condition, S-side point of interest which is finally brought into correspondence is labeled "ST," and an F-side skeleton point corresponding to ST is labeled "FT." For example, when sub-step A3-1 is terminated in response to the satisfaction of the first condition, S-side extensive end point SX is designated as ST, and its corresponding point as FT (see FIG. 43).

Figure 45:
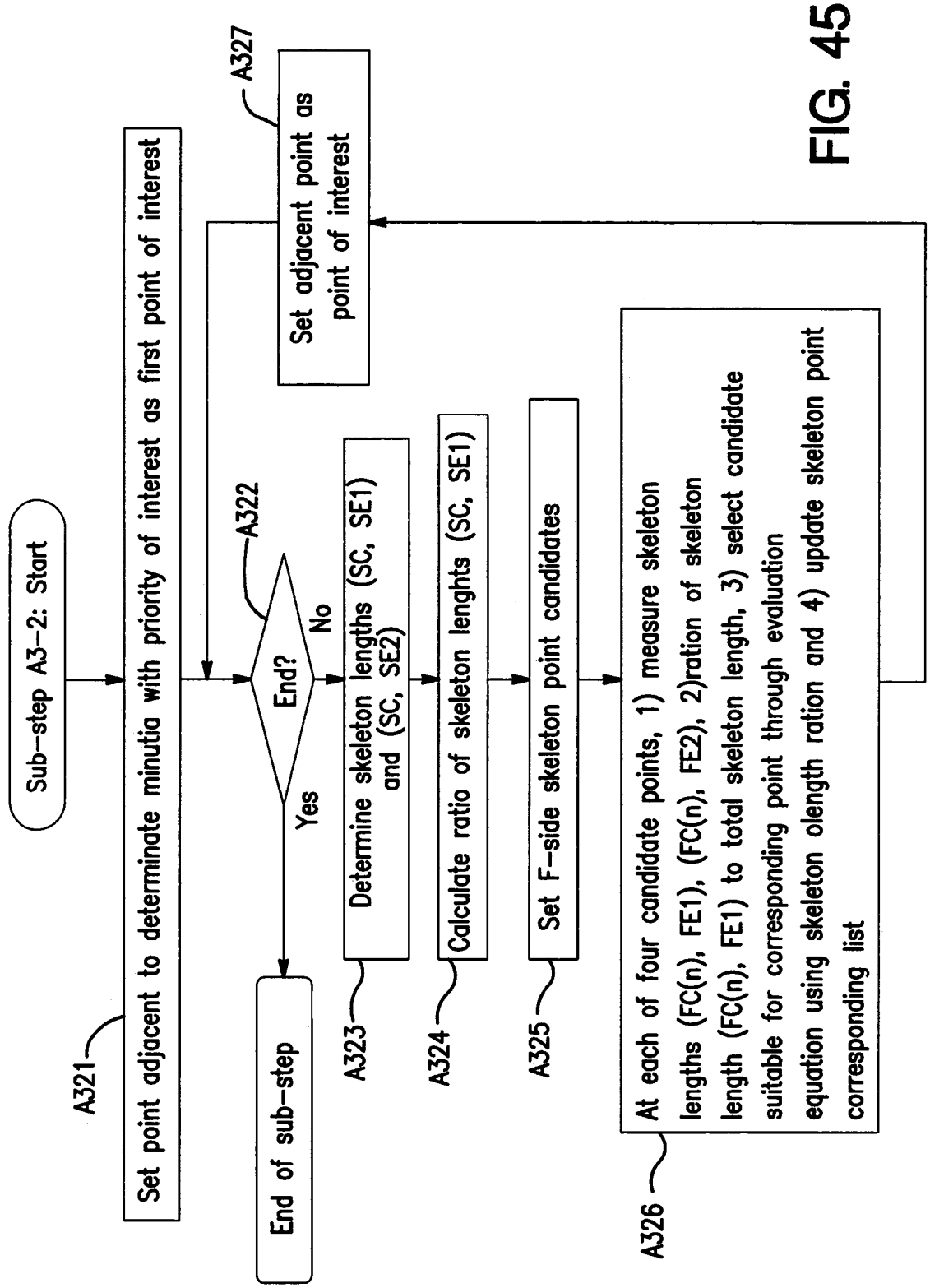
FIG. 45 is a flow chart illustrating a routine for bringing skeleton points into correspondence with each other.

FIG. 45 illustrates an exemplary flow of the processing at sub-step A3-2. The processing at sub-step A3-2 is intended for a skeleton of interest which has determinate paired minutiae (including BPM) at both ends thereof. Similar to sub-step A3-1, a determinate paired minutia is regarded as a determinate ending point, and is represented by symbol "E." At sub-step A3-2, skeleton data matching unit 20 progresses the processing from a determinate end point which is BPM or a determinate end point closer to the BPM out of the determinate ending points at both ends. This determinate ending point (S-side) is labeled "SE1." The other determinate ending point is labeled "SE2."

After starting sub-step S3-2, skeleton data matching unit 20 sets (selects) a point adjacent to determinate ending point SE1 on the skeleton of interest as the first point of interest. The first point of interest is determined in a manner similar to the illustration in FIG. 40. It should be noted that at sub-step A3-2, only continuous point SC is designated as a point of interest.

After step A321, skeleton data matching unit 20 determines at step A322 whether or not sub-step A3-2 is terminated. The condition which causes termination of sub-step A3-2 will be described later. If the terminating condition is not satisfied, skeleton data matching unit 20 measures a skeleton length from point of interest SC to determinate ending point SE1, from which the processing has been started, at step A323. The skeleton length between SC and SE1 is labeled "SD1." Skeleton length SD1 is preferably a curved distance along the skeleton of interest rather than a straight line distance. This is because a straight line distance is more susceptible to image distortions and the like. In this example, in a movement from SC to SE1 along the skeleton of interest, skeleton data matching unit 20 accumulates a distance unit (one pixel) in response to each movement to an upper, lower, left or right pixel, and accumulates 1.4 pixels ($\sqrt{2}$ pixels) in response to each movement to a pixel in an oblique direction to find the distance. Skeleton data matching unit 20 also measures the skeleton length (labeled "SD2") from the other determinate ending point SE2 to point of interest SC in a similar manner.

Next, at step A324, skeleton data matching unit 20 calculates ratio Rs of SD1 to the total sum of skeleton distances SD1, SD2. Specifically, Rs is calculated by the equation Rs=SD1/(SD1+SD2).

Next, at step A325, skeleton data matching unit 20 selects corresponding point candidates corresponding to point of interest SC in a manner similar to the previously described step A315. In this example, skeleton data matching unit 20 selects four corresponding point candidates FC(0) to FC(4). FC(0) is an apparent determinate point which has been finally brought into correspondence.

At step A326, skeleton determinate unit 20 determines a corresponding point from corresponding point candidates FC(0) to FC(3). When FC(1) adjacent to apparent determinate point FC(0) is simply determined to be a corresponding point for point of interest SC, some contradiction may be found in the positional relationship. To avoid this inconvenience, a corresponding point is determined in consideration of the "ratio of the distances from the non-determinate minutiae at both ends to the point of interest." Skeleton data matching unit 20 measures a skeleton distance from each of corresponding point candidates FC(0) to FC(3) to each of determinate ending points FE1, FE2. FE1, FE2 are F-side determinate ending points which correspond to SE1, SE2, respectively. The skeleton distances from a corresponding point candidate to FE1, FE2 are designated by FD1(n), FD2(n), respectively, where n=0-3 which correspond to the respective candidates.

Next, skeleton data matching unit 20 calculates ratio Rf of FD1(n) to the total sum of FD1(n) and FD2(n) for each of n from 0 to 3. Specifically, Rf is calculated by the equation Rf=FD1(n)/(FD1(n)+FD2(n)). Then, skeleton data matching unit 20 determines a corresponding point candidate which presents the minimum |Rf−Rs| as a corresponding point. This corresponding point and point of interest SC are selected as determinate skeleton points. Skeleton data matching unit 20 additionally provides the skeleton point correspondence list with information stating that determined corresponding point corresponds to point of interest SC. The F-side corresponding point corresponded to point of interest SC is used as an apparent determinate point when step A325 is executed next time.

At step A327, skeleton data matching unit 20 sets a point adjacent to the determinate skeleton point, which has been finally brought into correspondence, as new point of interest SC. In other words, a point adjacent to the so far remarked point of interest is selected as a new point of interest SC. Subsequently, skeleton data matching unit 20 repeats the operation at step A322 onward. At step A322, the processing is terminated on condition that newly set point of interest SC is the same as determinate ending point SE2.

Figure 46:
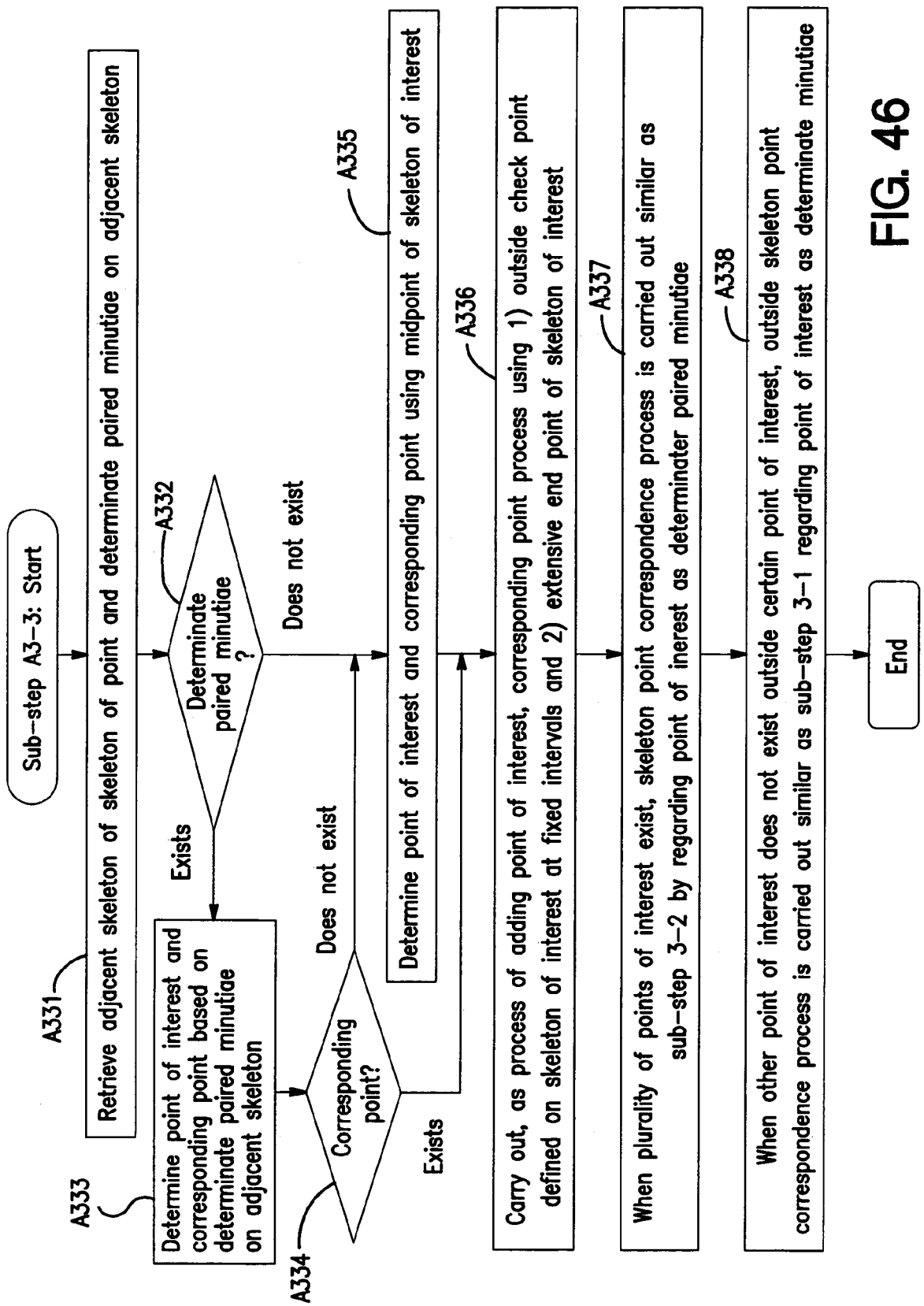
FIG. 46 is a flow chart illustrating a routine for bringing skeleton points into correspondence with each other.

FIG. 46 illustrates an exemplary flow of the processing at sub-step A3-3. The processing at sub-step A3-3 is intended for a skeleton of interest which has no determinate paired minutia. When sub-step A3-3 is executed, sub-steps A3-1, A3-2 have been executed. Therefore, determinate skeleton points and determinate paired minutiae exist on skeletons other than a skeleton of interest. At step A3-3, skeleton data matching unit 20 performs the processing involved in bringing skeleton points into correspondence with the foregoing points for use as reference points.

After starting sub-step A3-3, skeleton data matching unit 20 first retrieves all skeletons adjacent to a skeleton of interest at step A331. Further, skeleton data matching unit 20 retrieves determinate paired minutiae from the retrieved adjacent skeletons. The adjacent skeleton is defined to be a skeleton which permits a perpendicular descending from a point thereon to a skeleton of interest can reach the skeleton of interest without intersecting other skeletons. When a perpendicular can directly reach even a portion of the skeleton of interest, this falls under the adjacent skeleton. The adjacent skeleton existing on one side of the skeleton of interest is not limited to only one, but two or more adjacent skeletons may exist in some cases. Describing a skeleton of interest shown in FIG. 47A as an example, there are two adjacent skeletons in a region on one side of the skeleton of interest in which BPM exists. In a region on the opposite side of the skeleton of interest, there is one adjacent skeleton.

After step A331, skeleton data matching unit 20 determines at step A332 whether or not a determinate paired minutia can be retrieved from the adjacent skeletons. When the determinate paired minutia can be found, skeleton data matching unit 20 determines an S-side point of interest using the determinate paired minutia as a reference point, and brings the point of interest into correspondence with an F-side skeleton point at step A333.

Figure 47A:
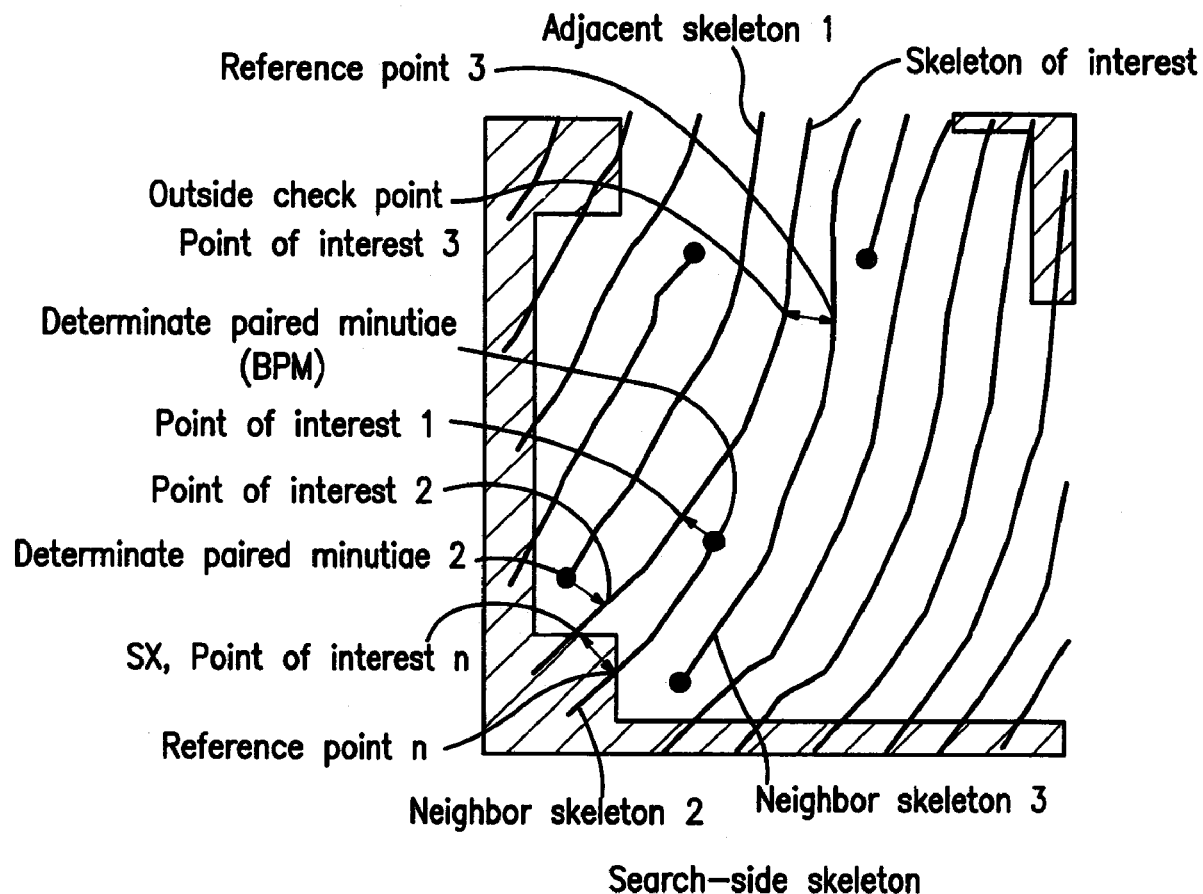
FIGS. 47A and 47B are diagrams each for describing the processing for determining points of interest and corresponding points.

At step A333, skeleton data matching unit 20 draws a perpendicular from the determinate paired minutia on the adjacent skeleton down to the skeleton of interest, and assigns the toe of the perpendicular as an S-side point of interest. For example, in the example illustrated in FIG. 47A, determinate paired minutiae 1, 2 exist on adjacent skeletons 2, 1, respectively. The feet of perpendiculars drawn down from determined minutiae 1, 2 are assigned as points of interests 1, 2, respectively. In FIG. 47A, the perpendiculars drawn from the determined determinate paired minutiae and the like down to the skeleton of interest are indicated by arrows. When a perpendicular drawn down from a determinate paired minutia does not reach the skeleton of interest, this matching skeleton is ignored, and a perpendicular is drawn down from the next determinate paired minutia.

Figure 47B:
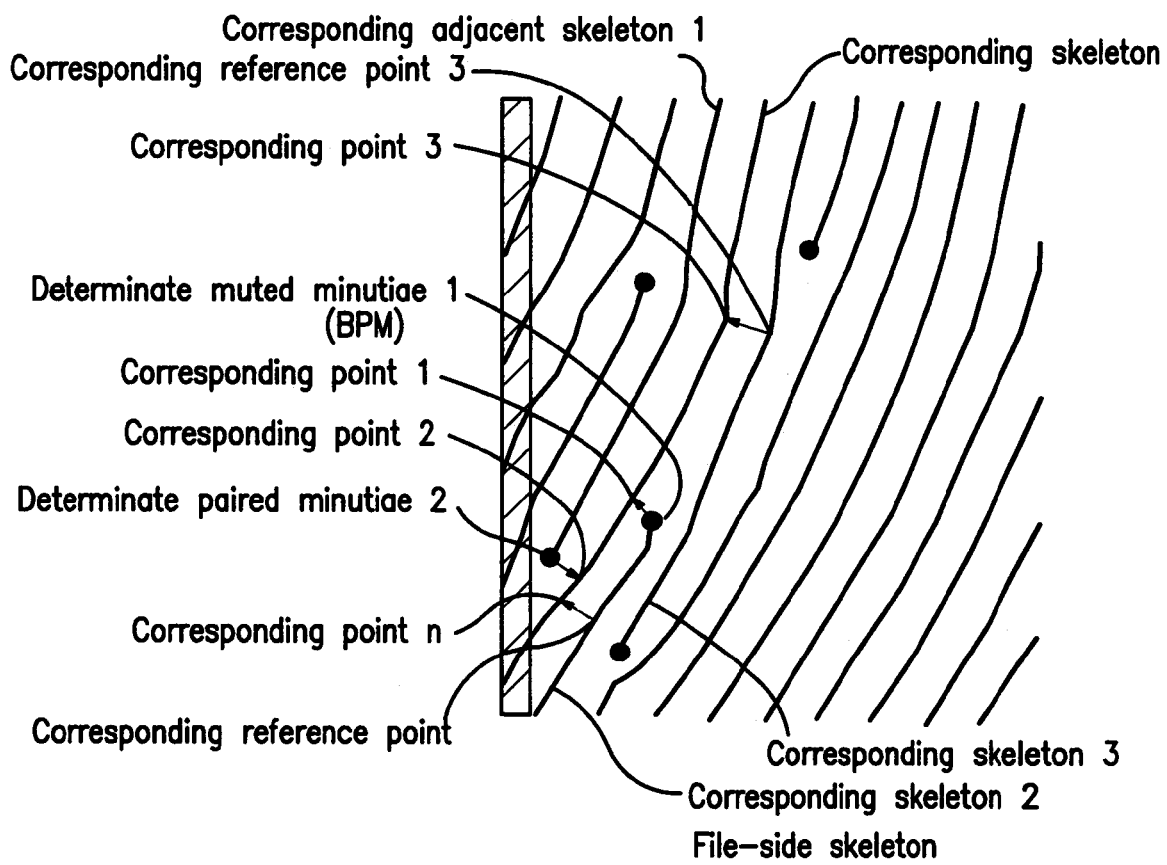

Next, skeleton data matching unit 20 draws a perpendicular line from an F-side determinate paired minutia which corresponds to the matching point on the adjacent skeleton down to a corresponding skeleton, i.e., an F-side skeleton corresponding to the skeleton of interest. If the perpendicular intersects the corresponding skeleton, skeleton data matching unit 20 determines the intersection (the foot of the perpendicular) as a corresponding point corresponding to the S-side point of interest. In the example illustrated in FIG. 47B, determinate paired minutiae 1, 2 exist on corresponding adjacent skeletons 2, 1 which correspond to S-side adjacent skeletons. The feet of perpendiculars drawn from these determinate paired minutiae 1, 2 down to the corresponding skeletons are assigned as corresponding points 1, 2, respectively. These corresponding points correspond to point of interest 1, 2 shown in FIG. 47A. Likewise, on the F-side, if a perpendicular drawn down from a determinate paired minutia does not reach a corresponding skeleton, this determinate paired minutia is ignored, and a perpendicular is drawn down from the next determinate paired minutia.

When perpendiculars are drawn down from S-side and F-side determinate paired minutiae, a determinate paired minutia is ignored if a perpendicular drawn down from this determinate paired minutia has a length equal to or longer than a predetermined value, for example, double of an average ridge line interval, and a perpendicular is drawn down from the next determinate paired minutia.

Next, skeleton data matching unit 20 determines at step A334 whether or not a corresponding point can be found on the F-side based on each of determinate paired minutiae on the adjacent skeletons.

Upon determining at step A332 that no determinate paired minutia can be retrieved from the adjacent skeletons, skeleton data matching unit 20 determines the median point for the skeleton of interest, and brings the median point into correspondence with an F-side skeleton point at step A335. Likewise, when determining at step A334 that no corresponding point can be found on the F-side, similar processing is performed. Skeleton data matching unit 20 determines a skeleton point which is distanced by the same skeleton distance from both ends of the skeleton of interest as the median point of the skeleton of interest. In the example illustrated in FIG. 48A, the median point is indicated by a circle. The skeleton of interest has an extensive end point or a non-determinate paired minutia at both ends thereof.

Skeleton data matching unit 20 draws a perpendicular from the median point down to an adjacent skeleton which exists in a region that includes the BPM, and determines whether or not the foot of the perpendicular can be a reference point. Specifically, when a toe of a perpendicular drawn down to an adjacent skeleton is a determinate skeleton point, and a point corresponding to the foot of the perpendicular exists on the F-side, the foot of the perpendicular is used as a reference point. In the example illustrated in FIG. 48A, a foot of perpendicular drawn from the median point down to the adjacent skeleton is designated "reference point 1." If the foot of a perpendicular is not a reference point, a skeleton point on the skeleton of interest cannot be brought into correspondence with the counterpart on the F-side. In this event, sub-step A3-3 is terminated at step A335, followed by selection of the next skeleton of interest.

Next, skeleton data matching unit 20 draws a perpendicular from the reference point down to the skeleton of interest, and designates the intersection as a point of interest if the perpendicular intersects the skeleton of interest (at the foot of the perpendicular). This point of interest may coincide with the previously determined median point or may slightly shift therefrom. If the perpendicular does not intersect the skeleton of interest, sub-step A3-3 is terminated at step A335, followed by selection of the next skeleton of interest.

Next, skeleton data matching unit 20 draws a perpendicular from the F-side corresponding reference point which corresponds to the reference point down to the corresponding skeleton of the F-side, and designates the intersection as a corresponding point if the perpendicular intersects the corresponding skeleton (at the foot of the perpendicular). If the perpendicular does not intersect the corresponding skeleton, sub-step A3-3 is terminated at step A335, followed by selection of the next skeleton of interest.

Sub-step A3-3 is also terminated when the length of the perpendicular is equal to or longer than a predetermined value, for example, double of the average ridge line interval, as determined at step A335, followed by selection of the next skeleton of interest.

Figure 48A:
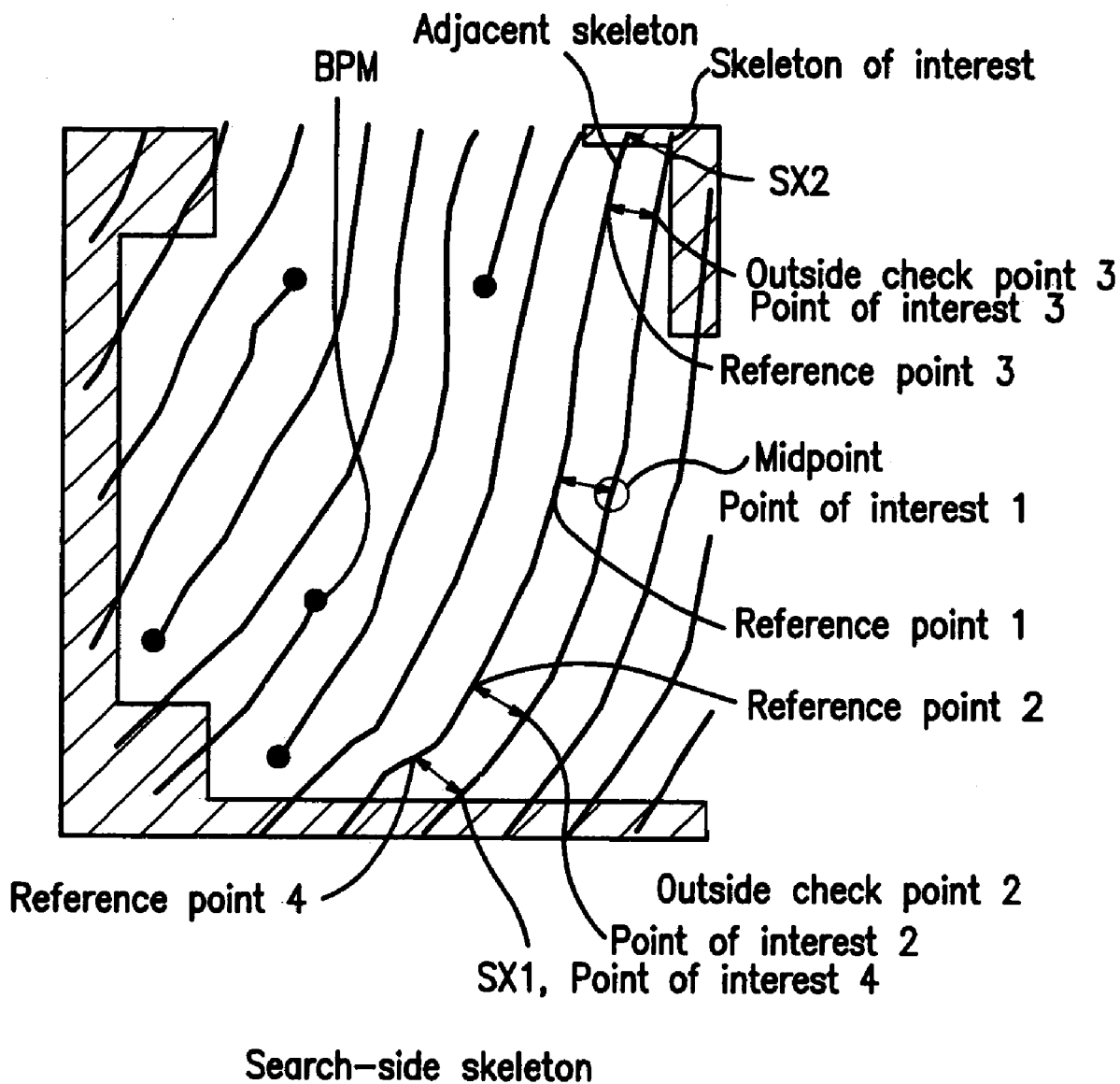
FIGS. 48A and 48B are diagrams each for describing the processing for determining points of interest and corresponding points.
Figure 48B:
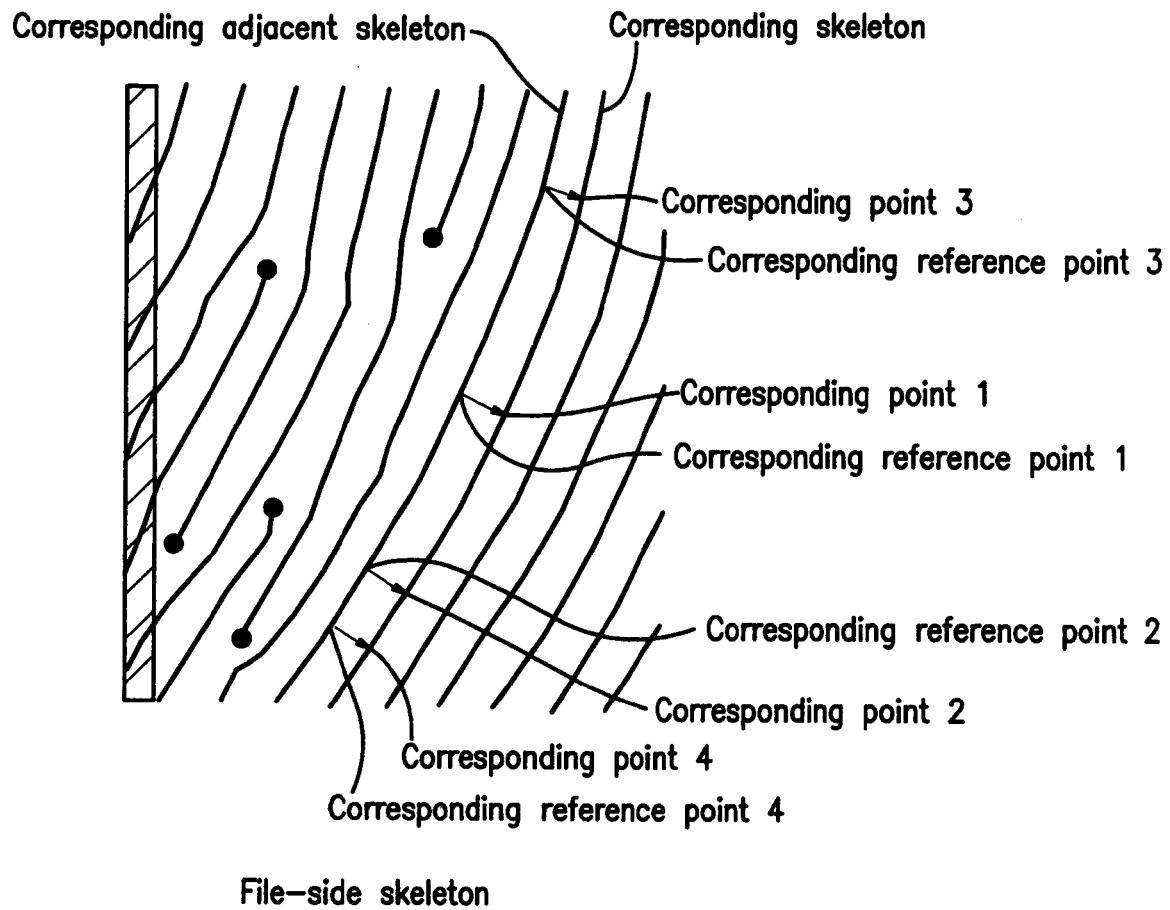

If a corresponding point can be determined before step A334 or A335, skeleton data matching unit 20 adds a point of interest at step A336. Generally, at the start of step A336, there exists one set or more of a point of interest and a corresponding point in combination. If there is no point of interest outside of a certain point of interest (toward the end of the skeleton of interest), a skeleton point spaced from the point of interest outward by a constant distance is designated as an outside check point. FIG. 47A shows a single outside check point, while FIG. 48A shows two outside check points.

After determining the outside check point(s), skeleton data matching unit 20 draws a perpendicular from the outside check point down to an adjacent skeleton, i.e., an adjacent skeleton adjacent in the region which includes the BPM, when viewed from the skeleton of interest, and checks whether or not the intersection of the perpendicular with the adjacent skeleton (the foot of the perpendicular), if any, can be a reference point. Specifically, skeleton data matching unit 20 designates the toe of the perpendicular as a reference point when the toe of the perpendicular is a determinate skeleton point, and there exists a corresponding point to the F-side. Subsequently, skeleton data matching unit 20 draws a perpendicular from the reference point down to the skeleton of interest, and designates the intersection of the perpendicular with the skeleton of interest (the foot of perpendicular), if any, as a point of interest. This point of interest may coincide with the outer check point or may slightly shift therefrom. Next, skeleton data matching unit 20 draws a perpendicular from the corresponding reference point on the file side down to the corresponding skeleton on the file side, and determines the foot of perpendicular as a corresponding point.

After determining a new point of interest, skeleton data matching unit 20 determines a new outside check point at a location spaced further outward by a constant distance, and determines a point of interest and a corresponding point in a similar manner. When a skeleton of interest has extensive end point SX at the outer end, skeleton data matching unit 20 regards this extensive end point as an outside check point, and determines a point of interest and a corresponding point in a similar manner. When skeleton data matching unit 20 cannot determine a reference point, a point of interest or a corresponding point for an outside check point, or when a perpendicular has a length equal to or larger than a predetermined value, skeleton data matching unit 20 terminates the processing for the outside check point. This concludes the description on step A336.

After step A336, skeleton data matching unit 20 performs the correspondence of skeleton points which exist in a portion sandwiched between two points of interest with the F-side. If there are a plurality of sets of points of interest and corresponding points at the end of step A336, skeleton data matching unit 20 performs the correspondence with the F-side for each of skeleton points in a portion sandwiched between the points of interest. This correspondence is performed in a manner similar to sub-step A3-1, regarding any of the two points of interest as determinate paired minutiae.

A skeleton point may exist outside the point of interest which exists at the outermost location on a skeleton of interest (a point of interest which has a corresponding point on the F-side). On the other hand, only one point of interest may exist up to the end of step A338. In this event, at step A338, skeleton data matching unit 20 performs the correspondence of skeleton points which exist outside of these points of interest with the F-side. This correspondence is performed in a manner similar to sub-step A3-1, regarding the points of interest as determinate paired minutiae, and regarding a sequence of skeleton points existing outside of the points of interest as a unit. This concludes the description on the processing at step A3.

Next, description will be made on the processing at step A4. The correspondence of skeleton points on the S-side to those in the F-side has been completed at the start of step A4. At step A4, skeleton data matching unit 20 calculates the length of continuous determinate skeleton points with respect to each skeleton on the S-side.

After calculating the length LMS of a series of determinate skeleton points for each skeleton, skeleton data matching unit 20 multiplies the length by modification coefficient K(L) to calculate the product. K(L) is determined in accordance with the length LMS of determinate skeleton points. When $LMS \leq 10$, $K(L)=0.5$.

When $10 < LMS \leq 50$, K(L) is determined by the following equation (2):

$$K(L)=0.0125 \times (LMS-10)+0.5 \quad (2)$$

When $50 < LMS \leq 100$, K(L) is determined by the following equation (3):

$$K(L)=0.01 \times (LMS-50)+1.0 \quad (3)$$

When $100 < LMS \leq 200$, K(L) is determined by the following equation (4):

$$K(L)=0.005 \times (LMS-100)+1.5 \quad (4)$$

when 200<LMS, K(L) is determined by the following equation (5):

$$K(L)=0.003\times(LMS-100)+2.0 \quad (5)$$

After calculating the product of length LMS and modification coefficient K(L) for each S-side skeleton, skeleton data matching unit 20 calculates the total sum of the products. The total sum is represented by $\Sigma(LMS\times K(L))$.

Skeleton data matching unit 20 also calculates the total sum of the penalties which have been counted up to steps A1 to A3. The total sum is the sum of P(m) at the end of step A1, P(m) at the end of step A2, and penalty k1 generated at step A3. The total sum of the penalties is represented by $\Sigma(P)$. Then, skeleton data matching unit 20 calculates matching score SkelScore for the skeleton in accordance with the following equation (6):

$$SkelScore=\Sigma(LMS\times K(L))-\Sigma(P)\times KP \quad (6)$$

where coefficient KP is a modification coefficient for $\Sigma(P)$ which is, for example, one in this example. The calculation of Skelscore is followed by termination of step A4.

This concludes the description of the skeleton data matching processing performed by skeleton data matching unit 20.

While preferred embodiments of the present invention have been described using specific terms, such description is for illustrative purposes only, and it is to be understood that changes and variations may be made without departing from the spirit or scope of the following claims.

What is claimed is:

1. A streaked pattern image analyzing method for determining whether a first streaked pattern image matches a second streaked pattern image, said method comprising the steps of:
   identifying paired minutiae from minutiae on respective thinned skeletons of the first and second streaked pattern images, the paired minutiae being brought into correspondence with each other;
   identifying points on the skeleton of the second streaked pattern image that correspond to corresponding points on the skeleton of the first streaked pattern image by using the paired minutiae;
   modifying data on the first streaked pattern image by moving the corresponding points on the skeleton of the first streaked pattern image closer to the points identified on the skeleton of the second streaked pattern image; and
   delivering the modified first streaked pattern image and the second streaked pattern image.

2. The method according to claim 1, further comprising the step of extracting the corresponding points on the skeleton of the first streaked pattern image at predetermined intervals, and wherein the modifying step includes moving each of the extracted corresponding points.

3. The method according to claim 2, further comprising the step of superimposing the modified first streaked pattern image on the second streaked pattern image, and displaying a resulting image.

4. The method. according to claim 1, further comprising the step of superimposing the modified first streaked pattern image on the second streaked pattern image, and displaying a resulting image.

5. The method according to claim 2, further comprising the step of alternately displaying the modified first streaked pattern image and the second streaked pattern image at a same position at constant switching intervals.

6. The method according to claim 1, further comprising the step of alternately displaying the modified first streaked pattern image and the second streaked pattern image at a same position at constant switching intervals.

7. A streaked pattern image analyzing apparatus determining whether a first streaked pattern image matches a second streaked pattern image, said apparatus comprising:
   minutia matching means for identifying paired minutiae from minutiae on respective thinned skeletons of the first and second streaked pattern images, the paired minutiae being brought into correspondence with each other;
   correspondence establishing means for identifying points on the skeleton of the second streaked pattern image that correspond to corresponding points on the skeleton of the first streaked pattern image by using the paired minutiae;
   image distortion modifying means for modifying data on the first streaked pattern image by moving the corresponding points on the skeleton of the first streaked pattern image closer to the points identified on the skeleton of the second streaked pattern image; and
   image display means for displaying the first streaked pattern image modified by said image distortion modifying means and the second streaked pattern image.

8. The apparatus according to claim 7, wherein said image distortion modifying means extracts the corresponding points on the skeleton of the first streaked pattern image at predetermined intervals, and moves each of the extracted points.

9. The apparatus according to claim 8, wherein said image display means superimposes the first streaked pattern image modified by said image distortion modifying means on the second streaked pattern image, and displays a resulting image.

10. The apparatus according to claim 7, wherein said image display means superimposes the first streaked pattern image modified by said image distortion modifying means on the second streaked pattern image, and displays a resulting image.

11. The apparatus according to claim 10, wherein said image display means displays each of the streaked pattern images which comprises a gray-scale image that represents a streaked pattern by changing a density of color.

12. The apparatus according to claim 10, wherein said image display means displays each of the streaked pattern images which comprises a skeleton image.

13. The apparatus according to claim 7, wherein said image display means alternately displays the first streaked pattern image modified by said image distortion modifying means and the second streaked pattern image at a same position at constant switching intervals.

14. The apparatus according to claim 7, further comprising:
   correspondence relationship modifying means for aiding in a modification of information on the paired minutiae identified by said minutia matching means and information on the points on the skeletons identified by said correspondence establishing means,
   wherein said minutia matching means again identifies paired minutiae based on the information on the paired minutiae and the information on the points on the skeletons modified by said correspondence relationship modifying means, and
   said correspondence establishing means brings points on skeletons into correspondence with each other based on the information on the paired minutiae and the information on the points on the skeletons modified by said correspondence relationship modifying means.

15. The streaked pattern image analyzing apparatus according to claim 14, further comprising:
skeleton data modifying means for aiding in a modification of data on the skeletons,
wherein said minutia matching means again identifies paired minutiae based on the data on skeletons modified by said skeleton data modifying means, and
said correspondence establishing means brings points on skeletons into correspondence with each other based on the data on skeletons modified by said skeleton data modifying means.

16. The apparatus according to claim 7, further comprising:
skeleton data modifying means for aiding in a modification of data on the skeletons,
wherein said minutia matching means again identifies paired minutiae based on the data on skeletons modified by said skeleton data modifying means, and
said correspondence establishing means brings points on skeletons into correspondence with each other based on the data on skeletons modified by said skeleton data modifying means.

17. A streaked pattern image analyze method for determining whether a first streaked pattern image matches a second streaked pattern image, said method comprising the steps of:
thinning a streak in the first and second streaked pattern images to generate skeleton data;
automatically mating the skeleton data of the first streaked pattern image and the skeleton data of the second streaked pattern image;
defining a motion vector for a point on a skeleton of the skeleton data of the first streaked pattern image which has been brought into correspondence with a point of the skeleton data of the second streaked pattern image in said mating step such that said motion vector has a start point at the point on the skeleton data of the first streaked pattern image and an end point at the point on the skeleton data of the second streaked pattern image which has been brought in correspondence;
calculating, for a point of the first streaked pattern image on which no motion vector has been defined, a motion vector by using an adjacent defined motion vector and a weighted average which uses a reciprocal of distance;
automatically deforming the first streaked pattern image by calculating a pixel density of the first streaked pattern image along the motion vector defined for each pixel, such that data on the first streaked pattern image is modified to make the first streaked pattern image resemble the second streaked pattern image; and
displaying the streaked pattern image modified by said image distortion modification and the other streaked pattern image.

18. The method according to claim 17, further comprising the step of superimposing the modified streaked pattern image on the other streaked pattern image, and displaying a resulting image.

19. The method according to claim 17, further comprising the step of alternately displaying the modified streaked pattern image and the other streaked pattern image at a same position at constant switching intervals.

20. A streaked pattern image analyzing apparatus for determining whether a first streaked pattern image matches a second streaked pattern image, said apparatus comprising:
thinning means for thinning a streak in the first and second streaked pattern images to generate skeleton data;
skeleton matching means for automatically mating the skeleton data of the first streaked pattern image and the skeleton data of the second streaked pattern image;
defining means for defining a motion vector for a point on a skeleton of the skeleton data of the first streaked pattern image which has been brought into correspondence with a point of the skeleton data of the second streaked pattern image by said skeleton matching means such that said motion vector has a start point at the point on the skeleton data of the first streaked pattern image and an end point at the point on the skeleton data of the second streaked pattern image which has been brought in correspondence;
calculating means for calculating, for a point of the first streaked pattern image on which no motion vector has been defined, a motion vector by using an adjacent defined motion vector and a weighted average which uses a reciprocal of distance;
image distortion modifying means for automatically deforming the first streaked pattern image by calculating a pixel density of the first streaked pattern image along the motion vector defined for each pixel, such that data on the first streaked pattern image is modified to make the first streaked pattern image resemble the second streaked pattern image; and
image display means for displaying the streaked pattern image modified by said image distortion modifying means and the other streaked pattern image.

21. The apparatus according to claim 20, wherein said image display means superimposes the streaked pattern image modified by said image distortion modifying means on the other streaked pattern image, and displays a resulting image.

22. The apparatus according to claim 20, wherein said image display means alternately displays the streaked pattern image modified by said image distortion modifying means and the other streaked pattern image at a same position at constant switching intervals.

* * * * *